US012386015B2

(12) United States Patent
Agee

(10) Patent No.: US 12,386,015 B2
(45) Date of Patent: Aug. 12, 2025

(54) RESILIENT DISTRIBUTED POSITIONING NETWORKS

(71) Applicant: Brian G. Agee, San Jose, CA (US)

(72) Inventor: Brian G. Agee, San Jose, CA (US)

(*) Notice: Subject to any disclaimer, the term of this patent is extended or adjusted under 35 U.S.C. 154(b) by 579 days.

(21) Appl. No.: 17/875,757

(22) Filed: Jul. 28, 2022

(65) Prior Publication Data

US 2022/0404454 A1 Dec. 22, 2022

Related U.S. Application Data

(63) Continuation of application No. PCT/US2021/016334, filed on Feb. 3, 2021.

(60) Provisional application No. 63/138,300, filed on Jan. 15, 2021, provisional application No. 62/969,264, filed on Feb. 3, 2020.

(51) Int. Cl.
*G01S 5/02* (2010.01)
*G01S 1/04* (2006.01)

(52) U.S. Cl.
CPC ........ *G01S 5/02213* (2020.05); *G01S 1/0428* (2019.08); *G01S 1/045* (2013.01); *G01S 5/0205* (2013.01); *G01S 2205/03* (2020.05)

(58) Field of Classification Search
CPC ............................ G01S 5/02213; G01S 5/0268
See application file for complete search history.

(56) References Cited

U.S. PATENT DOCUMENTS

| 8,130,141 B2 | 3/2012 | Pattabiraman et al. |
| 8,917,209 B2 | 12/2014 | Krasner et al. |
| 9,035,829 B2 | 5/2015 | Raghupathy et al. |
| 9,119,165 B2 | 8/2015 | Krasner et al. |
| 9,176,217 B2 | 11/2015 | Krasner et al. |
| 9,286,490 B2 | 3/2016 | Raghupathy et al. |
| 9,322,900 B2 | 4/2016 | Sendonaris et al. |
| 9,326,105 B2 | 4/2016 | Pattabiraman et al. |
| 9,629,111 B2 | 4/2017 | Singh et al. |
| 9,645,249 B2 | 5/2017 | Krasner et al. |
| 9,720,071 B2 | 8/2017 | Sendonaris et al. |
| 9,739,872 B2 | 8/2017 | Krasner et al. |
| 9,784,815 B2 | 10/2017 | Sendonaris |
| 9,797,982 B2 | 10/2017 | Sendonaris et al. |

(Continued)

FOREIGN PATENT DOCUMENTS

| WO | 2016133719 | 8/2016 |
| WO | 2021/209117 | 10/2021 |

OTHER PUBLICATIONS

International Search Report and Written Opinion for International application No. PCT/US2021/016334, Oct. 18, 2021.

(Continued)

*Primary Examiner* — Barry W Taylor
(74) *Attorney, Agent, or Firm* — Steven J Shattil

(57) ABSTRACT

Co-channel beacon transmissions are provided with at least one of spectral redundancy and temporal redundancy. A receiver produces a snapshot of a superposition of received co-channel beacon transmissions. Subcarrier demodulation, code nulling, or a Class-C linear minimum-mean-square error (MMSE) operation separates multiples ones of the co-channel beacon transmissions or eliminates inter-symbol interference and inter-subcarrier interference in the snapshot. Receiver operations can be performed at a network user, a network node, or a network operations center.

52 Claims, 23 Drawing Sheets

(56) References Cited

U.S. PATENT DOCUMENTS

| | | | |
|---|---|---|---|
| 9,801,153 | B2 | 10/2017 | Raghupathy et al. |
| 9,813,877 | B1 | 11/2017 | Chrabieh |
| 9,874,624 | B2 | 1/2018 | Mahmood et al. |
| 9,897,684 | B2 | 2/2018 | Sendonaris et al. |
| 9,913,273 | B2 | 3/2018 | Seibert |
| 9,933,526 | B2 | 4/2018 | Gates et al. |
| 9,961,559 | B2 | 5/2018 | Chrabieh |
| 9,967,845 | B2 | 5/2018 | Raghupathy et al. |
| 10,013,860 | B2 | 7/2018 | Hewett |
| 10,042,037 | B2 | 8/2018 | Chrabieh |
| 10,175,945 | B2 | 1/2019 | Kalkunte et al. |
| 10,194,269 | B2 | 1/2019 | Venkataraman et al. |
| 10,194,395 | B2 | 1/2019 | Raghupathy et al. |
| 10,203,397 | B2 | 2/2019 | Sendonaris et al. |
| 10,231,201 | B2 | 3/2019 | Meiyappan et al. |
| 10,386,474 | B2 | 8/2019 | Hewett |
| 10,444,369 | B2 | 10/2019 | Raghupathy et al. |
| 10,470,184 | B2 | 11/2019 | Seibert |
| 10,598,757 | B2 | 3/2020 | Gates et al. |
| 10,845,453 | B2 | 11/2020 | Markhovsky |
| 10,863,313 | B2 | 12/2020 | Markhovsky |
| 10,880,678 | B1 | 12/2020 | Chrabieh |
| 11,215,691 | B2 | 1/2022 | Hewett |
| 2003/0123384 | A1 | 7/2003 | Agee |
| 2007/0257831 | A1 | 11/2007 | Agee |
| 2008/0151831 | A1* | 6/2008 | Khan ............ H04L 1/0668 370/330 |
| 2017/0350985 | A1 | 12/2017 | Agee |
| 2023/0184877 | A1* | 6/2023 | Barbu ............ G01S 5/0205 455/456.1 |
| 2023/0273287 | A1* | 8/2023 | Wigren ............ G01S 5/0294 342/451 |

OTHER PUBLICATIONS

Written Opinion of the International Preliminary Examining Authority for International application No. PCT/US2021/016334, Mar. 22, 2022.
B. Agee, "Resilient Distributed Positioning Networks: A New Approach to Extreme Low-Latency, High-Precision Positioning and Timing"; Proceedings of the 2021 International Technical Meeting of The Institute of Navigation, Jan. 25-28, 2021.
Y. Wang, et al.; "Designing Dual-Tone Radio Interferometric Positioning Systems"; IEEE Transactions on Signal Processing, vol. 63, No. 6, Mar. 15, 2015.
A. Sekaran, et al.; "Viability of Pilot Beacons as an Indoor Positioning System"; Economics, Computer Science 2011.
C. Bartone; "A Terrestrial Positioning and Timing System (TPTS)"; Proceedings of the 2012 IEEE/ION Position, Location and Navigation Symposium, Apr. 23-26, 2012.
C. Rizos, et al.; "A hybrid system for navigation in GPS-challenged environments: Case study"; Proceedings of the 21st International Technical Meeting of the Satellite Division of The Institute of Navigation (ION GNSS 2008) Sep. 16-19, 2008.
C. Rizos, et al.; "Background and Recent Advances in the Locata Terrestrial Positioning and Timing Technology"; Sensors 19(8):1821; DOI:10.3390/s19081821; Apr. 2019.
C. Laoudias, et al.; "A Survey of Enabling Technologies for Network Localization, Tracking, and Navigation"; IEEE Communications Surveys & Tutorials ( vol. 20, Issue: 4, Fourthquarter 2018).
C. Yang, et al.; "Opportunistic Use of Metropolitan RF Beacon Signals for Urban and Indoor Positioning"; Proceedings of the 29th International Technical Meeting of the Satellite Division of The Institute of Navigation (ION GNSS+ 2016); Sep. 12-16, 2016.
Nestwave; "Minimizing Power Budgets to Enable Geolocation on Every IoT Device"; https://nestwave.com/2022/06/29/minimizing-power-budgets-to-enable-geolocation-on-every-iot-device/ May 17, 2022.
S. Meiyappan; "MBS Indoor Timing Receiver Concept, Implementation, and Test Results"; WSTS 2017, Apr. 2017.
Nextnav, "Metropolitan Beacon System (MBS) ICD"; Version G1.0; 2014.
F. Van Graas, et al.; "Terrestrial GPS Augmentation with a Metropolitan Beacon System"; Presentation to: National Space-Based Positioning, Navigation, and Timing Advisory Board; Dec. 10, 2014.
IEEE Standard for Low Rate Wireless Networks; IEEE Std 802.15.4™ 2020 (Revision of IEEE Std 802.15.4 2015).
A. Hansen, et al.; "Complementary PNT and GPS Backup Technologies Demonstration Report"; DOT-VNTSC-20-07; Jan. 2021.
"Part 11: Wireless LAN Medium Access Control (MAC) and Physical Layer (PHY) Specifications"; IEEE Std 802.11ax™—2021 (Amendment to IEEE Std 802.11-2020); Feb. 9, 2021.
"Part 11: Wireless LAN Medium Access Control (MAC) and Physical Layer (PHY) Specifications"; IEEE Std 802.11ay™—2021 (Amendment to IEEE Std 802.11™—2020 as amended by IEEE Std 802.11ax™—2021); Mar. 25, 2021.
"Part 11: Wireless LAN Medium Access Control (MAC) and Physical Layer (PHY) Specifications Amendment 3: Wake-Up Radio Operation"; IEEE Std 802.11ba™—2021 (Amendment to IEEE Std 802.11™—2020 as amended by IEEE Std 802.11ax™—2021 and IEEE Std 802.11ay™—2021); Mar. 25, 2021.
J. Segev, et al.; "Next Generation Positioning Beyond Indoor Navigation"; IEEE 11-14/1193r0; Sep. 2014.
G. Kul, et al.; "IEEE 802.11 WLAN Based Real Time Indoor Positioning: Literature Survey and Experimental Investigations"; 9th International Conference on Future Networks and Communications (FNC-2014). Aug. 18, 2014.

* cited by examiner

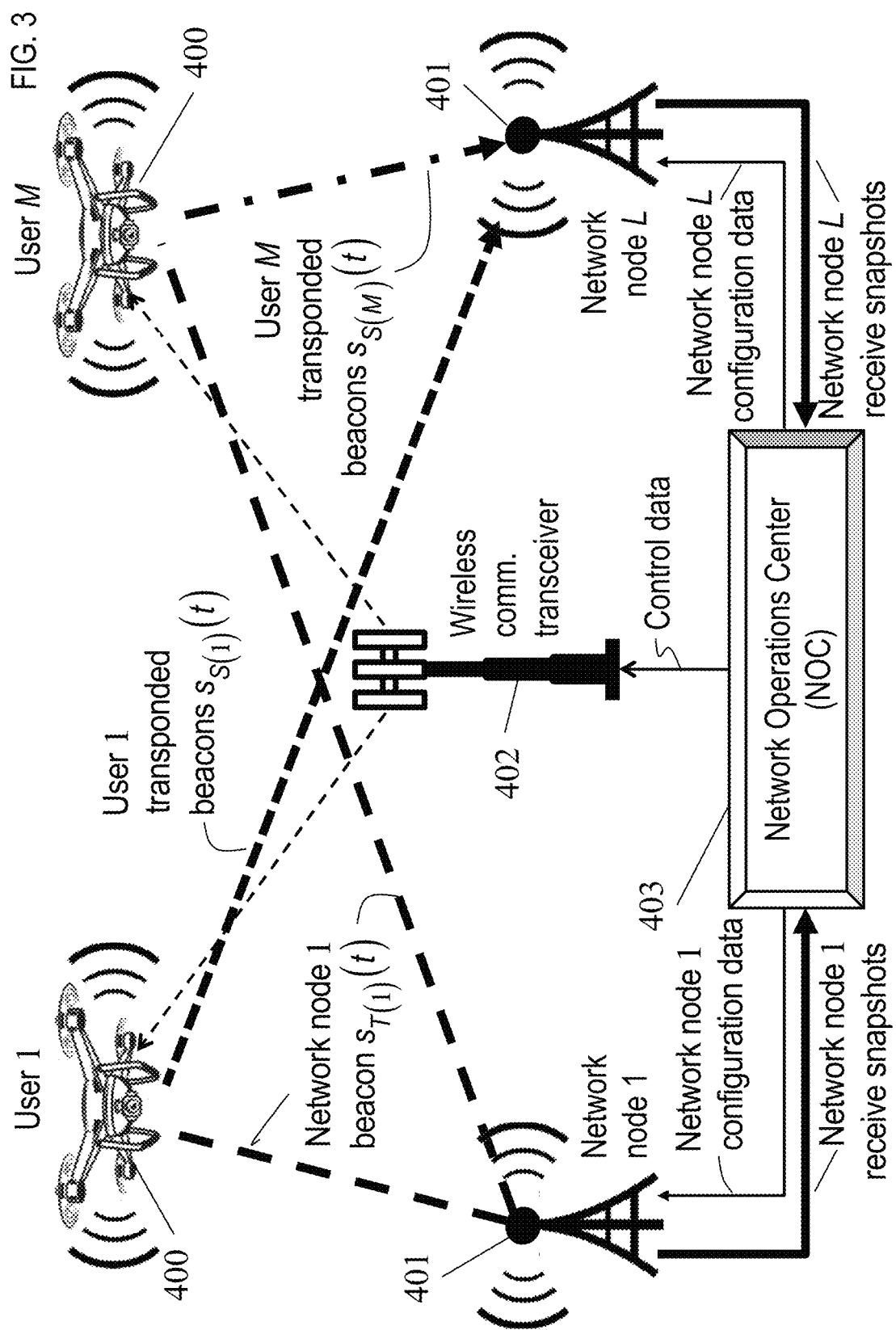

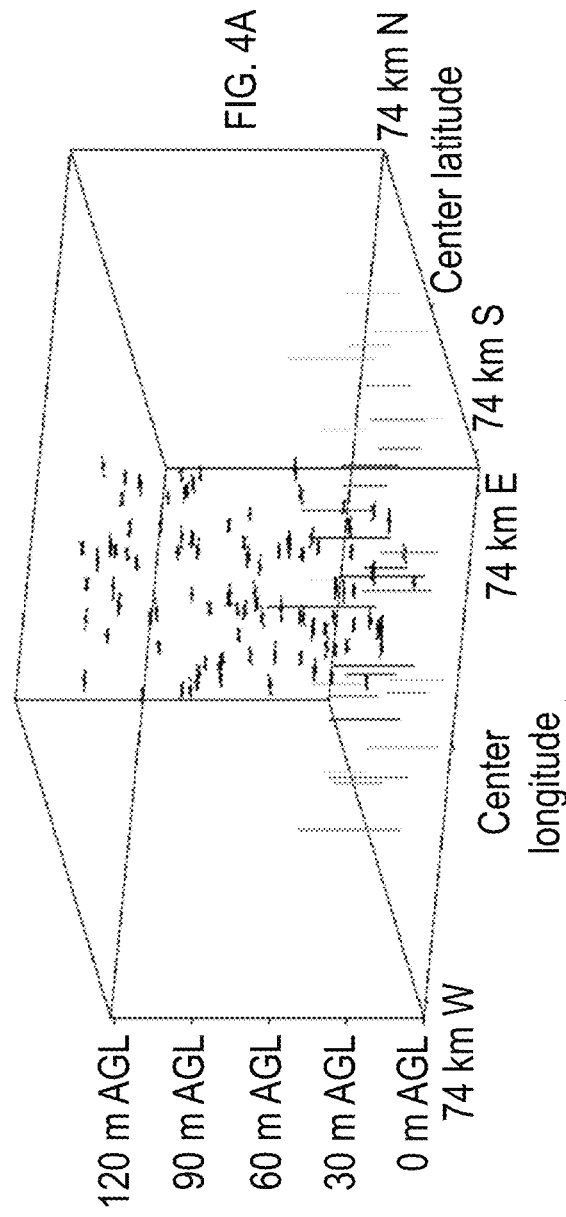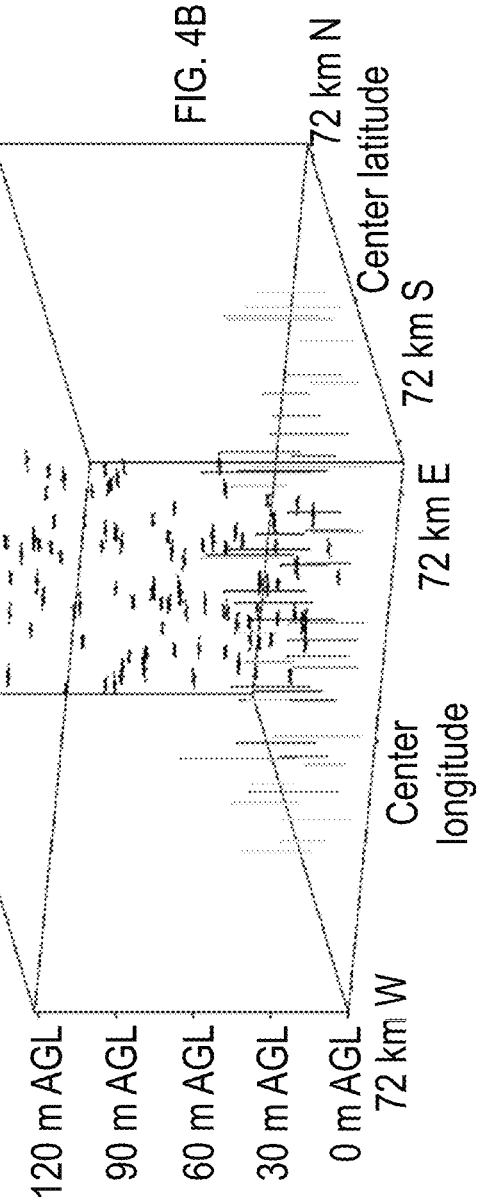
FIG. 4A
FIG. 4B

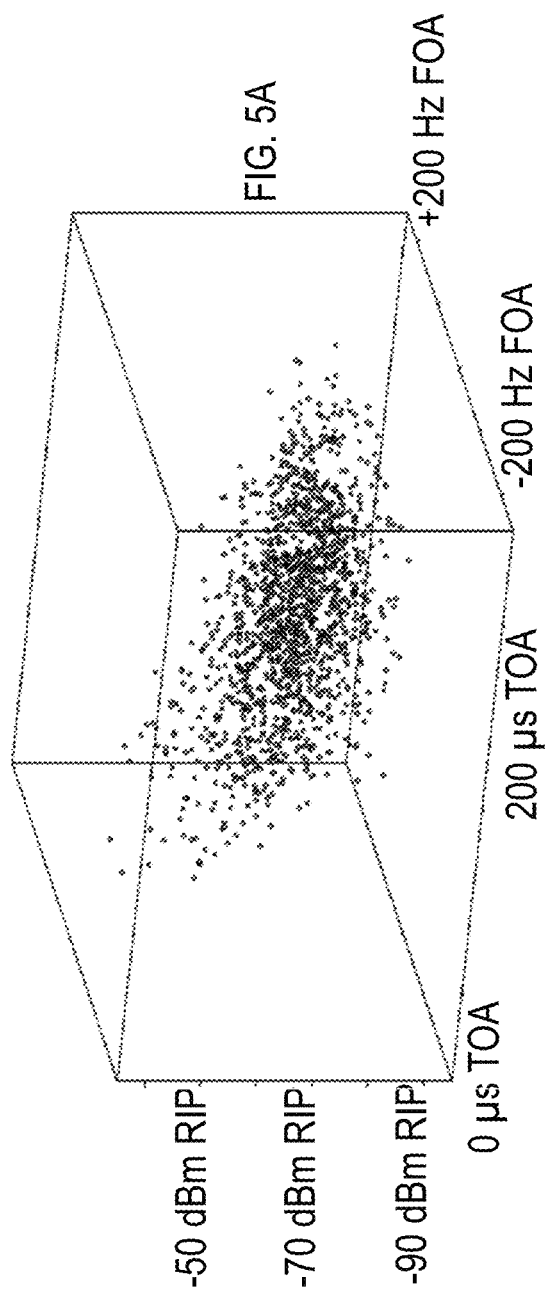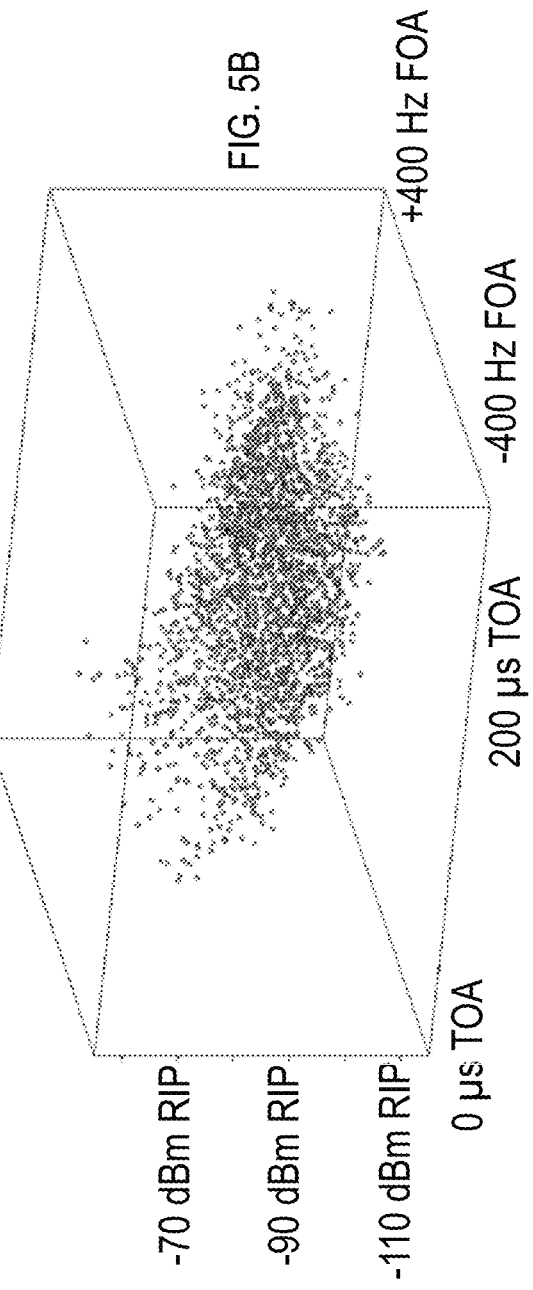

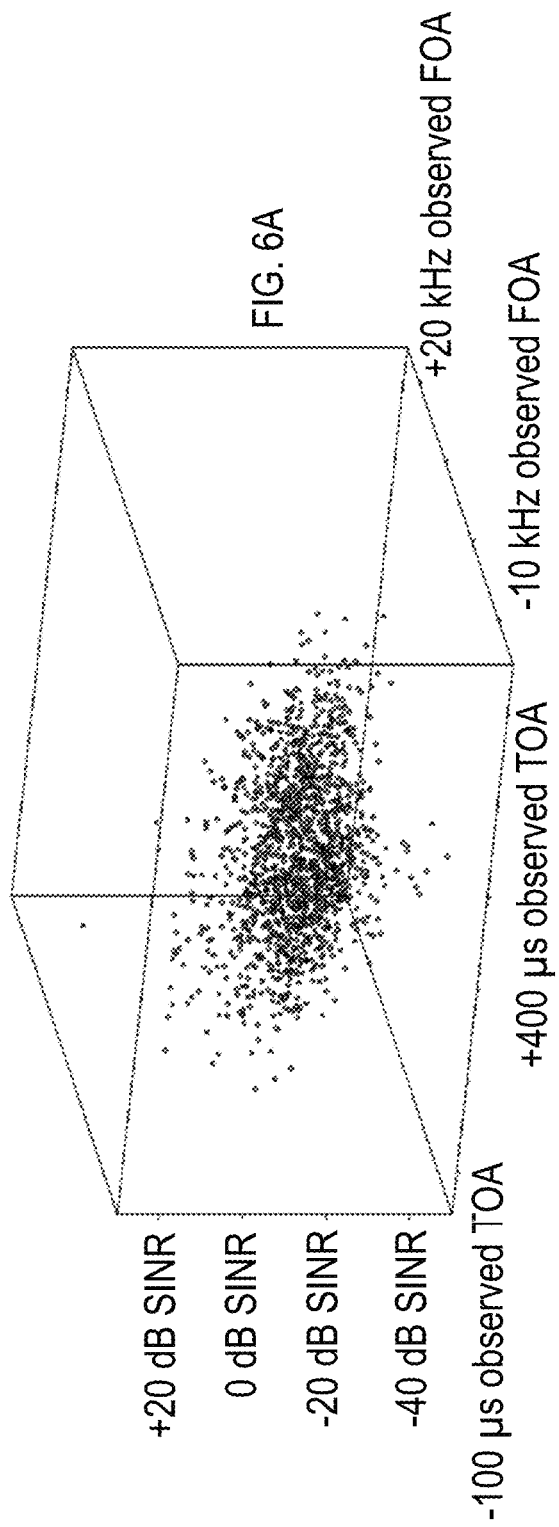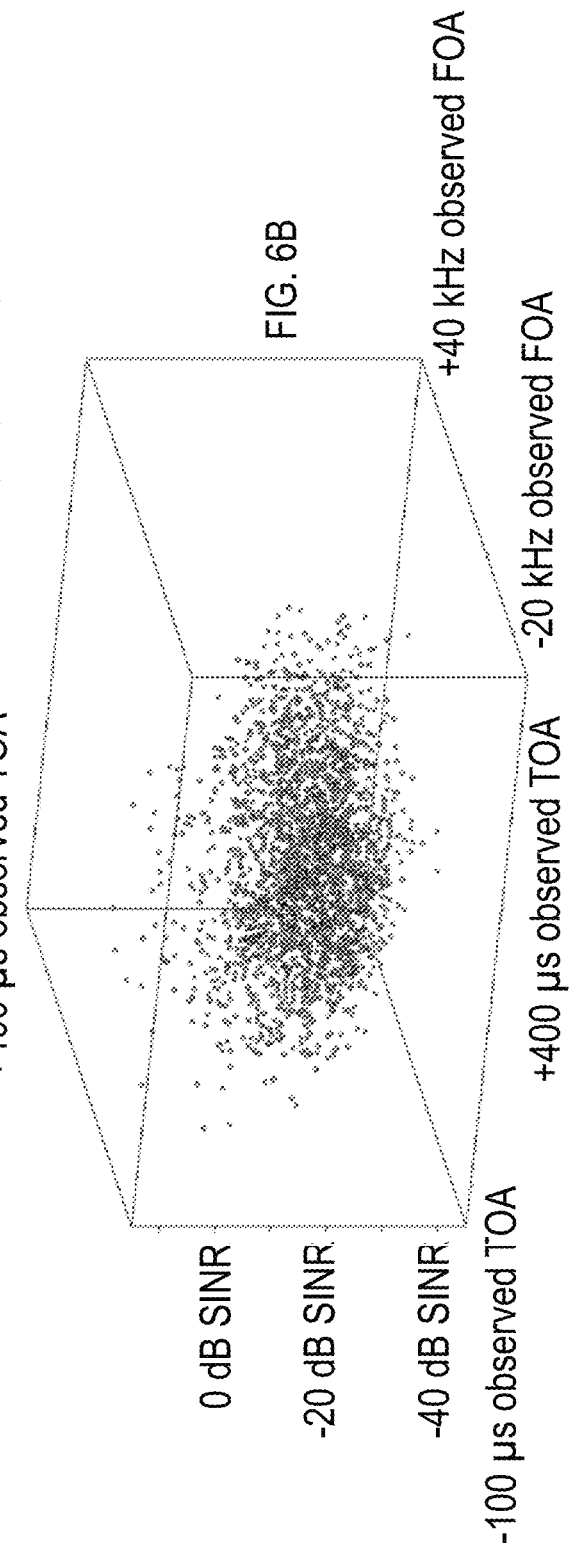

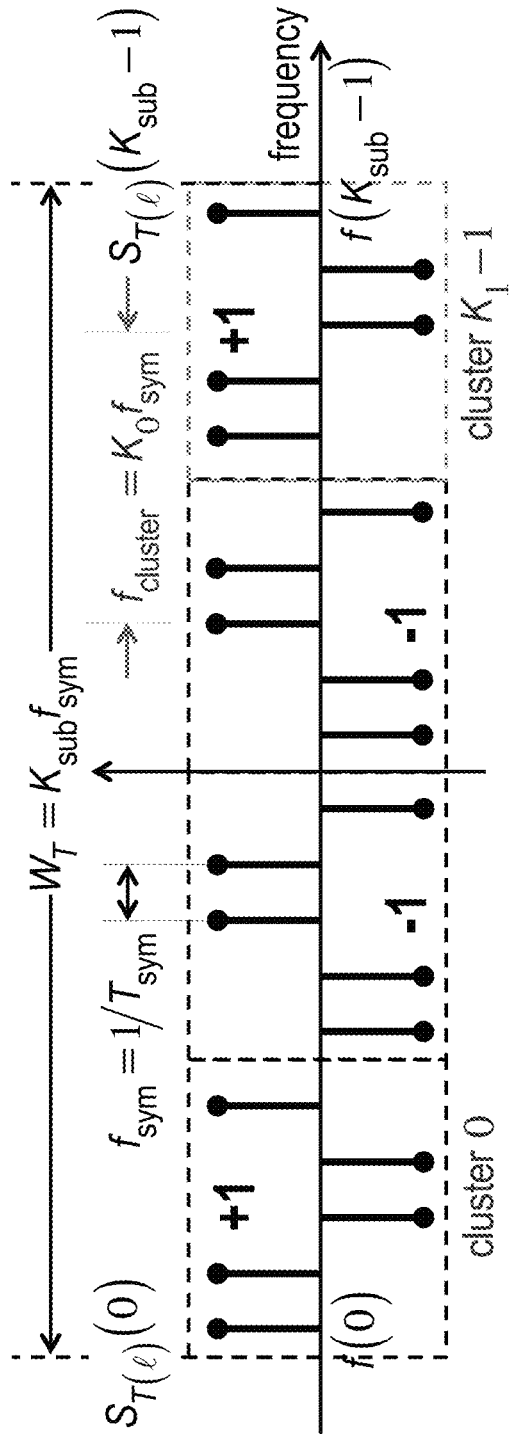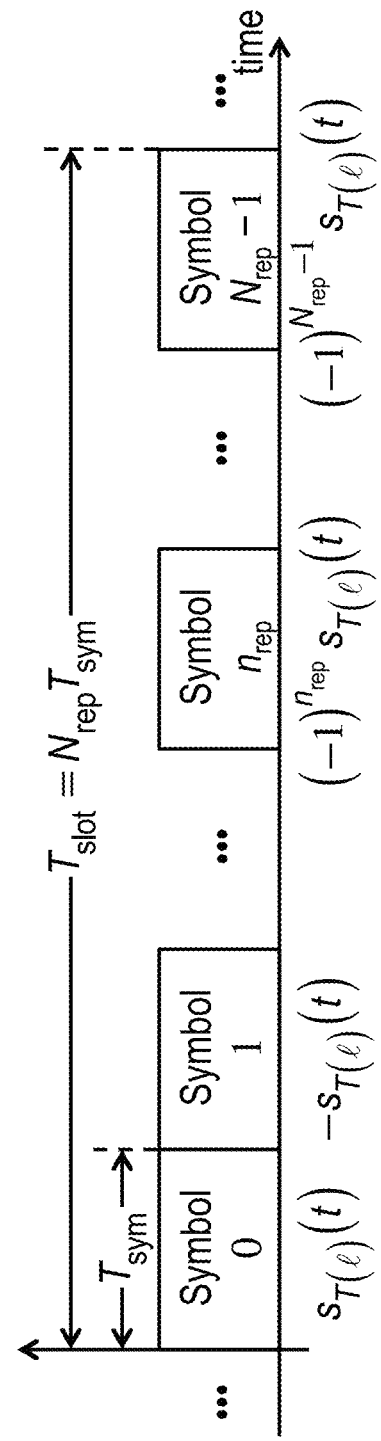
FIG. 9A
FIG. 9B

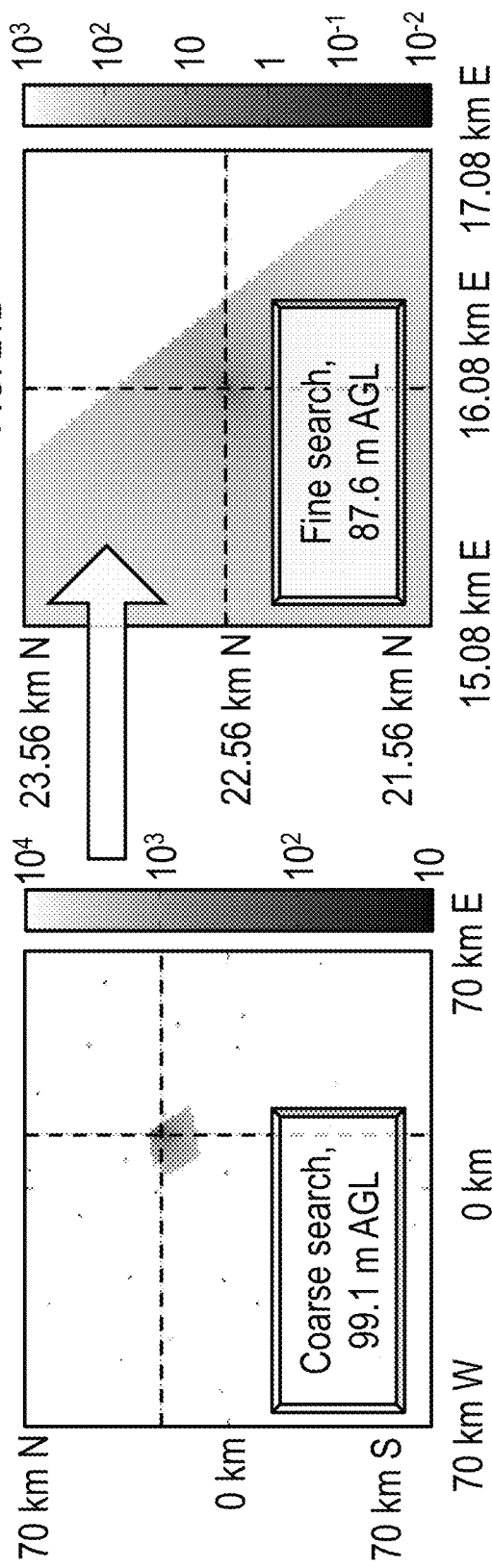

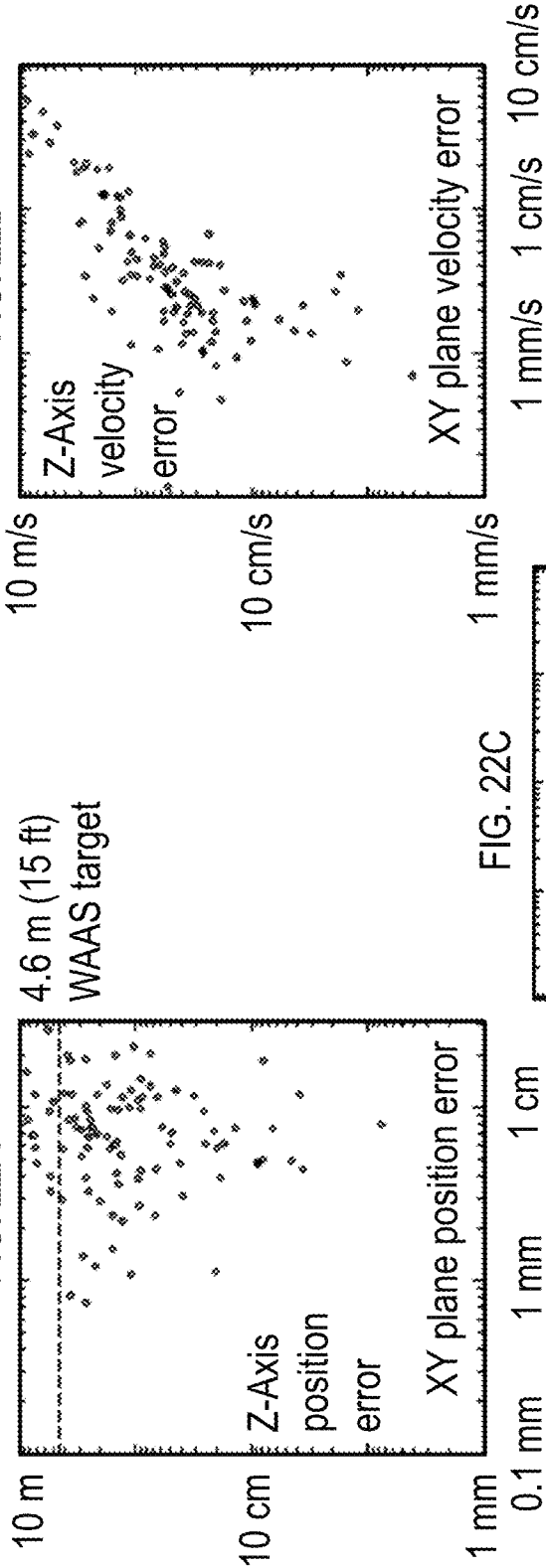
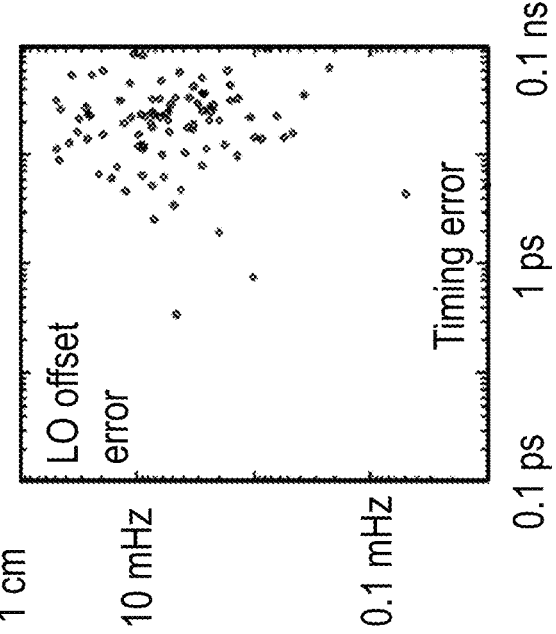
FIG. 22A
FIG. 22B
FIG. 22C

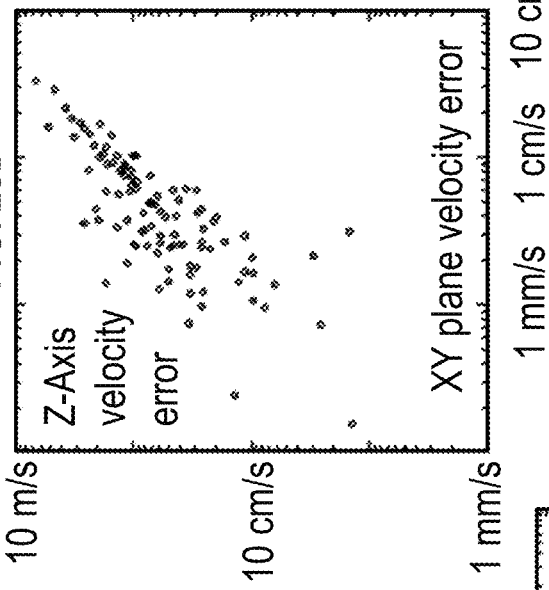
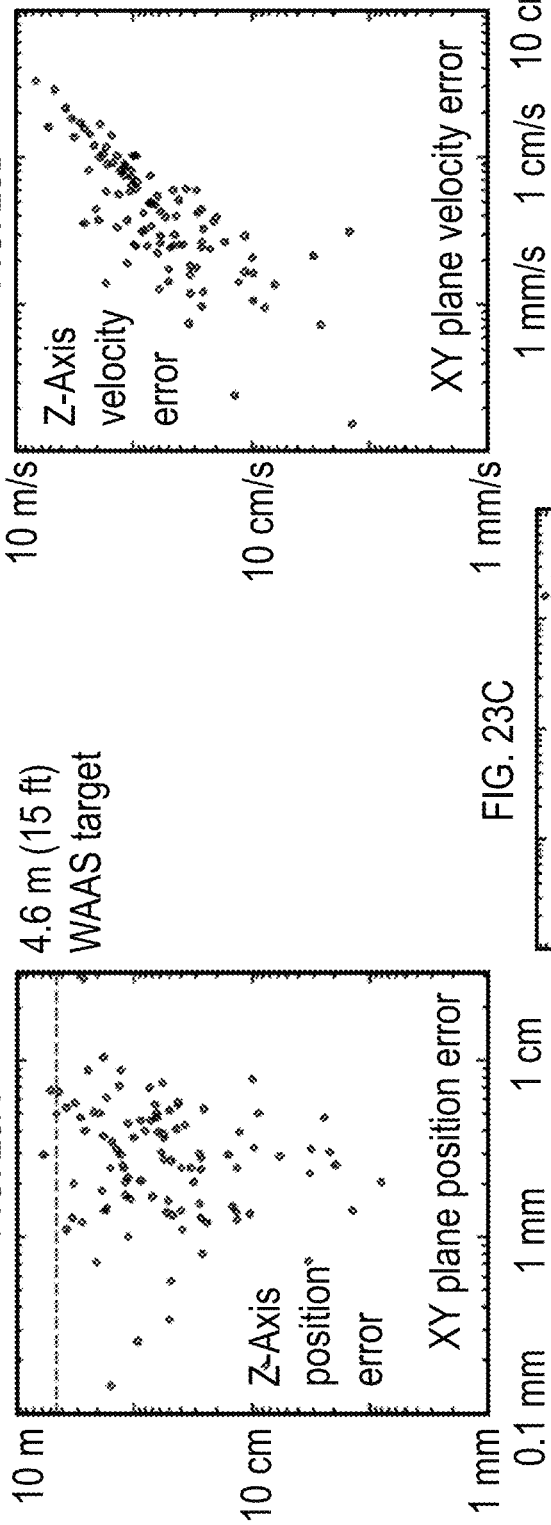
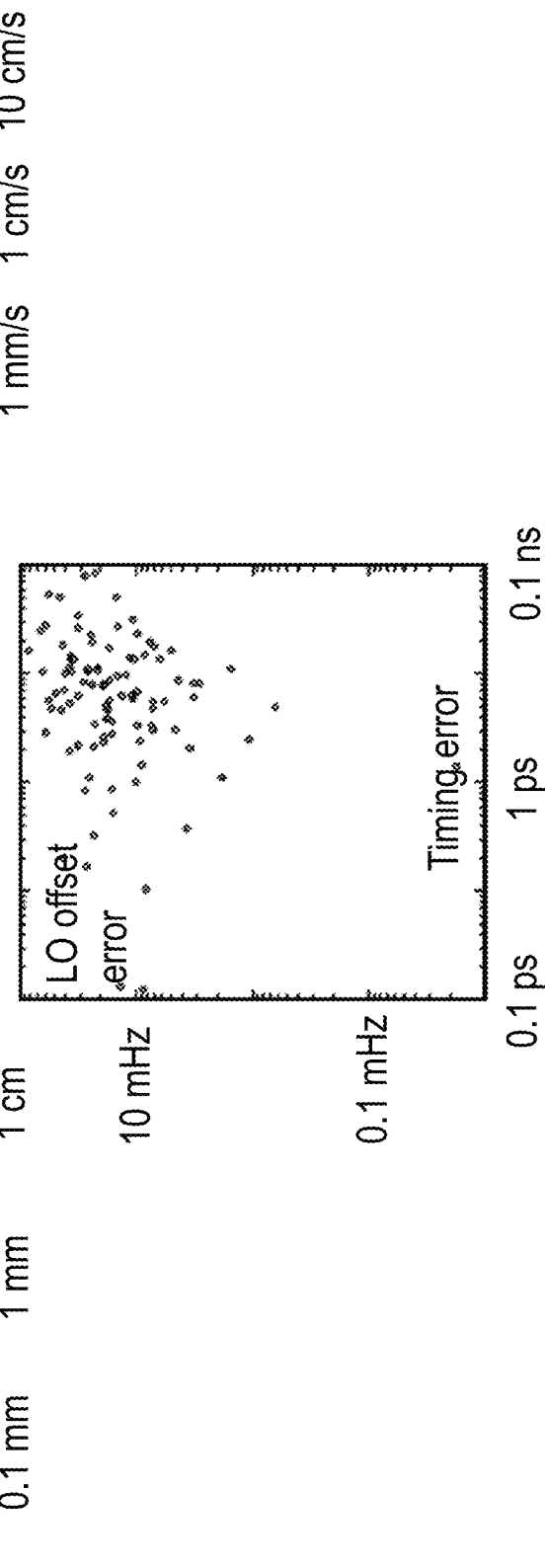

RESILIENT DISTRIBUTED POSITIONING NETWORKS

CROSS REFERENCE TO PRIOR APPLICATIONS

This application is a National Stage of PCT Appl. No. PCT/US21/16334, filed on Feb. 3, 2021, which claims the priority benefit of U.S. Patent Application Ser. No. 63/138,300, filed on Jan. 15, 2021, and claims the priority benefit of U.S. Patent Application Ser. No. 62/969,264, filed on Feb. 3, 2020, all of which are hereby incorporated by reference in their entireties.

BACKGROUND

Field

The following relates to methods, systems, and devices for positioning and timing using networks of beacon transmitters, which can provide combinations of high precision, resilience to co-channel interference, especially due to beacons transmitting on the same time and frequency channel, and security to jamming and spoofing attacks.

Description of Related Art

High-precision, low-latency positioning, navigation, and timing (PNT) will be critical to the success of next-generation outdoor systems for management and navigation of sUAS's and autonomous vehicles, and for next-generation indoor systems to enable the Industrial Internet of Things (IIoT) and meet the ±3 meter $80^{th}$ percentile Z-axis requirement (under review for reduction to ±2 meters) mandated by the Federal Communications Commission (FCC) for in-building E911 handset calls. In the nascent commercial drone industry, detection and avoidance of collisions between Class-1 (commercial class) small unmanned aerial systems (sUAS's), and between sUAS's and other objects, is already an issue as the popularity of sUAS's grow. Solving these issues will become critical as commercial ventures, such as Amazon and Google roll out their drone delivery services, creating both a dramatic increase in the density of such vehicles, and the need for beyond-visual-line-of-sight (BVLOS) command and control (C2) procedures to navigate them to their destinations. For this reason, fast, accurate, and cross-airspace shared PNT will be a critical component of next-generation UAS traffic management (UTM) systems operating below and outside conventional air traffic management (ATM) systems, such as the UTM pilot project (UPP) under development by NASA. Given the low altitudes and radar cross-section of class-1 sUAS's, which make them difficult to detect and localize using conventional ATM radars, the UTM concept relies on position reports from the sUAS's themselves, either on a regular basis during sUAS operations, or at request from UTM service suppliers (USS's) monitoring those operations. As the number and density of sUAS's grows, the timeliness and precision requirements for this positioning information will also grow.

Current PNT concepts provide this positioning information using signals received from global satellite navigation systems (GNSS), e.g., the Global Positioning System (GPS) operated and maintained by the United States, enabled by GNSS chipsets on-board the UAS's. With few exceptions (for example, B. Agee, "Blind Detection, Demodulation, and Separation of Civil GNSS Signals," in *Proc. 2016ION Joint Navigation Conference*, June 2016, and B. Agee, "Blind Civil GNSS Despreading for Resilient PNT Applications," U.S. Pat. No. 10,775,510, issued September 2020), these systems rely on "correlative" or "matched filter" methods that detect the GNSS signals and estimate their geo-observables, e.g., their time-of-arrival (TOA) and frequency-of-arrival (FOA) observed at the receiver, by correlating the received signals against replicas of the transmitted ranging codes, and searching over trial TOA's that compensate for the time-of-flight from the satellite vehicles (SV's) to the receiver, and trial FOA's that compensate for the Doppler shift between the satellite and receiver. In "cold start" scenarios where the specific ranging codes for satellites within the probable field of view (FoV) of the receiver are unknown, and where the receiver's internal clock is not synchronized to universal time coordinates (UTC), this requires further correlating the received signal against the entire library of possible ranging codes, e.g., 31 ranging codes for the 31 GPS satellites currently in orbit, and estimating the observed TOA's and FOA's between those signals and each of those replica codes, i.e., the additional unknown timing and carrier offset induced during the reception operation. The time-to-first-fix (TTFF) required to accomplish this search can take over 30 seconds in absence of any prior information about the satellite codes and timing/carrier offset relative to the receiver (cold-start TTFF), and can take 1-to-2 seconds if code lock has been lost for several hours (warm-start TTFF) or for a short time (hot-start TTFF), and is hugely power consumptive over that time period. Moreover, a full positioning and timing (P/T) solution requires knowledge of the ephemeris (trajectory over time) of the SV's, e.g., using the GPS satellite almanac transmitted over the GPS navigation signal, which takes 12.5 minutes to download in its entirety. Even then, acquisition of at least four GPS signals is needed to provide an initial P/T solution.

In addition, GNSS ranging signals have inherent low received incident power (RIP), due to propagation from satellites in medium-Earth orbit (MEO), or (for the Indian Navic and Japanese QZSS systems) geo-synchronous orbit (GSO). For example, GPS L1 C/A signals are mandated to have an RIP of at least −130 dBm at the ground, i.e., −20 dB signal-to-noise ratio (SNR) over the 2.046 MHz null-to-null bandwidth of that signal, assuming a 4 dB rolled-up receiver noise figure. These signals are easily suppressed by 10-to-20 dB in practice, e.g., due to attenuation by trees, foliage, and building walls, and can be lost entirely in valleys and urban canyons. At RIP's below −150 dBm (SNR's below −40 dB), acquisition can fail completely, e.g., due to suppression of the GPS signal down to or below the noise floor, even after despreading the signal down to the 50 bit-per-second (bps) GPS navigation signal rate (~43 dB processing gain), or due to "false lock" caused by nonzero (−24 dB) cross-correlation between the 1,023-chip C/A replica codes and actual codes received from the GPS SV's (for example, A. Brown, P. Olsen, "Urban/Indoor Navigation Using Network Assisted GPS," in *Proc. ION $61^{st}$ Annual Meeting*, pp. 1-6, June 2006). GNSS solutions are also vulnerable to systematic (or systemic?) errors due to ionospheric propagation, satellite positioning and timing errors, and (esp. for low altitude aircraft or in urban environments) specular multipath.

In re UTM applications, stable sub-meter altitude accuracy needed for GPS-based commercial aircraft landing systems, and expected to be required for accurate UAS traffic management, can require minutes to hours to achieve, even using the wide area augmentation system (WAAS) to improve positioning precision. In addition, sUAS receivers are especially vulnerable to co-channel interference (CCI), e.g., intentional jamming of sUAS platforms, or inadvertent jamming due to so-called "personal privacy devices (PPD's)", due to the large FoV of sUAS's at even modest altitudes, and typical line-of-sight (LOS) propagation between the interferers and the sUAS's. All of these issues can cause critical lapses in positioning capability at low altitude and in dense deployment scenarios, where errors of a few feet can inordinately increase the risk of sUAS's colliding with each other, or with buildings, ground vehicles, or even people.

Lastly, it is recognized that GPS based systems have difficulty providing centimeter-level horizontal precision accuracy and 10 millisecond tracking capability needed for autonomous vehicles. For this reason, Verizon recently announced rollout of a nation-wide network of reference stations to enable real-time kinematics (RTK), a method for enhancing reliability of GPS signals by using carrier phase, in addition TOA and FOA, as a positioning geo-observable. As described in I. Miller, C. Cohen, R. Brumley, W. Bencze, B. Ledvina, T. Holmes, M. Psiaki, "Systems, Methods, Devices and Subassemblies for Rapid-Acquisition Access to High-Precision Position, Navigation and/or Timing Solutions," U.S. Pat. No. 9,360,557, issued June 2016, RTK has long been used to provide precise point positioning (PPP) and timing measurements in surveying and high-accuracy timing applications; however, it requires both careful calibration of system phase offset at the GPS transmitters and the user receivers, e.g., induced by the mixer local-oscillators (LO's), cabling, and filtering modules in both devices; and a means for resolving the cycle ambiguity in the carrier phase geo-observable; hence the need for a reference network, to perform both the system calibration, and at least partially reduce cycle ambiguity. Moreover, LO phase noise induced at either end of the link can require rapid tracking of this system phase, and/or expensive LO's and/or ancillary receiver hardware to precisely control or calibrate and compensate that phase noise. For this reason, stand-alone RTK-enabled systems can take as long as 30 minutes to achieve precise solutions. Moreover, the approach is inherently vulnerable to time-varying multipath, e.g., Jakes Law multipath caused by vehicle motion in vicinity of near-field scatterers, which can affect stability of RTK-based solutions even when using precise reference systems. Currently available RTK systems, such as Swift Navigations' Skylark Cloud-based reference station and Starling positioning engine, claim RTK convergence in as little as 20 seconds, and reacquisition time of 1 second, however, they can only provide an 80% circular error probability (CEP80) of >10 centimeters, and only for fixed users (tracking capability has not been provided for either product).

In response to these issues, a number of alternative navigation (AltNav) solutions have been advanced over the years. These include Locata's "LocataLite" beaconing system, as described in J. Cheong, X. Wei, N. Politi, A. Dempster, C. Rizos, "Characterizing the Signal Structure of Locata's Pseudolite-Based Position System," in *Proc. 2009IGNSS Symposium*, December 2009, and C. Rizos, L. Yang, "Background and Recent Advances in the Locata Terrestrial Positioning and Timing Technology," *Sensors* 2019, 19(8), 1821, April 2019, and NextNav's Metropolitan Beacon System (MBS), described in F. Van Grass, S. Meiyappan, "Terrestrial GPS Augmentation with a Metropolitan Beacon System," presented to National Space-Based Positioning, Navigation, and Timing Advisory Board, December 2014, and J. Vogedes, G. Pittabiraman, A. Raghupathy, A. Sendonaris, N. Shaw, M. Shekhar, *Metropolitan Beacon System (MBS) ICD (an Implementation of a Terrestrial Beacon System)*, v. G1.0, April 2014, which has been incorporated into LTE Release 13, both of which employ DSSS ranging signals and correlative despreading methods at the receiver; Satelles' Iridium-based system, e.g., D. Whelan, G. Gutt, "Cells Obtaining Timing and Positioning by Using Satellite Systems with High Power Signals for Improved Building Penetration," U.S. Pat. No. 9,213,103, issued Dec. 15, 2015, which exploits narrowband (~25 kHz) signals transmitted from low-Earth orbiting (LEO) Iridium SV's; and systems exploiting "signals of opportunity" (SOP's), e.g., M. Rabinowitz, J. Spilker, S. Furman, D. Rubin, H. Samra, D. Burgess, G. Opshaug, J. Omura, "Positioning and Timing Transfer Using Television Synchronization Signals," U.S. Pat. No. 8,233,091, issued Jul. 31, 2012, which exploit cellular and broadcast television signals transmitted from known positions with known time-synchronized signal components. These solutions address some, but not all of GNSS vulnerabilities, and possess weaknesses of their own. In particular, the pseudolite, LocataLite, and NextNav systems are highly vulnerable to "near-far" interference caused by extreme differences in pathloss between transmit nodes. Mitigation of this issue requires either excessive integration time to separate co-channel signals using correlative methods, or transmission of signals over widely separated frequency channels or time slots to avoid it entirely. NextNav's system, for example, separates signals into ten 100 ms time slots separated by 1 second in time, which requires continuous reception over 5-6 seconds for a cold-start TTFF and 1 second for a warm-start TTFF, and even then provides an initial median horizontal positioning accuracy (CEP50) of 30 meters in outdoor environments (Van Grass, slides 13) and 4 meters in optimized "local" environments, e.g., campuses, malls, and warehouse-like areas (Van Grass, slides 16). Similarly, although Locata has reported centimeter-level accuracy for its 10.23 Mcps ranging system (Rizos), that accuracy requires time-hopping its signal by a factor of 10 (Cheong), yielding the same TTFF as GPS systems.

Although Satelles' system can exploit the much higher RIP and Doppler shift afforded by Iridium's network of LEO SV's, the Iridium signal requires at least one 4.32 second (48-frame) superframe, and typically two-to-three superframes (8.64-12.96 seconds), to acquire and obtain satellite ephemeres from the Iridium Ring Channel. Moreover, the 25 kHz×GPS signal bandwidth provides an inherently poor TOA geo-observable estimate on a per-slot basis, requiring many minutes to provide <100 ns timing synchronization, e.g., as SV's come into the receivers' FoV.

Other solutions use Bluetooth Low Energy (BLE) beacons, LTE position reference signals (PRS's), and 802.11-based positioning systems. None of these systems can provide the accuracy and latency required for next-generation 5GNR systems, e.g., 3 meter XYZ location accuracy, <1 second TTFF and 20 ms latency, and 0.5 meter/second XYZ velocity accuracy. Nor can they meet the FCC's 2024 goal of ±3 meter 80% Z-Axis handset positioning accuracy for E911 applications.

SUMMARY

Aspects of the disclosure can overcome these issues, using resilient distributed positioning networks (RDPN), in which multiple network-provisioned co-channel navigation beacons are transmitted from a network of nodes (e.g., network nodes) to users on a common frequency channel; network-provisioned co-channel beacons are transmitted from users and received at network nodes; or navigation beacons transmitted from network notes, transponded through users, and received by network nodes. The disclosure describes aspects and features that overcome vulnerabilities of existing PNT systems. These aspects and features include (but are not limited to) the following:

Using flexible purpose-built multitone navigation signals, which can be similar to discrete multitone (DMT) signals used in asymmetric digital subscriber line (ADSL) cable systems, the LTE single-carrier frequency-division multiple-access (SC-FDMA) uplink or orthogonal frequency-division multiplexed (OFDM) downlink signal, or 802.11 or 802.16 signals, but with symbol durations and subcarrier frequency spacings matched to TOA's and FOA's expected for applications anticipated for the network. This is as opposed to the "one-size-fits-all" GNSS design, which must provide worldwide coverage and accommodate wide TOA and FOA ranges between GNSS transmitters and receivers. In particular, an aspect described herein employs symbol durations and subcarrier frequency separations expected for Class-1 small unmanned aircraft systems (sUAS's), which operate at a 122 meter (400 foot) nominal maximum altitude above ground level (AGL), and a 44.7 meter/second (100 mile/hour) maximum airspeed. Assuming the RDPN network nodes are deployed at altitudes of 50-150 feet AGL, e.g., on cellular towers, the maximum line-of-sight between any sUAS and network node operating at or below these altitudes are limited to 73.4 kilometers under spherical Earth assumptions with a refractive index 4/3, thereby limiting link TOA's to less than 245 μs. Similarly, given the maximum sUAS airspeed constraint, the link FOA's are within ±140 Hz in the 902-928 MHz ISM band, and ±340 Hz in the 2.4-2.485 GHz band. This compares to the 67-94 ms TOA range and ±6 kHz FOA range obtaining for L-band GNSS signals transmitted from MEO.

Spreading the subcarriers using a stacked-carrier spread spectrum (SCSS) modulation format (e.g., in B. Agee, "Stacked Carrier Discrete Multiple Tone Communication Technology and Combinations with Code Nulling, Interference Cancellation, Retrodirective Communication, and Adaptive Antenna Arrays," U.S. Pat. No. 6,128,276, issued October 2000), which is adapted to provide exploitable spectral, and in some aspects, temporal redundancy into those navigation signals. This much spectral redundancy allows the P/T computer to use proven, mature, and highly resilient code nulling or Class-C linear minimum-mean-square error (LMMSE) methods that can separate those co-channel received beacons with quality limited only by the received signal-to-noise ratio (SNR) of those signals, rather than the received signal-to-interference ratio (SIR) of those signals, and even in the presence of severe interference from close-in transmitters (near-far interference). In contrast to conventional correlative or matched-filter despreaders, which are limited by the receive signal-to-interference-and-noise ratio (SINR) of the signals, this allows transmission of beacons at the maximum power allowed by their design, or at regulatory power constraints imposed for the transmitting band, and allows the navigation receivers to achieve the full benefit of that high power without self-interference imposed by conventional correlative methods.

In some aspects, constructing the navigation signals using low-correlation, phase-modulated subcarrier components (inner and outer codes used to form the full SCSS subcarrier set) that are optimized to reduce the peak-to-average power ratio (PAPR) of the transmitted signals-in-space (SiS) to a 3-to-4 dB range, thereby greatly improving the cost and efficiency of the beacon transmitters. In the baseline instantiation, each signal is generated using a unique inner and outer code, known to the P/T solution computer, to generate the navigation signals, thereby providing a means to uniquely identify each received beacon during detection operations. To date, thousands of low-correlation, low-PAPR subcarrier components have been identified, allowing millions of unique subcarrier sets for each beacon.

At the P/T solution computer, using subcarrier demodulation methods that can realize the full signal-separation capability of the code-nulling approach, by eliminating both inter-symbol interference caused by high observed TOA of the beacons at the receiver (e.g., due to slant range between the beacon transmitters and receivers, and internal timing offset between the beacon transmitters and receivers), and inter-subcarrier interference caused by high observed FOA of the beacons at the receiver, e.g., due to movement of the beacon transmitters or receivers, and internal offset between local oscillators (LO's) used at the beacon transmitters and receivers).

Exploiting communication networks connected to both the users and a centralized network operation center (NOC) or Multi-Access Edge Computer (MEC), to both configure navigation signals used by the network, and to backhaul data snapshots or P/T solutions to the NOC. Among other advantages, this allows the navigation signals to be transmitted without modulation by navigation data, e.g., beacon configuration data, network node locations, or atmospheric impairment information. If needed, such information may be transmitted over ancillary wireless communication networks connected to the users. As a consequence, the navigation signal can be designed to optimize estimation of geo-observables needed for P/T solutions, minimize the TTFF of any positioning and timing solution (by eliminating time needed to obtain sufficient navigation information for such a solution), and/or reduce vulnerability to jamming and spoofing attacks on the network.

These features can eliminate the need for time slotting or hopping to avoid near-far interference, and allow geo-observables to be determined with high precision over much lower TTFF than competing methods. This precision and TTFF advantage can be traded against multiple system parameters, e.g., latency, available bandwidth, available power, etc., to meet the needs of the network or the users.

The disclosed RDPN aspects can be implemented in at least three network topologies:

Resilient distributed transmitter networks (RDTN's), in which geographically distributed network nodes at calibrated locations obtain beacon time symbols or configuration data from a network operating center (NOC) connected to those network nodes, e.g., a Multi-Access Edge Computer (MEC) or UAS Service Supplier (USS); generates beacon time symbols if needed; and transmits beacons comprising those beacon time symbols in the FoV of network users. In one aspect, a user collects snapshots of data covering the beacon transmission band, determines its own P/T solution using beacon configuration data obtained over a wireless communication network also connected to the NOC, e.g, an LTE, 4G, or 5GNR cellular network, 802.11 wireless local area network (WLAN), or 802.15 Zigbee or Bluetooth network; and optionally communicates that P/T solution to the NOC through the wireless communication network. In a second aspect, a user collects snapshots of data covering the beacon transmission band, and backhauls those snapshots to the NOC over the wireless communication link. The NOC then determines the P/T solution for that user, and optionally communicates that P/T solution to the user through the wireless communication network.

Resilient distributed receiver networks (RDRN's), in which users obtain beacon time symbols or beacon configuration data from a NOC over a wireless communication network also connected to that NOC, generate those beacon time symbols if needed, and transmit beacons comprising those beacon time symbols in the FoV of network nodes, at calibrated locations and connected to the NOC over a communication link. The network nodes then receive snapshots of data covering the beacon transmission band, and backhaul those snapshots to the NOC, which computes a P/T solution using network node locations and beacon configuration data, and optionally transmits that solution to the users through the wireless communication network.

Resilient distributed transceiver networks (RDXN's), in which a geographically distributed network nodes, at calibrated locations and connected to a NOC over a communication link, transmit beacons to users, which receive, condition, and retransmit the beacons without otherwise processing them. Network nodes in the FoV of the users then capture and backhaul snapshots of those retransmitted beacons to the NOC, which computes a P/T solution from those snapshots, and optionally transmits that solution to the users over the wireless communication link.

In some aspects, the RDPN's also deploy 2-6 calibration receivers, also connected to the NOC, to bring the network nodes into time and carrier synchronization, and/or provide time/carrier offsets used by the NOC during geolocation operations. The calibration receivers can also be used to locate network nodes, e.g., when they are first deployed in a theater of operations for the network. Other aspects perform these operations at the network nodes, using beacon calibration information provided over a low-rate data link.

This approach can provide a number of benefits not shared by any competing GNSS or non-GNSS method, including (but not limited to) any of the following:

Extremely rapid and precise time-to-first-fix (TTFF), due to ability to utilize the full SNR of the received beacons and avoid time slotting. In a large-area simulation performed for a commercial class-1 UAS traffic management instantiation, the approach demonstrates detection and geolocation of 100 class-1 sUAS's distributed over a 3,196 square-kilometer area (18 km radius circle) in ≤10 milliseconds, using a network of 50 network nodes distributed over a 16,480 square-kilometer area (40 km radius circle), each transmitting a co-channel beacon with a 19.2 MHz active bandwidth and 2,472 MHz carrier frequency (2.4 GHz channel 13, unused by 802.11 WLAN's inside the United States), and with a 30 dBm transmit power and 36 dBm transmit EIRP (compliant with FCC Part 15 requirements for the 2.4-2.485 MHz ISM band), without prior close knowledge of the beacon transmit frequencies and timing phases. For a 10 ms snapshot, the system geolocates the users with an 80% Z-Axis positioning error of 1.8 meters (all below 4.6 meters, i.e., the 15 foot WAAS Z-Axis target error), and with a 80% XY positioning error of 5 millimeters. The system further synchronizes the users to within an 80% clock timing and LO carrier offset estimation error of 44 picoseconds and 36 milliHertz, respectively, and a clock rate estimation error of 15 parts-per-trillion (ppt), or near-Stratum-1 performance.

Reduced size-weight-and-power (SWaP) and cost (SWaP-C) requirements at the users, by leveraging already existing gear on-board the users, and allowing the most complex operations to be performed at the central processing site. The only additional gear required at the user is a receiver (RDBN), transmitter (RDRN), or transponder (RDTN). Moreover, the power and bandwidth requirements of the network allow it to be implemented using inexpensive software-designed radio (SDR) products already on the market. For example, in one aspect, an RDPN can be achieved using a single HackRF One SDR module ($300 cost) at the user and network node, with an additional low-cost amplifier and antenna to boost the beacon transmission EIRP to 36 dBm.

Inherent resilience to multipath as well as co-channel interference. Specular multipath will create multiple replicas of the transmitted beacon, with separable features at the TOA and FOA of each reflection. The direct and reflection paths can each be detected, and their TOA's and FOA's estimated, using the same processing algorithm; moreover, the use of unique subcarrier components allows the multipath components to be uniquely associated to each beacon transmitter. Once estimated, the direct path component can be identified and used in subsequent geolocation operations; or, the entire multipath set can be used to further refine the user location using ray-tracing or radio fingerprinting methods (for example, the following references can be adapted to aspects disclosed herein: O. Hilsenrath, M. Wax, "Radio Transmitter Location Finding for Wireless Communication Network Services and Management," U.S. Pat. No. 6,026,304, issued February 2000, and M. Wax, O. Hilsenrath, "Signature Matching for Location Determination in Wireless Communication Systems," U.S. Pat. No. 6,108,557, issued August 2000).

Inherent physical security against malicious spoofers, repeaters, and narrowband/tonal jammers, through the use of unpredictably/randomly determined subcarrier components at the beacon generation site(s) and code nulling methods at the position/timing solution site(s). In particular, the approach provides inherent protection against man-in-the-middle (MiTM) attacks by preventing an attacker from overwhelming and supplanting an existing beacon at any receiver. In most cases, e.g., if the spoofer employs one or more subcarrier components that are outside the network, the spoofer will be excised during the resilient detection operation. At worst, the processing site will detect a rogue signal that can be identified in subsequent geolocation operations. Similarly, malicious repeaters will induce effects similar to multipath, resulting in detectable/separable signal replicas that can be identified in subsequent geolocation operations. In some aspects, the signal is modulated by an additional PHY "watermark" that can be used to unambiguously separate authorized and spoofing signals.

Inherent operational security in aspects in which the navigation signal generation and P/T solution computation operations are performed at a NOC. This feature allows the beacon transmitter and the receiver to be implemented using SDR gear that possesses no Black level COMSEC modules, and can be wiped in the event of capture by adversaries. Moreover, compromise or loss of one or even several network nodes will only result in a small degradation in the geolocation capability of the overall network.

Seamless extension to users or network nodes employing spatial/polarization diverse antenna arrays at their transmitters or receivers. Diverse receive arrays provide additional resilience to malicious wideband jammers, and allow implementation of copy-aided direction finding (DF) methods to determine the direction of arrival (DOA) of received beacons, and copy-enhanced DF methods to determine the DOA of the jammers. DOA can be used to further refine the geolocation and synchronization solution for the user, and to further determine their yaw-pitch-roll orientation. Diverse transmit arrays provide additional security and performance improvements, by providing means for the processing site to determine the directions of transmission (DOT's) from the beacon transmitters to the receivers, without any increase in complexity at those receivers, and even if the receiver is employing a single receive antenna. Among other advantages, this can provide a means for reliably identifying/excising spoofers and malicious repeaters from the received beacons, by correlating an actual and perceived location of the beacon transmitters using the unique DOT of those beacons (geolocking). In addition, this capability can be used to reduce the interferometric detection footprint of the beacon transmitter by the number of transmit antennas, thereby further improving the operational security of the network in military applications.

Extension to network instantiations with further security and scalability improvements, including incorporation of time-slots and frequency channels, and use of time-slotted channel-hopping (TSCH) protocols for beacon transmitters and receivers in the network. TSCH protocols can improve scalability of RDRN's and RDXN's, in order to keep the number of beacon transmissions below the beacon separation threshold of the method. At the same time, unpredictable TSCH methods can be employed, such as by adapting physical security methods (such as described in B. Agee, "Physically Secure Digital Signal Processing for Wireless M2M Networks," U.S. Pat. No. 9,648,444, issued May 2017, and B. Agee, "Generation of Signals With Unpredictable Transmission Properties for Wireless M2M Networks," U.S. Pat. No. 10,812,955, issued October 2020) for use in the disclosed aspects to further avoid MiTM attacks. This feature is especially attractive in RDTN's, e.g., if the network nodes are able to transmit continuously on all time slots and frequency channels, as the users can then choose any frequency channel to receive on over any time slot, allowing them to avoid channels with excessive interference, and completely confounding any attacker attempting to attack the user on any specific time slot or channel.

A first aspect relates to a method for transmitting beacon signals from network nodes to network users, transmitting beacon signals from the network users to the network nodes, and/or transponding beacon signals to and from the network nodes through the network users using bent-pipe transponders. The method comprises inducing at least one of spectral redundancy and temporal redundancy in the beacon signals; and exploiting the at least one of spectral redundancy and temporal redundancy to separate received beacon signals at the network users, the network nodes, or a central processing site.

The method of the first aspect may further comprise determining geo-observables from separated beacon transmissions. The method may further comprise determining positioning and/or timing from the geo-observables. The beacon signals may be separated with precision dictated by the power of the beacon signals above a receiver noise floor, and irrespective of other beacon signals received at the same time and frequency.

A second aspect relates to a method for transmitting beacon signals from network nodes to network users, transmitting beacon signals from the network users to the network nodes, or transponding beacon signals to and from the network nodes through the network users using bent-pipe transponders. The method comprises inducing at least one of spectral redundancy and temporal redundancy in each of the beacon signals, thereby enabling a receiver to exploit the at least one of spectral redundancy and temporal redundancy to separate multiples ones of the beacon signals in a snapshot of received signals.

A third aspect relates to a method, comprising generating a snapshot of a received plurality of beacon transmissions, each of the plurality of beacon transmissions having at least one of spectral redundancy and temporal redundancy; and exploiting the at least one of spectral redundancy and temporal redundancy to separate multiples ones of the beacon transmissions in the snapshot.

In the third aspect, the generating and the exploiting may be performed at a network user or a network node. The generating may be performed at the network user and the exploiting may be performed at a NOC. The generating may be performed at the network node and the exploiting may be performed at the NOC. The generating may be performed at the network user and the exploiting may be performed at the network node.

In a fourth aspect, a method comprises receiving a snapshot of a received plurality of beacon transmissions, each of the plurality of beacon transmissions having at least one of spectral redundancy and temporal redundancy; and exploiting the at least one of spectral redundancy and temporal redundancy to separate multiples ones of the beacon transmissions in the snapshot.

A NOC may be configured to perform the method of the third aspect, wherein the snapshot is generated by a network user and received by the NOC via a wireless network; or wherein the snapshot is generated by a network node and received by the NOC via a backhaul network.

A fifth aspect relates to a method, comprising receiving a plurality of beacon transmissions to produce a received signal, each of the plurality of beacon transmissions having at least one of spectral redundancy and temporal redundancy; and generating a snapshot of the received signal, wherein the snapshot retains the at least one of spectral redundancy and temporal redundancy; and wherein the at least one of spectral redundancy and temporal redundancy is exploitable for separating the plurality of beacon transmissions. A network user or a network node may be configured to perform the method of the fifth aspect.

A sixth aspect relates to a method comprising synthesizing multitone beacon signals, wherein subcarrier spacing and symbol duration of the multitone beacon signals are selected according to an expected range of time-of-arrival and frequency-of-arrival for network users; inducing at least one of spectral or temporal redundancy on the multitone beacon signals; and transmitting the multitone beacon signals to the network users.

A seventh aspect relates to a method comprising receiving multiple multitone beacon signals; and exploiting spectral redundancy in the multiple multitone beacon signals to use code nulling or Class-C linear minimum-mean-square error methods to separate the multiple multitone beacon signals.

Some aspects relate to an apparatus, comprising at least one processor and at least one memory in electronic communication with the at least one processor, and instructions stored in the at least one memory. The instructions executable by the at least one processor may perform the method of any of the above aspects.

Some aspects relate to a computer program product, comprising a computer readable hardware storage device (such as a non-transitory computer-readable memory) having computer-readable program code stored therein, wherein the program code contains instructions executable by one or more processors of a computer system for performing any of the methods of the above aspects.

Some aspects relate to an apparatus comprising a means for performing each step in any of the methods of the above aspects.

An eight aspect relates to an apparatus, comprising a means for transmitting beacon signals from network nodes to network users, a means for transmitting beacon signals from the network users to the network nodes, and/or a means for transponding beacon signals to and from the network nodes through the network users using bent-pipe transponders. The apparatus further includes a means for inducing at least one of spectral redundancy and temporal redundancy in beacon transmissions; and a means for exploiting the at least one of spectral redundancy and temporal redundancy to separate received beacon transmissions at the network users, the network nodes, or a central processing site. The apparatus may further comprise a means for determining geo-observables from separated beacon transmissions, and a means for determining positioning and/or timing from the geo-observables.

The means for transmitting beacon signals from network nodes to network users can include geographically distributed network nodes at calibrated locations, which can be communicatively coupled to a means for central processing. The means for transmitting beacon signals may include an RDPN or an RDTN. Exemplary network nodes include fixed outdoor transmitters co-located with cellular transmission towers or 802.11 access points; indoor transmitters coexisting with 802.11 WLAN or 802.15 Bluetooth or Zigbee networks; or standalone transmitters. The means for central processing can include a NOC, e.g., a 5GNR MEC or a USS, which provisions each of the network nodes with configuration data or time symbols over a means for communicating data between the network nodes and the means for central processing. The means for communicating data can include an Ethernet-based network, a PLC network, an 802.11 WLAN, an 802.15 Zigbee or Bluetooth network, and/or a 3G, 4G LTE, or 5G cellular network. The means for transmitting beacon signals can include computer processors and computer-readable memory that programs the processors to generate and/or transmit the beacon signals.

The means for transmitting beacon signals from the network users to the network nodes can comprise a wireless communications apparatus onboard a user device configured to receive navigation signals or beacon configuration information from the means for central processing over an ancillary wireless communication link, and transmit beacon signals in the FoV of network nodes configured to receive the beacon signals. Furthermore, the means for transmitting beacon signals can comprise means for generating the beacons signals. The means for transmitting beacon signals can include computer processors and computer-readable memory that programs the processors to generate and/or transmit the beacon signals.

The means for transponding beacon signals can comprise wireless communication transceivers that receive, condition, and retransmit the beacon signals without otherwise processing them. Network receivers (e.g., network nodes) in the FoV of the users then capture and backhaul snapshots of those retransmitted to the means for central processing, which can compute a P/T solution from the snapshots, and transmit the solution to the users over the ancillary wireless communication link. Thus, the means for transponding beacon signals can further comprise a wireless receiver for the ancillary wireless communication link. The means for transponding beacon signals can include computer processors and computer-readable memory that programs the processors to receive and transmit the beacon signals, and optionally, to receive the P/T solution. The means for transponding beacon signals may comprise an RDXN.

The means for inducing can include a modulator configured to perform subcarrier spreading modulation, such as SCSS modulation. In one example, an inner code is replicated over multiple clusters, each of which is modulated by one element of an outer code. Spectral redundancy can be achieved by spreading a narrowband signal with a wideband signal. The means for inducing can include a modulator configured to repeat a time symbol. Time symbols may be organized in slots, with multiple repetitions per slot. The means for inducing may include a computer processor and computer-readable memory that programs the processor to perform the spreading and/or repetition of symbols. A software-defined radio is one example of such a processor. The means for inducing may comprise a multitone modulator, which can employ a DFT, IDFT, FFT, IFFT, polyphase filter, and/or a discrete filter bank.

The means for exploiting can comprise any apparatus or computer program product having instructions that implement a resilient detection operation for excising CCI in a snapshot. The means for exploiting can comprise a subcarrier demodulator that eliminates inter-symbol interference and inter-subcarrier interference. The means for exploiting can perform code nulling or Class-C linear minimum-mean-square error (LMMSE) operations to separate co-channel received beacon signals with quality limited only by the received SNR of those signals, rather than the received SIR of those signals. The means for exploiting can further include spatial/polarization diverse antenna arrays at their transmitters or receivers, which allow for copy-aided DF methods to determine the DOA of the beacon signals, and copy-enhanced DF methods to determine the DOA of jammers. The means for exploiting may further comprise a means for channelizing.

The means for channelizing can comprise a DFT, such as a sparse DFT, a windowed DFT, or a combination thereof. Equivalent structure, such as filters configured for snapshot channelization, may be used. The means for channelizing can comprise any apparatus or computer program product having instructions that channelize a snapshot. In one aspect, the means for channelizing removes an estimated coarse (cold-start) or fine (warm/hot start) observed LO offset, and removes timing offset, if necessary. The means for channelizing may separate the snapshot into frequency subcarriers and time symbols using a windowed DFT.

A ninth aspect relates to an apparatus, comprising a means for generating a snapshot of a received plurality of beacon transmissions, each of the plurality of beacon transmissions having at least one of spectral redundancy and temporal redundancy; and means for exploiting the at least one of spectral redundancy and temporal redundancy to separate multiples ones of the beacon transmissions in the snapshot.

The means for generating the snapshot can comprise any apparatus or computer program product having instructions that, when directed to, collects a snapshot, e.g., based on prompts from the means for central processing, or at scheduled snapshot collection times. The means for generating can include a receiver front-end configured to receive beacon signals, a frequency down-converter, and an ADC, as well as other radio components. The means for generating may comprise an SDR.

A tenth aspect relates to an apparatus, comprising a means for receiving a snapshot of a received plurality of beacon transmissions, each of the plurality of beacon transmissions having at least one of spectral redundancy and temporal redundancy; and means for exploiting the at least one of spectral redundancy and temporal redundancy to separate multiples ones of the beacon transmissions in the snapshot.

The means for receiving the snapshot can comprise an ancillary wireless communication receiver configured to receive snapshots transmitted by network users on the ancillary wireless communication link. The ancillary wireless communication receiver may be an 802.11 WLAN, 802.15 Zigbee, Bluetooth, 3G, 4G LTE, or 5G cellular receiver. The means for receiving the snapshot can comprise a receiver coupled to a beacon communication bus, which connects the NOC with the network nodes, and the receiver may be an Ethernet, PLC, optical fiber, 802.11 WLAN, 802.15 Zigbee, Bluetooth, 3G, 4G LTE, or 5G cellular receiver.

An eleventh aspect relates to an apparatus, comprising a means for receiving a plurality of beacon transmissions to produce a received signal, each of the plurality of beacon transmissions having at least one of spectral redundancy and temporal redundancy; and means for generating a snapshot of the received signal, wherein the snapshot retains the at least one of spectral redundancy and temporal redundancy; and wherein the at least one of spectral redundancy and temporal redundancy is exploitable for separating the plurality of beacon transmissions.

The means for receiving the plurality of beacon transmissions can comprise a receiver front-end of a radio configured to receive transmitted beacon signals. The means for receiving can include a frequency down-converter and an ADC, as well as other radio components. In some aspects, the means for receiving comprises an SDR. The means for receiving may comprise a network user's beacon receiver configured to receive beacon transmissions, such as beacon signals transmitted from network nodes. The means for receiving may comprise network nodes configured to receive beacon transmissions from network users. The means for receiving may comprise network nodes in an RDRN and/or network users in an RDTN or an RDXN.

A twelfth aspect relates to an apparatus, comprising a means for synthesizing multitone beacon signals, wherein subcarrier spacing and symbol duration of the multitone beacon signals are selected according to an expected range of time-of-arrival and frequency-of-arrival for network users; means for inducing at least one of spectral or temporal redundancy on the multitone beacon signals; and means for transmitting the multitone beacon signals to the network users.

The means for synthesizing the multitone beacon signals can include a multitone modulator, which can employ a DFT, IDFT, FFT, IFFT, polyphase filter, and/or a discrete filter bank. The means for synthesizing may include at least one processor and at least one memory in electronic communication with the at least one processor, and instructions stored in the at least one memory to perform multitone signal generation. A software-defined radio is one example of such a processor.

A thirteenth aspect relates to an apparatus, comprising a means for receiving multiple multitone beacon signals; and a means for exploiting spectral redundancy in the multiple multitone beacon signals to use code nulling or Class-C linear minimum-mean-square error methods to separate the multiple multitone beacon signals.

The means for receiving multiple multitone beacon signals can include a multitone demodulator, which can employ a DFT, IDFT, FFT, IFFT, polyphase filter, and/or a discrete filter bank. The means for receiving may include at least one processor and at least one memory in electronic communication with the at least one processor, and instructions stored in the at least one memory to perform multitone demodulation. A software-defined radio is one example of such a processor.

A fourteenth aspect relates to an apparatus, comprising a means for transmitting beacon signals from network nodes to network users, a means for transmitting beacon signals from the network users to the network nodes, and/or a means for transponding beacon signals to and from the network nodes through the network users using bent-pipe transponders. The apparatus further includes a means for inducing at least one of spectral redundancy and temporal redundancy in the beacon signals, thereby enabling a receiver to exploit the at least one of spectral redundancy and temporal redundancy to separate multiples ones of the beacon signals in a snapshot of received signals.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims. All patent publications and non-patent publications mentioned in this disclosure are hereby incorporated by reference in their entireties.

BRIEF DESCRIPTION OF THE DRAWINGS

A further understanding of the nature and advantages of the present disclosure may be realized by reference to the following drawings. In the appended figures, similar components or features may have the same reference label.

FIG. 3 illustrates an alternate resilient distributed transponder network that can be instantiated according to some aspects of the disclosure.

FIGS. 4A and 4B depict exemplary network scenarios in which network users are 100 Class-1 sUAS's.

FIGS. 5A and 5B shows the received incident power (RIP) of each link in the network scenarios shown in FIG. 4A and FIG. 4B, as a function of the time-of-arrival (TOA) and frequency-of-arrival (FOA) of beacon transmitters in the field of view (FoV) of each receiver.

FIG. 6A and FIG. 6B shows the observed SINR of each link in the network scenarios shown in FIG. 4, as a function of the beacon TOA and FOA observed at a representative beacon receiver.

FIG. 9A depicts spectral redundancy in a beacon when a Kronecker product operation is used to construct a full subcarrier vector from simple BPSK inner subcarrier vectors and BPSK outer subcarrier vectors; and FIG. 9B illustrates temporal structure of the beacon for an aspect in which time symbols are organized into slots.

FIG. 21A-FIG. 21C illustrate joint geolocation and synchronization procedure for an exemplary reception scenario.

FIG. 22A-FIG. 22C and FIG. 23A-FIG. 23C show performance of the method for all of the network users in two exemplary reception scenarios.

DETAILED DESCRIPTION OF THE DRAWINGS

The detailed description set forth below in connection with the appended drawings is intended as a description of various configurations and is not intended to represent the configurations in which the concepts described herein may be practiced. The detailed description includes specific details for the purposes of providing a thorough understanding of various concepts. However, it will be apparent to those skilled in the art that these concepts may be practiced without these specific details. In some instances, well-known structures and components are shown in block diagram form in order to avoid obscuring such concepts.

Exemplary Resilient Distributed Positioning Networks

Figure 1:
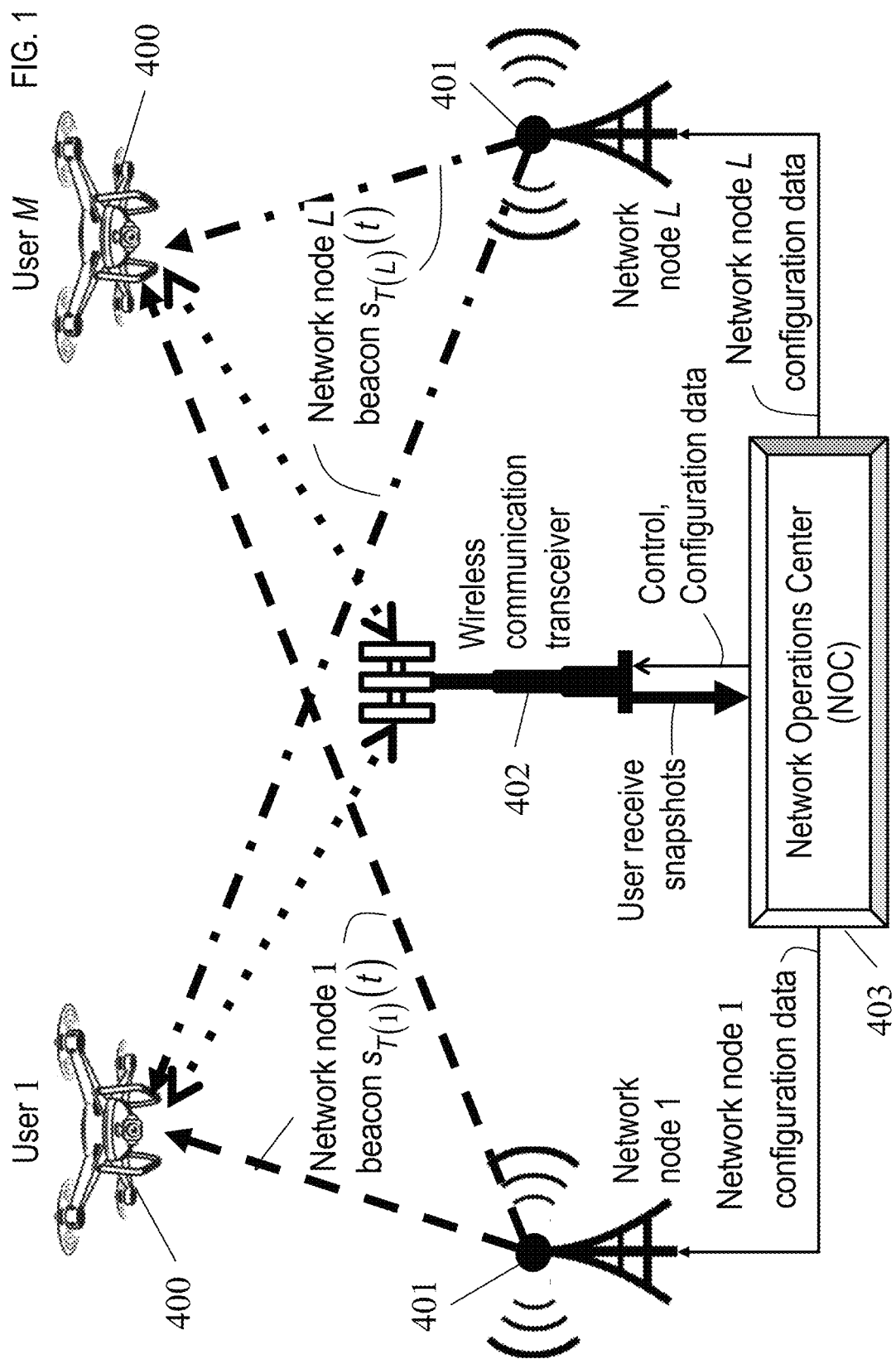
FIG. 1 illustrates a resilient distributed transmitter network that can be instantiated according to some aspects of the disclosure.

FIG. 1 illustrates a resilient distributed transmitter network (RDTN) that can be instantiated using the system introduced here. In this network, beacons are transmitted from a network of L network nodes 401 on a known frequency channel. Exemplary network nodes 401 include fixed outdoor transmitters co-located with cellular transmission towers or 802.11 access points; indoor transmitters coexisting with 802.11 WLAN or 802.15 Bluetooth or Zigbee networks; or standalone transmitters. The network nodes 401 are connected to a network operations center (NOC) 403, e.g., a 5GNR multi-access edge computer (MEC), or a UAS service supplier (USS), which provisions each of those network nodes 401 with separate configuration data or time symbols over a secure communication link. In alternate instantiations, the network nodes 401 choose their own configuration and apprise the NOC 403 site of that choice. The transmitted beacons are received by M users 400, e.g., Class-1 sUAS's, as shown in this FIG., ground vehicles, cellular user equipment (UE's), 802.11 STA's, 802.15 Zigbee or Bluetooth devices, or Internet of Thing devices, etc., each of which collect snapshots of data containing a superposition of the beacons transmit from network nodes 401 within their field of view (FoV). In one aspect, the users 400 backhaul those snapshots to the NOC 403 over at least one wireless communication transceiver 402, e.g., a cellular LTE, 4G, or 5G network or an 802.11 wireless local-area network (WLAN), connected to the users 400 and the NOC 403. In alternate aspects, the users 400 may perform positioning and timing operations themselves, using network node 401 locations and configuration data provided through the wireless communication transceiver 402, and transmit results of those operations to the NOC 403 over the wireless communication transceiver 402. In some aspects, different users 400 with varying capabilities and network permissions, including time-varying capabilities and permissions, may implement one aspect or the other.

Figure 2:
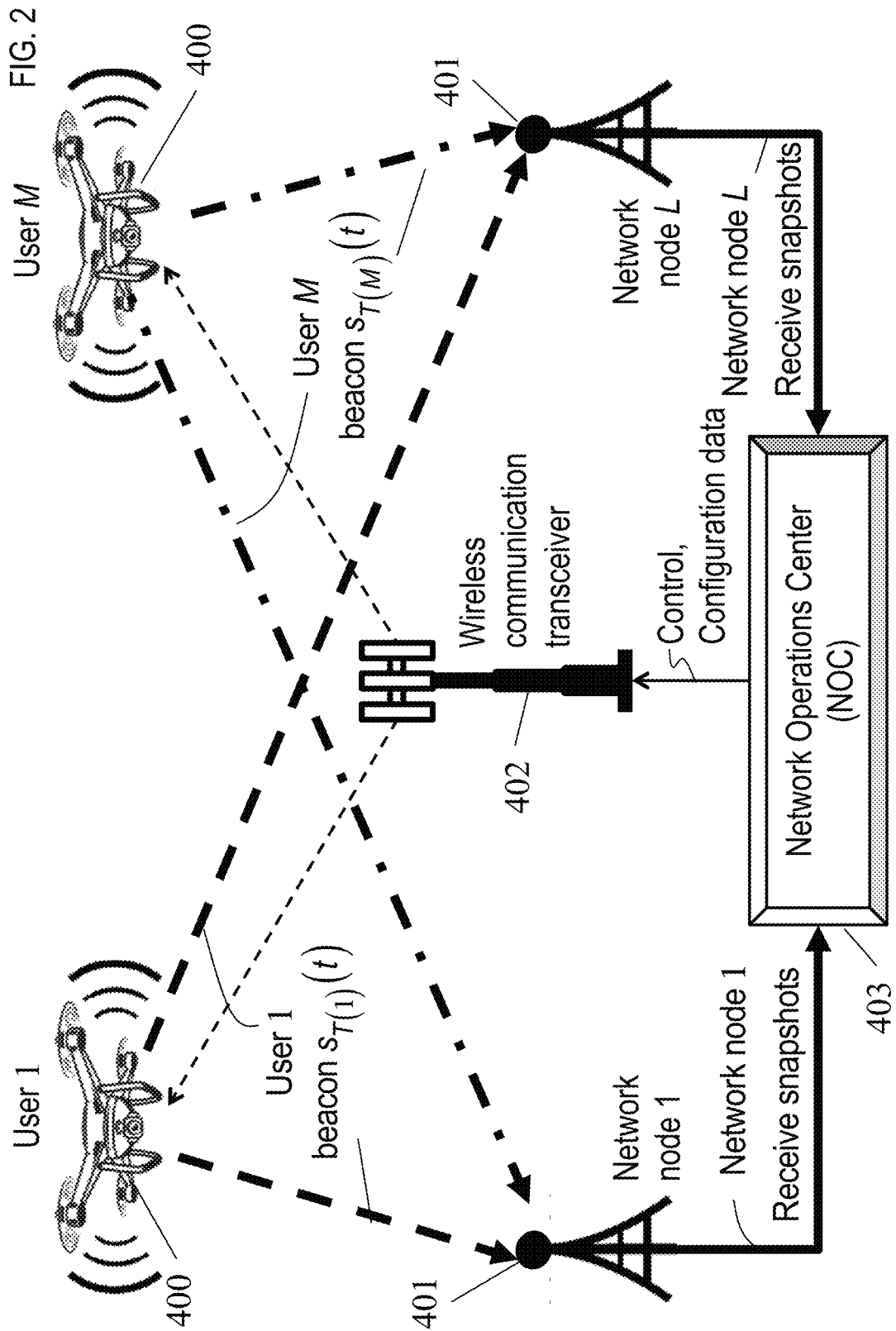
FIG. 2 illustrates an alternate resilient distributed receiver network that can be instantiated according to some aspects of the disclosure.

FIG. 2 illustrates an alternate resilient distributed receiver network (RDRN) that can be instantiated using the system introduced here. In this network, beacons are transmitted from the users 400, based on beacon configuration data transmitted to the users 400 from the NOC 403 over a wireless communication transceiver 402. Snapshots can be transmitted on a continuous or user-400 initiated basis, e.g., after detection of PNT outage conditions, or upon request by the NOC 403. The snapshots are then received at network nodes 401, and backhauled to the NOC 403 from the network nodes 401.

FIG. 3 illustrates an alternate resilient distributed transceiver network (RDXN) that can also be instantiated using the system introduced here. In this network, beacons are transmitted from network users 401, using beacon time symbols or configuration data provided by NOC 403 and are received and directly transponded from the users 400 as needed by the users 400 or the NOC 403.

Exemplary Class-1 sUAS Deployment Scenarios

FIG. 4A and FIG. 4B depicts two exemplary resilient distributed positioning network deployment scenarios, one intended for operation in Subband A of the Location and Monitoring Services (LMS) Band, located at 904-906 MHz (FIG. 4A), referred to here as the "LMS Scenario", and the other intended for operation in 802.11 2.4 GHz Channel 13, located at 2,462-2,482 MHz (FIG. 4B), a 20 MHz channel in the 2.4-2.485 ISM band that is not used for 802.11 transmissions in the United States, referred to here as the "2.4 GHz Ch. 13 Scenario". In each scenario, 100 users 400 are deployed at 3-to-122 meter (10-400 foot) elevations above ground level (AGL), and 22.3-to-44.7 meter/second (50-100 mile/hour) airspeeds, consistent with class-1 sUAS's, over a 32.2 km (20 mile) range from an areal analysis center. Assuming spherical Earth model with 4/3 refraction index, the users 400 have a 45.5 km (28.3 mile) ground horizon at maximum altitude. In FIG. 4A the users 400 are in the FoV of 32 fixed network nodes 401, deployed at 15.2-to-45.7 (50-150 foot) elevations AGL, i.e., with a ground horizon of 27.9 km (17.3 miles) at maximum altitude, and in a roughly hexagonal layout, consistent with sparse deployment from cell towers, over a 17,227 square-kilometer area. In FIG. 4B the users 400 are in the FoV of 50 fixed network nodes 401, deployed over the same range of altitudes, and over a 16,480 square-kilometer area. Both layouts cover the full FoV of the users 400 over the range of users 400 and network node 401 elevations, allowing 1,382 links in the LMS Scenario, or between 4 and 25 links per user 400; and 2,517 links in the 2.4 GHz Ch. 13 Scenario, or between 5 and 41 links per user 400.

FIG. 5A and FIG. 5B show the received incident power (RIP) of the beacons at each receiver, as a function of the time-of-arrival (TOA) and frequency-of-arrival (FOA), i.e., Doppler shift, of those received beacons, for the LMS Scenario (FIG. 5A) and the 2.4 GHz Ch. 13 Scenario (FIG. 5B). In each scenario, the beacons are assumed to possess azimuthally omnidirectional antennas with 6 dBi gain at 0° elevation and −3 dBi gain beyond ±30° elevation. In the LMS Scenario, the beacons are transmitted at a 40.9 dBm power, yielding an ERP of 30 Watts, the maximum power allowed in this band. In the 2.4 GHz Ch. 13 Scenario, the beacons are transmitted at 30 dBm power, yielding a 36 dBm EIRP, the maximum FCC Part 15 compliant power allowed in the 2.4-2.485 GHz ISM band. Each link assumes a two-ray median pathloss, with 4 dB rms log-normal shadowing and (20 dB mean, 4 dB standard deviation) Rician fading over each link.

As these FIGS. show, the link TOA's are restricted to 3-229 µs in the LMS Scenario, and between 4-232 µs in the 2.4 GHz Ch. 13 Scenario, much lower than the 67-94 ms TOA range expected for GNSS signals transmitted from MEO. Similarly, the link FOA's range are restricted to ±135 Hz in the LMS Scenario and ±369 Hz in the 2.4 GHz Ch. 13 Scenario, much lower than the ±6 kHz FOA range expected for L-band GNSS signals transmitted from MEO. This is an exploitable feature of the RDPN for both scenarios. At the same, the RIP of the beacons range from −88 dBm to −40 dBm in the LMS Scenario, and from −105 dBm to −64 dBm in the 2.4 GHz Ch. 13 Scenario, much stronger than the nominal −130 dBm GPS L1 signal strength at the Earth surface. While this is also a clear advantage for any beacon-based positioning solution, it also shows that the beacons will likely be received at positive SNR and with significant near-far interference. That is, the performance of conventional "matched filter" receivers that correlate the received signal against replicas of the transmitted beacons will be limited by the interference observed relative to each beacon, despite their high receive SNR, due to self-interference between those received beacons.

This observation is borne out in FIG. 6A and FIG. 6B, which show the observed TOA, FOA, and SINR of each link shown in FIG. 5A and FIG. 5B, for the LMS Scenario (FIG. 6A) and the 2.4 GHz Ch. 13 Scenario (FIG. 6B). In both cases, the beacon transmitters assume azimuthally omnidirectional antennas with 6 dBi gain at 0° elevation and −3 dBi gain beyond ±30° elevation, and receivers with 6 dB rolled-up noise figure (NF) through the receiver's analog-to-digital converter (ADC), and assume the ADC's and downconversion local oscillators (LO) are locked to clocks with ±10 ppm and ±100 µs 90th percentile rate and timing offset, respectively. In this scenario, the beacon transmitters are assumed to have negligible timing and LO offset, i.e., they are employing GPS disciplined oscillators, or they are synchronized to UTC via a calibration procedure.

As these FIGS. show, the ADC output SINR ranges between −46 dB and +25 dB in the LMS Scenario, and between −39 dB and +8 dB in the 2.4 GHz Ch. 13 Scenario. In fact, while all of the links are above 0 dB SNR in the LMS Scenario, only 3.5% of the links are above a 0 dB SINR, and less than 18% of the links are above a −10 dB SINR. Similarly, 82% of the links are above 0 dB SNR in the 2.4 GHz Ch. 13 Scenario, but only 1.2% of the links are above 0 dB SINR, and 10% of the links are above a −10 dB SINR. Hence, the received beacons are clearly in an interference-limited environment. This is the reason that competing systems introduce time hopping and time slotting into their beacon transmitters—in order to avoid such interference.

These results motivate the use of beacons that can both exploit the much tighter range of TOA and FOA obtaining in a ground-to-low-altitude reception geometry, and allow the use of interference excision methods that can separate the received beacons with performance gated by their (high) receive SNR, rather than their (low) receive SINR.

Beacon Generation and Transmission System

Figure 7:
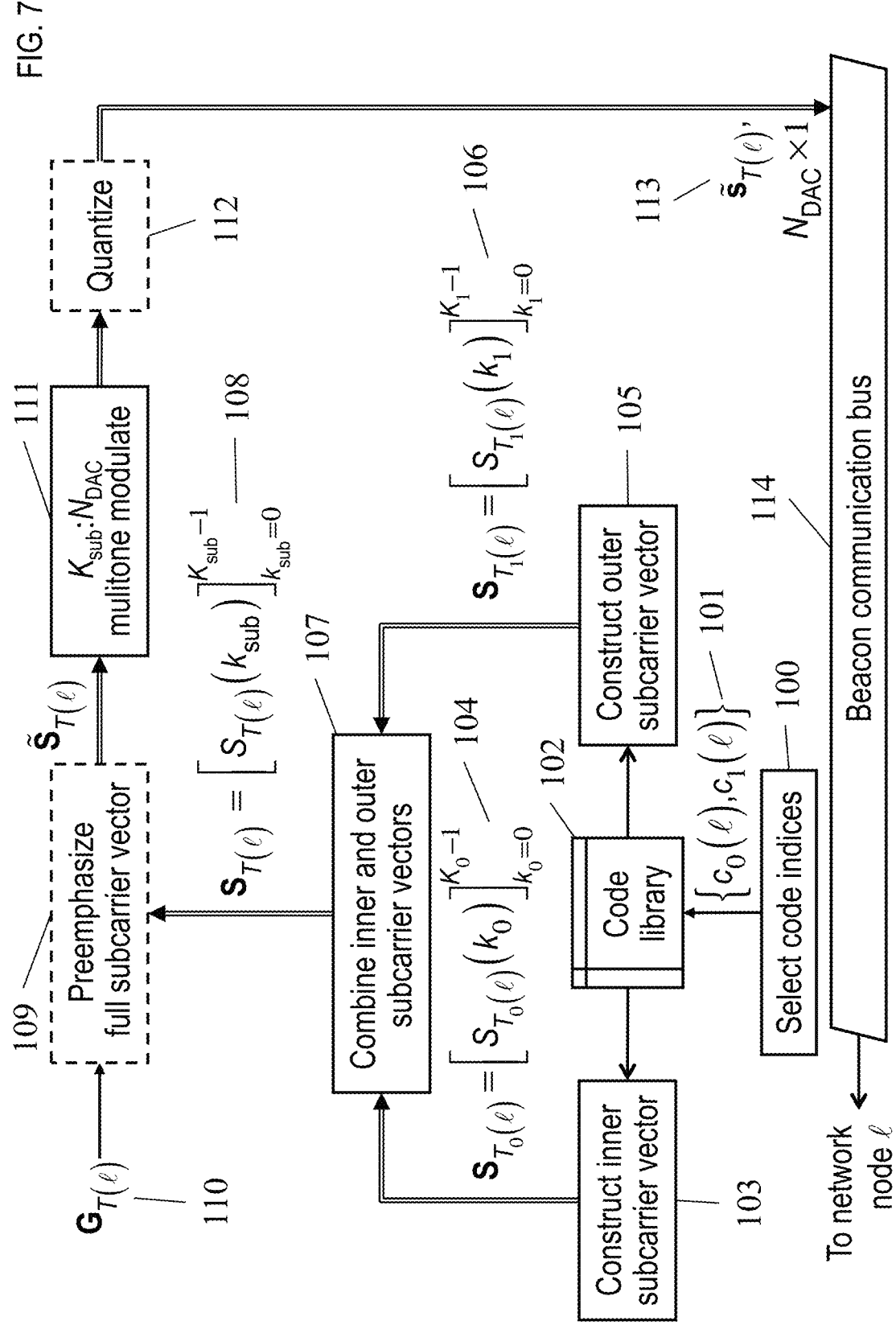
FIG. 7 and FIG. 8 depicts operations used to generate and transmit a beacon.

FIG. 7 depicts operations used to generate beacon time symbols for the networks shown in FIG. 1 and FIG. 3, and for aspects in which the network nodes 401 are provided beacon time symbols from the NOC 403. The time symbol generator first selects code indices 101 for each network node 401, creating inner and outer code indices 101 $\{c_0(\ell), c_1(\ell)\}$, where the code indices 101 point to code libraries 102 containing inner and outer code vectors $\{\theta(c_0)\}_{c_0=0}^{c_0-1}$ and $\{\theta(c_1)\}_{c_1=0}^{c_1-1}$, respectively, and where $\theta(c_i) = [\theta_{k_i}(c_i)]_{k_i=0}^{K_i-1}$ is a $K_i \times 1$ vector of phase values in radians. The code indices 101 can be chosen deterministically, pseudorandomly, or unpredictably, or based on environmental factors determined by the network, e.g., evidence of spoofing by malicious actors.

In one aspect, the phase vectors contained in the code libraries 102 are designed to yield library codebook signal $$s(t, \theta(c_i)) = \frac{1}{\sqrt{K_i}} \sum_{k_i=0}^{K_i-1} \exp(j(\theta_{k_i}(c_i) + 2\pi k_i t))$$

with low peak-to-average power ratio (PAPR), and low cross-correlation between other library codebook signals. The code libraries 102 can be designed to satisfy other system requirements as well.

The time symbol generator then performs an inner subcarrier construction operation 103 to generate $K_0 \times 1$ inner subcarrier vector 104 $s_{T_0(\ell)} = [s_{T_0(\ell)}(k_0)]_{k_0=0}^{K_0-1}$ and an outer subcarrier construction operation 105 to generate $K_1 \times 1$ outer subcarrier vector 106 $s_{T_1(\ell)} = [s_{T_1(\ell)}(k_1)]_{k_1=0}^{K_1-1}$. In one aspect, the vectors are generated using simple phase modulation operations, such that $$S_{T_0(\ell)} = \frac{1}{\sqrt{K_0}} [\exp(j\theta_{T_0(\ell)}(k_0))]_{k_0=0}^{K_0-1} \text{ and } S_{T_1(\ell)} =$$

$$\frac{1}{\sqrt{K_1}} [\exp(j\theta_{T_1(\ell)}(k_1))]_{k_1=0}^{K_1-1} \text{ where } \theta_{T_i(\ell)}(k_i) = \theta_{k_i}(c_i(\ell)).$$

Other aspects apply non-uniform amplitude weightings to either or both vectors, for example, to further reduce PAPR of the transmitted beacon, reduce interference to non-beacon networks caused by beacons in selected portions of the beacon transmission band, or reduce susceptibility to non-beacon interference at network receivers operating in the beacon transmission band.

The inner subcarrier vector 104 and outer subcarrier vector 106 are then combined 107 to form $K_{sub} \times 1$ full subcarrier vector 108 $s_{T(t)} = [s_{T(t)}(k_{sub})]_{k_{sub}=0}^{K_{sub}-1}$. In one aspect, this is performed using a Kronecker product operation, such that $s_{T(t)} = s_{T(t)} \otimes s_{T(t)}$. In other aspects, this may be a more complex combining operation, for example, to improve robustness to LO frequency uncertainty at the transmitter or receiver, reduce interference to non-beacon networks caused by beacons in selected portions of the beacon transmission band, or reduce susceptibility to non-beacon interference at network receivers operating in the beacon transmission band.

The full subcarrier vector 108 is then passed through an optional subcarrier preemphasis 106 operation to generate preemphasized subcarrier vector $\tilde{s}_{T(t)} = c_{T(t)} \circ s_{T(t)}$, where "∘" denotes the element-wise (Shur or Hadamard) product operation, and $c_{T(t)}$ is a $K_{sub} \times 1$ preemphasis vector 110 that compensates for front-end digital-to-analog conversion (DAC), antialiasing lowpass filtering (LPF), and upconversion operations performed at network node 401 $\ell$. The preemphasis vector 110 can be designed using analytic models for beacon transmission operations 213; or using calibration data obtained at each network node 401, for example, as described in G. Pattabiraman, S. Melyappan, A. Raghupathy, H. Sankar, "Wide Area Positioning System," U.S. Pat. No. 8,130,141, issued March 2012, and can be based on the magnitude or complex value of those beacon transmission operations 213.

The preemphasized subcarriers are then passed to a multitone modulator 111 that transforms the subcarriers to the time domain, and is optionally quantized 112, to provide an $N_{DAC} \times 1$ time symbol vector 113 $s_{T(t)} = [s_{T(t)}(n_{DAC})]_{n_{DAC}=0}^{N_{DAC}-1}$. The multitone modulator 111 can be implemented using combinations of discrete Fourier transform (DFT), inverse DFT (IDFT), fast Fourier transform (FFT), or inverse FFT (IFFT) operations, or using polyphase filtering or discrete filter bank operations.

Each time symbol vector 113 is then passed from the NOC 403 to the beacon transmitter over a beacon communication bus 114. Exemplary communication networks supporting a beacon communication bus 114 can include Ethernet-based networks, optical networks, power-line communication (PLC) networks, 802.11 WLAN's, 802.15 Zigbee or Bluetooth networks, or 3G, 4G LTE, or 5G cellular networks. In the networks shown in FIG. 1 and FIG. 3, including this aspect of the disclosure, the beacon communication bus 114 connects the NOC 403 to the network nodes 401. In the network shown in FIG. 2, the beacon communication bus 114 connects the NOC 403 to the users 400 over a wireless communication transceiver 402.

Figure 8:
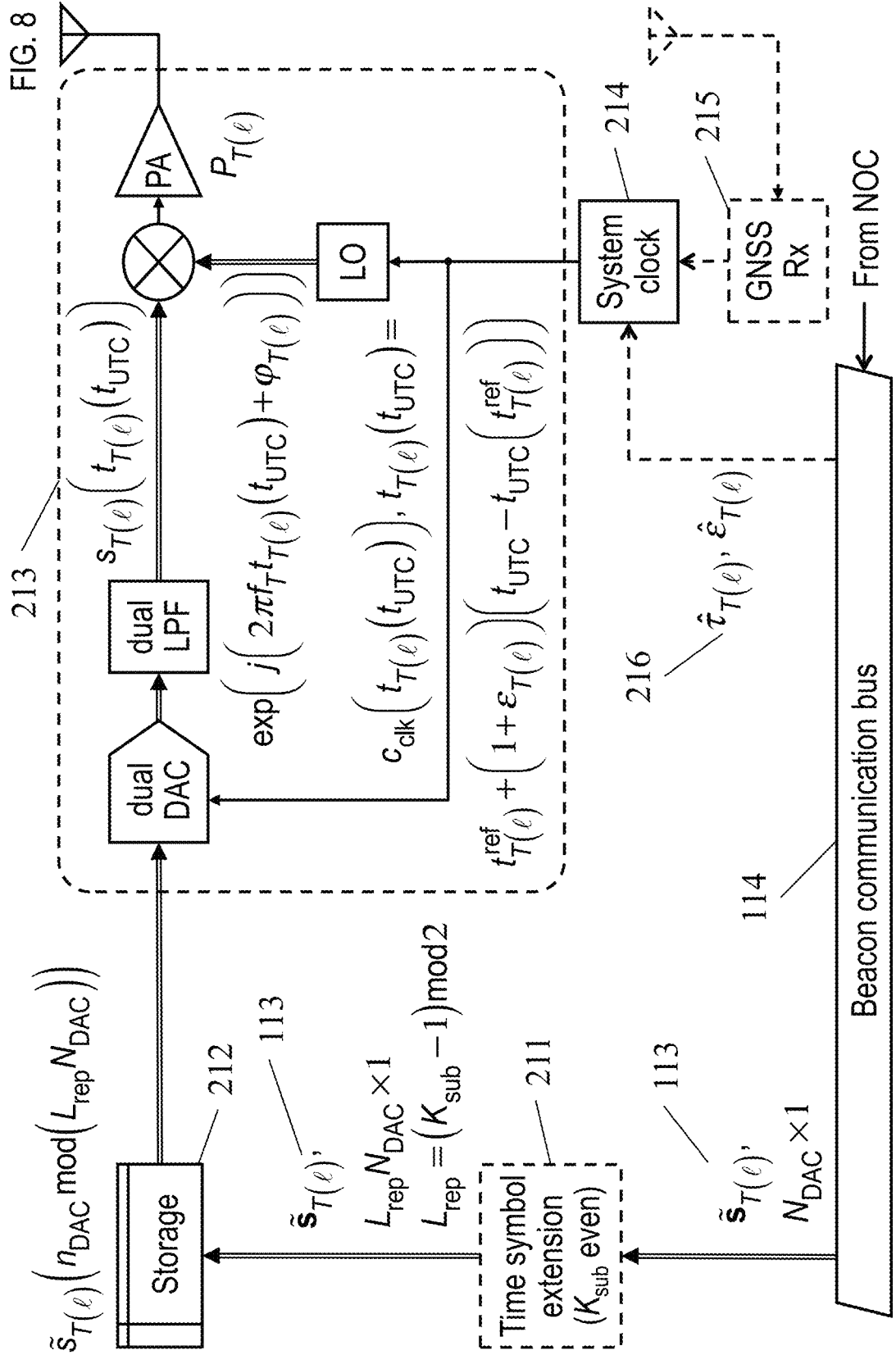

FIG. 8 shows operations performed in this aspect of the disclosure at each beacon transmitter, e.g., the network nodes 401 for the networks shown in FIG. 1 and FIG. 3, or the users 400 for the network shown in FIG. 2. At each beacon transmitter, the $N_{DAC} \times 1$ time symbol vector 113 is first obtained from the beacon communication bus 114. If $K_{sub}$ is even, the time symbol vector 113 is placed through time symbol extension operation 211 to convert the $N_{DAC} \times 1$ time symbol vector 113 to a $2N_{DAC} \times 1$ time symbol vector 113 given by $$s_{T(t)} \leftarrow \begin{pmatrix} s_{T(t)} \\ -s_{T(t)} \end{pmatrix},$$

and placed in local storage 212. For the networks shown in FIG. 1 and FIG. 3, the time symbol vector 113 in local storage 212 is then continuously and repeatedly cycled through beacon transmission operations 213, until a new time symbol is provided by the NOC 403, or it must cease transmission for other reasons, e.g., to comply with license provisions of spectra reserved for time-division-duplex (TDD) operation, or based on other instructions received from the NOC 403. For the network shown in FIG. 2, the time symbol vector 113 is transmitted from the user 400 over varying time interval durations, dependent for example upon the priority of positioning/timing solutions demanded by the user 400 or the NOC 403, or user 400 energy conservation needs.

The operations used to perform the beacon transmission operations 213 are analogous to an arbitrary waveform generator (AWG). In the aspect shown in FIG. 8, the operations comprise dual DAC, dual LPF, frequency shift operations using in-phase and quadrature LO's, and power amplification (PA) operations. However, many other means can be used to implement the beacon transmission operations 213, e.g., superheterodyne transmitters that convert the time symbol vector 113 to a real intermediate-frequency (real-IF) form and perform the frequency conversion in multiple steps, and polar modulators, for example, D. Kirkpatrick, E. McCune, Jr, "Polar Modulation Using Product Mode," U.S. Pat. No. 9,397,713, issued July 2016, which convert the time symbol vector 113 to polar form and separately phase modulate the time symbol vector 113 phase and amplitude-modulate the time symbol vector 113 amplitude. These conversions can be implemented at the NOC 403, or at the beacon transmitters.

Typically, the DAC and LO employed in the beacon transmission operations 213 are locked to a system clock 214, which in general, has a clock rate and timing that is offset from a common time standard, e.g., UTC. As shown in FIG. 8, consistent with the networks shown in FIG. 1 and FIG. 3, the system clock 214 for network node 401 $\ell$ is offset from UTC by rate offset $\varepsilon_{T(t)}$ and timing offset $\tau_{T(t)} = t_{T(t)}^{ref} - t_{UTC}(t_{T(t)}^{ref})$, where $t_{T(t)}^{ref}$ is the internal clock time at UTC time $t_{UTC}(t_{T(t)}^{ref})$. In some aspects, the system clock 214 is synchronized to an external time and frequency standard using an external source, e.g., a GNSS receiver (Rx) 215. In some aspects, the system clock 214 is brought into a common time standard using network calibration methods computed at the NOC 403, e.g., by providing the system clock 214 with clock synchronization data 215, e.g., timing and rate offset estimates $\hat{\tau}_{T(t)}$ and $\hat{\varepsilon}_{T(t)}$. In the network shown in FIG. 2, the system clock 214 employed each user 400 can similarly be brought into synchronization with a common time standard using clock synchronization data 215 provided by the NOC 403.

In some aspects consistent with the networks shown in FIG. 1 and FIG. 3, the network nodes 401 are provisioned with the code library 101, and the NOC 403 sends it the code indices 101 to be used to generate time symbol vector 113. Alternately, each network node 401 can select its own code indices 101 and communicate it back to the NOC 403. These aspects greatly reduce the data rate needed to communicate between the network nodes 401 and NOC 403, but increase operation security of the network, by requiring the beacons to possess copies of the code libraries 102.

For an exemplary subcarrier frequency layout assumed here, FIG. 9A illustrates the spectral redundancy imposed in aspects where a Kronecker product operation is used to construct the full subcarrier vector 108 from simple BPSK inner subcarrier vectors 102 and BPSK outer subcarrier vectors 103; and FIG. 9B illustrates the temporal structure of the beacon for an aspect in which the time symbols are organized into slots with $N_{rep}$ per slot. In FIG. 9A, the inner subcarrier vector 103 is a 5-element vector $[+1 \ +1 \ -1 \ -1 \ +1]^T$, while the outer subcarrier vector 106 is a 4-element vector $[+1 \ -1 \ -1 \ +1]^T$. The inner and outer subcarrier combining operation 107 then yields a 20-element full subcarrier vector 108 in which the 5-phase inner subcarrier vector 103 is replicated over 4 clusters, each of which is modulated by one element of the outer subcarrier vector 106. Beacon $\ell$ generated by the multitone modulator 107 then has complex baseband representation $$s_{T(\ell)}(t) = \sum_{k_{sub}=0}^{K_{sub}-1} S_{T(\ell)}(k_{sub}) \exp\{j2\pi f(k_{sub})t\} \quad \text{(Eq1)}$$

$$= \frac{1}{\sqrt{K_{sub}}} \sum_{k_{sub}=0}^{K_{sub}-1} \exp(j(\theta_{T(\ell)}(k_{sub}) + 2\pi f(k_{sub})t))$$

at the PA input in the beacon transmission operations 213, where the subcarrier frequencies are given by $$f(k_{sub}) = \left(k_{sub} - \frac{K_{sub}-1}{2}\right) f_{sym}, k_{sub} = 0, \rightleftharpoons, K_{sub} - 1 \quad \text{(Eq2)}$$

and where $f_{sym}=1/T_{sym}$ is the subcarrier spacing. Assuming the internal subcarrier structure shown here, then $^{S}T(\ell)(t) = {}^{S}T_0(\ell)(t){}^{S}T_1(\ell)^{(\ell)}$, where $$s_{T_i(\ell)}(t) = \frac{1}{\sqrt{K_i}} \sum_{k_i=0}^{K_i-1} \exp(j(\theta_{T_i(\ell)}(k_i) + 2\pi f_i(k_i)t)) \quad \text{(Eq3)}$$

and where inner and outer subcarrier frequencies $f_0(k_0)$ and $f_1(k_1)$ are given by $$f_0(k_0) = \left(k_0 - \frac{K_0-1}{2}\right) f_{sym}, k_0 = 0, \rightleftharpoons, K_0 - 1, \quad \text{(Eq4)}$$

$$f_1(k_1) = \left(k_1 - \frac{K_1-1}{2}\right) K_0 f_{sym}, k_1 = 0, \rightleftharpoons, K_1 - 1 \quad \text{(Eq5)}$$

respectively, such that $K_{sub}=K_0 K_1$, $f(K_0 k_1 + k_0)=f_0(k_0)+f_1(k_1)$ and $\theta_{T(\ell)}(K_0 k_1 + k_0)=\theta_{T_0(\ell)}(k_0)=\theta_{T_1(\ell)}(k_1)$.

This beacon can be interpreted as a stacked-carrier spread spectrum (SCSS) signal, in which a narrowband signal $^{S}T_0(\ell)$(t) with bandwidth $K_0 f_{sym}$ and period $2^{(K_0-1) \ mod \ 2} T_{sym}$ is spread by a wideband signal $^{S}T_1(\ell)$(t) with bandwidth $K_{sub} f_{sym}$ and period $2^{(K_1-1) \ mod \ 2} T_{sym}/K_0$. The resultant beacon possesses massive spectral redundancy, both between clusters (replication of inner code $\mathbf{S}_{T_0(\ell)}$ over $K_1$ independent clusters), and within clusters (replication of outer code $\mathbf{S}_{T_1(\ell)}$ over $K_0$ subcarriers within each cluster).

FIG. 9B further illustrates the additional temporal redundancy in the beacon over each symbol repetition. If the time symbol possesses an even number of subcarriers, then the subcarriers will be offset from the frequency origin by a factor of $f_{sym}/2$, similar to LTE SC-FDMA uplink signals. In this case, successive time symbol repetitions needed to be inverted to preserve signal energy within each subcarrier. If the time symbol possesses an odd number of subcarriers, then this offset is removed, similar to LTE OFDM downlink signals, and this successive inversion is not needed. The replication induces temporal redundancy in either case.

Exemplary Class-1 sUAS Compatible Beacon Generation and Transmission Parameters

Table 1 lists exemplary beacon generation and transmission parameters compatible with TOA and FOA ranges expected for Class-1 sUAS's, and for network geometries shown in FIG. 4. The key parameter providing compatibility with Class-1 sUAS's is the 250 μs symbol duration $T_{sym}$, which encompasses the full range of TOA's shown in FIG. 5, driven by the maximum altitude allowed for Class-1 sUAS's. The resultant 4 kHz subcarrier frequency separation is also compatible with the range of FOA's shown in FIG. 5, driven by the maximum airspeed allowed for Class-1 sUAS's. In each case, the beacon bandwidth fits into the channel allocation for each band. The 80-element inner subcarrier vector 104 dimension chosen for the 2.4 GHz Ch. 13 Scenario allows up to 80 co-channel beacons to be separated using linear-algebraic signal separation methods. The 24-element inner subcarrier vector 104 dimension chosen for the LMS Scenario—driven largely by the much narrower 2 MHz bandwidth constraint in this subband—only allows up to 24 co-channel beacons to be separated using linear-algebraic methods, hence a sparser set of co-channel beacons can be deployed. The narrower bandwidth and sparser deployment degrades the geolocation capability of this network. However, the higher transmit power requirement compensates for much of this performance loss. It should be noted that correlative techniques would be strongly interference-limited in this case, and could not exploit any of the power advantage available in this subband.

TABLE 1

Exemplary Class-1 sUAS Compatible Beacon Transmission Parameters

| Parameter | LMS Scenario | 2.4 GHz Ch. 13 Scenario |
|---|---|---|
| $f_T$ | 905 MHz | 2,472 MHz |
| $P_T$ | 40.9 dBm | 30 dBm |
| $G_T$, 0° elevtion | 6 dBi (30 W ERP) | 6 dbi (36 dBm EIRP) |
| $T_{sym}$ | 250 μs (4 kHz $f_{sym}$) | 250 μs (4 kHz $f_{sym}$) |
| $K_\square$ | 24 (96 kHz BW) | 80 (320 kHz BW) |
| $K_\square$ | 20 ($K_{sub} \square$ 480) | 60 ($K_{sub} \square$ 4,800) |
| $W_T$ | 1.92 | 19.2 MHz |
| $f_{DAC}$ | 3.84 Msps IQ | 38.4 Msps IQ |

TABLE 1-continued

Exemplary Class-1 sUAS Compatible Beacon Transmission Parameters

| Parameter | LMS Scenario | 2.4 GHz Ch. 13 Scenario |
| --- | --- | --- |
| $N_{DAC}$ | 960 (2,880 bytes) | 9,600 (28.125 KB) |
| $SF_{LPF}$ | 3 (960 kHz passband) | 3 (9.6 MHz passband) |

Assuming 12 bits per in-phase (I) and quadrature (Q) rail at the output of the quantizer 108, a single time symbol vector 113 requires transmission of 2,880 bytes (2.8125 KB) over the beacon communication bus 114 for the LMS Scenario, and 28.125 KB for the 2.4 GHz Ch. 13 Scenario. Assuming the time symbol vectors 113 are updated once per second, the NOC 403 requires the beacon communication bus 114 to support a 23.04 kbps link for the LMS scenario, and a 230.4 kbps link for the 2.4 GHz Ch. 13 Scenario. These rates are achievable in low-cost networks.

Figure 10A:
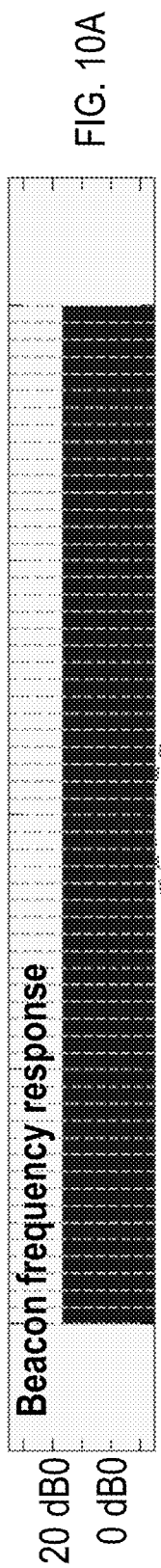
FIG. 10A-10D show the frequency and time response of two beacons generated in accordance with an aspect of the disclosure.
Figure 10B:
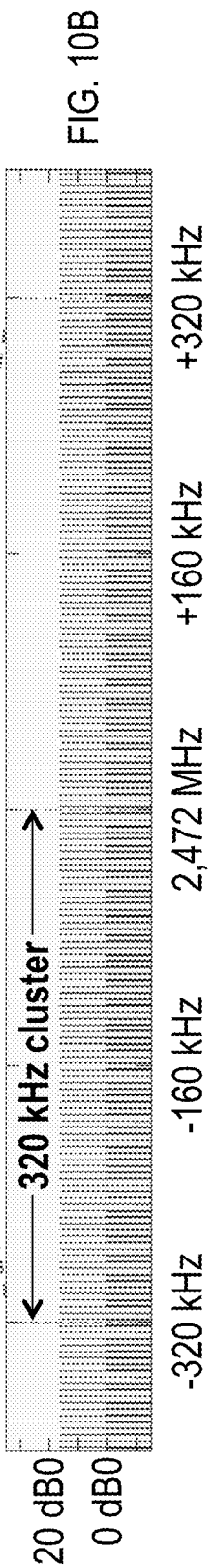
Figure 10C:
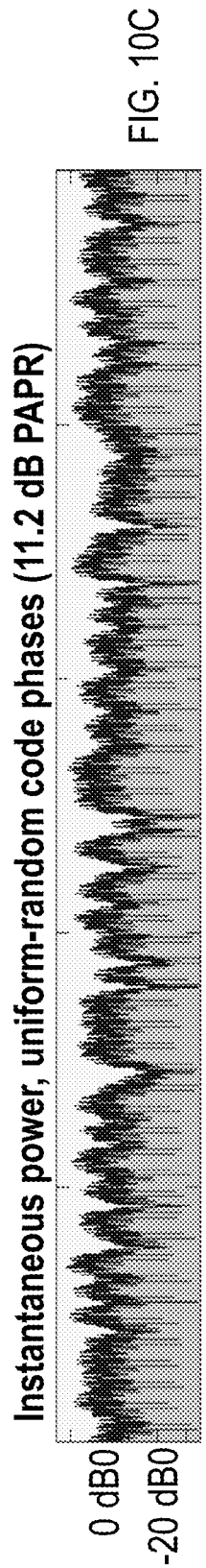
Figure 10D:
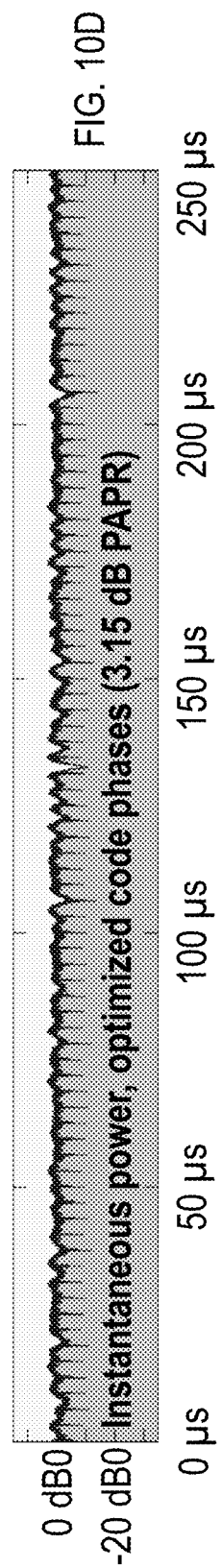

FIG. 10A-FIG. 10D show the frequency and time response of two 2.4 GHz Ch. 13 beacons with parameters consistent with Table 1. FIG. 10A shows the flat beacon frequency response over the 19.2 MHz signal passband, with negligible sidebands. FIG. 10B shows the close-in spectral distribution of the beacons—essentially, a line spectrum with 4 kHz line separation and flat line power—and illustrates the layout of the 320 kHz clusters within the signal. FIG. 10C and FIG. 10D show the instantaneous power of the beacon, and demonstrates the effect of optimized code phasings on the transmitted signal, one of the features of the disclosure. In FIG. 10C, the beacon is generated using inner subcarrier vector 104 and outer subcarrier vector 106 code phases with uniform-random phase distribution. This beacon has a PAPR of 11.2 dB, consistent with a bandlimited complex-Gaussian waveform. In FIG. 10D, the other beacon is generated using 80-element inner subcarrier vector 104 and 60-element outer subcarrier vector 106 code phases taken from 1,000-member code libraries 102, in which the phases are optimized to minimize kurtosis of their underlying time series. This beacon has a PAPR of 3.15 dB.

Exemplary Beacon Reception System

Figure 11:
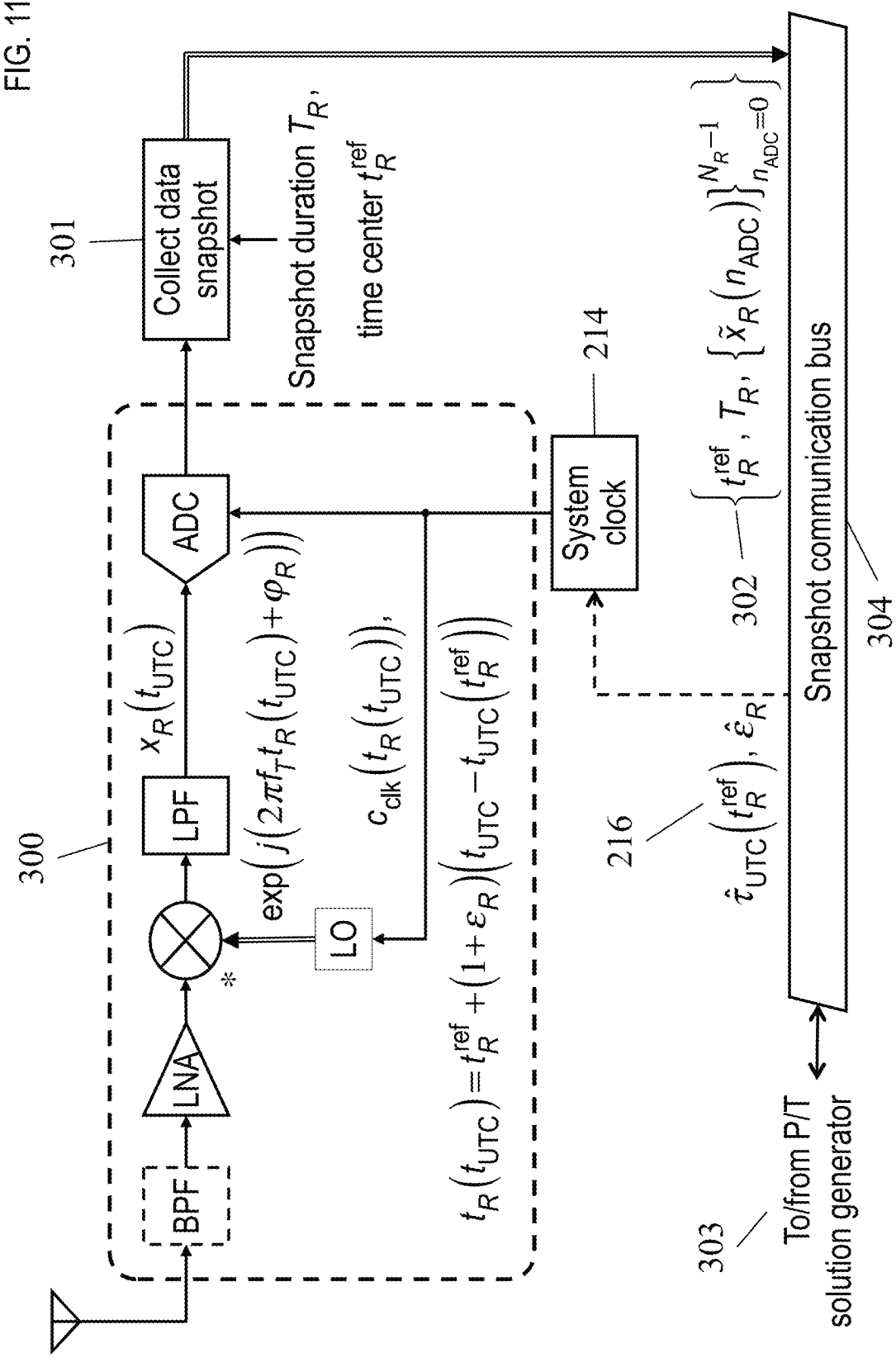
FIG. 11 shows a user receiver system concept used in an aspect of the disclosure.

FIG. 11 shows a receiver system used in one aspect of the disclosure. When directed to collect a snapshot, e.g., based on prompts from the NOC 403 over a wireless communication transceiver 402, or at scheduled snapshot collection times, the receiver system performs reception operations 300 to generate a downconverted and sampled data stream covering the beacon transmission band. The reception operations shown in FIG. 11 can comprise optional bandpass filtering (BPF), followed by low-noise amplification (LNA), in-phase and quadrature (IQ) downconversion to complex baseband, represented as multiplication of the LNA output signal by a complex LO output signal, dual lowpass filtering (LPF), and dual analog-to-digital conversion (ADC) operations, resulting in a complex IQ sampled received data stream. However, the reception operations 300 can be implemented in many other ways, including two-stage superheterodyne reception operations 300 that downconvert the beacon transmission band to real-IF representation, and hybrid analog-digital reception operations 300 that downconvert a larger frequency band containing the beacon transmission band, and implements a digital drop receiver to generate a reduced-bandwidth, decimated signal centered on the beacon transmission band.

When needed at scheduled intervals, or given prompts from the NOC 403 over a wireless communication transceiver 402, the receiver system then performs a data snapshot collection 301 operation, which generates a snapshot 302 comprising the data provided by the reception operations 300 at a reception time and over a snapshot 302 time duration, shown in FIG. 11 as time center $t_R^{ref}$, and time duration $T_R$ also included as a time-stamp with that snapshot 302. In aspects with slotted beacon formats, a prefix and suffix with duration $T_{prefix}$ and $T_{suffix}$, respectively, are also collected as part of the snapshot 302, in order to encompass inter-slot interference introduced by timing offset between the beacon transmitter and receiver. The snapshot 302 is then sent to a position/timing (P/T) solution generator 303 over a snapshot communication bus 304. In the network shown in FIG. 1, the snapshot communication bus 304 can be connected to the NOC 403 over a wireless communication transceiver 402, or it can connect to a P/T solution generator 303 on-board the user 400. In the networks shown in FIG. 2 and FIG. 3, the snapshot communication bus 304 is connected to the NOC 403 over a link similar to links supporting the beacon communication bus 114. However, the snapshot communication bus 304 typically requires a higher-rate link than the beacon communication bus 114.

In general, the receiver LO(s) and ADC samplers used in the reception operation 300 are locked to a system clock 214 with rate offset $\varepsilon_R$ and timing offset $\tau_R^{ref}=t_R^{ref}-t_{UTC}(t_R^{ref})$, unique for each receiver, where $t_R^{ref}$ is the receiver time estimate at UTC time $t_{UTC}(t_R^{ref})$.

In some aspects of the disclosure, the NOC 403 also provides synchronization data 216 that can be used to bring the receiver system clock 214 into synchronization for subsequent time-stamped snapshots 302. In other aspects, the receiver obtains coarse synchronization information from the NOC 403 over a wireless communication transceiver 402. In additional aspects of the disclosure, the receiver performs coarse synchronization operations to determine the approximate center frequency and (for slotted beacon formats) slot transition time of the beacons, prior to the snapshot collection 301. The coarse frequency and timing information can then be used to adjust the timing carrier offset of the ADC output signal, or the receiver clock driving the LO and ADC; or simply conveyed to the NOC 403, along with time-stamped snapshot 302. In this last case, the frequency and timing offset is included in the time-stamped snapshot 302, for use by the P/T solution generator 303. The receiver may stream data to the P/T solution generator 303 (which may be remote or on the receiver platform itself), or may sparsely capture time-stamped snapshot 302 of frequency-and-timing aligned data, e.g., at the start of processing or as required/requested by the NOC 403.

Cold-Start Reception and Resilient Geo-Observable Estimation Operations

Figure 12:
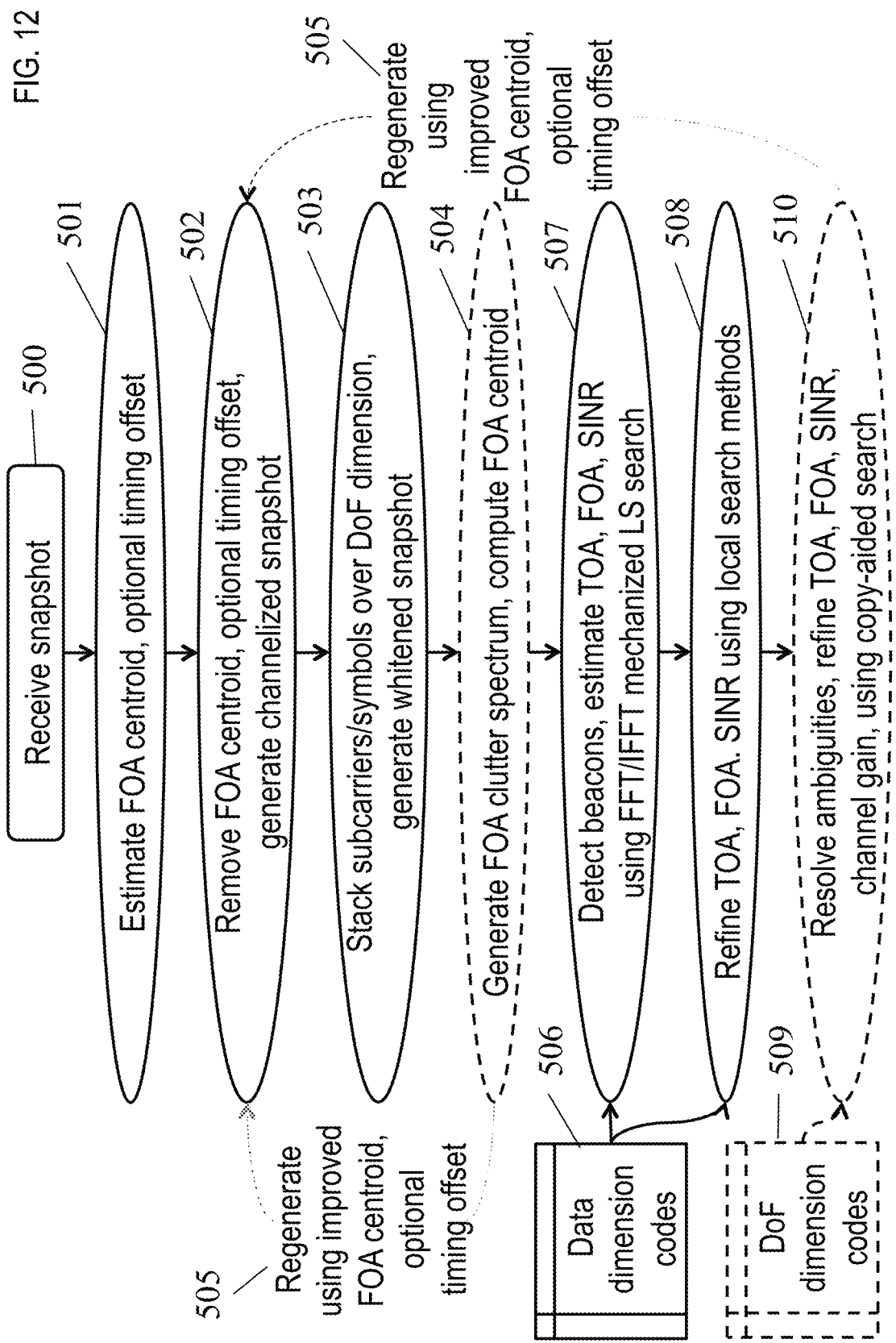
FIG. 12 shows exemplary reception and PNT processing operations used in "cold start" scenarios where the receiver has no prior knowledge of its position or precise timing and carrier synchronization to the beacon transmissions.

FIG. 12 shows exemplary cold-start operations used at the P/T solution generator 303 to resiliently detect and estimate geo-observables of co-channel beacons contained within individual received snapshots 302, applicable to the network shown in FIG. 1. The snapshot 302 is first processed to estimate the FOA centroid 612, described in FIG. 15, i.e., the center of the beacon FOA's observed in the downconverted snapshot 303, which is roughly offset by the error between the target and actual LO in the reception operations 300. This can be accomplished in a number of manners; for example, using spectral analysis tools to determine the center of the received beacon spectrum, or to exploit the nearly-rectangular shape of the beacon signals, e.g., by detecting and estimating the up-edge and down-edge of the signal spectrum. The chief goal of this step is to determine the FOA centroid 612 to within a fraction of a subcarrier, e.g., ±500 Hz (±1/8 subcarrier) for the beacon transmission parameters given in Table 1. In some aspects with slotted beacon formats, the snapshot 303 is optionally analyzed to estimate a timing offset estimate $\hat{n}_R$, e.g., by performing cross-slot time correlation operations to detect the slot transition.

Figure 13:
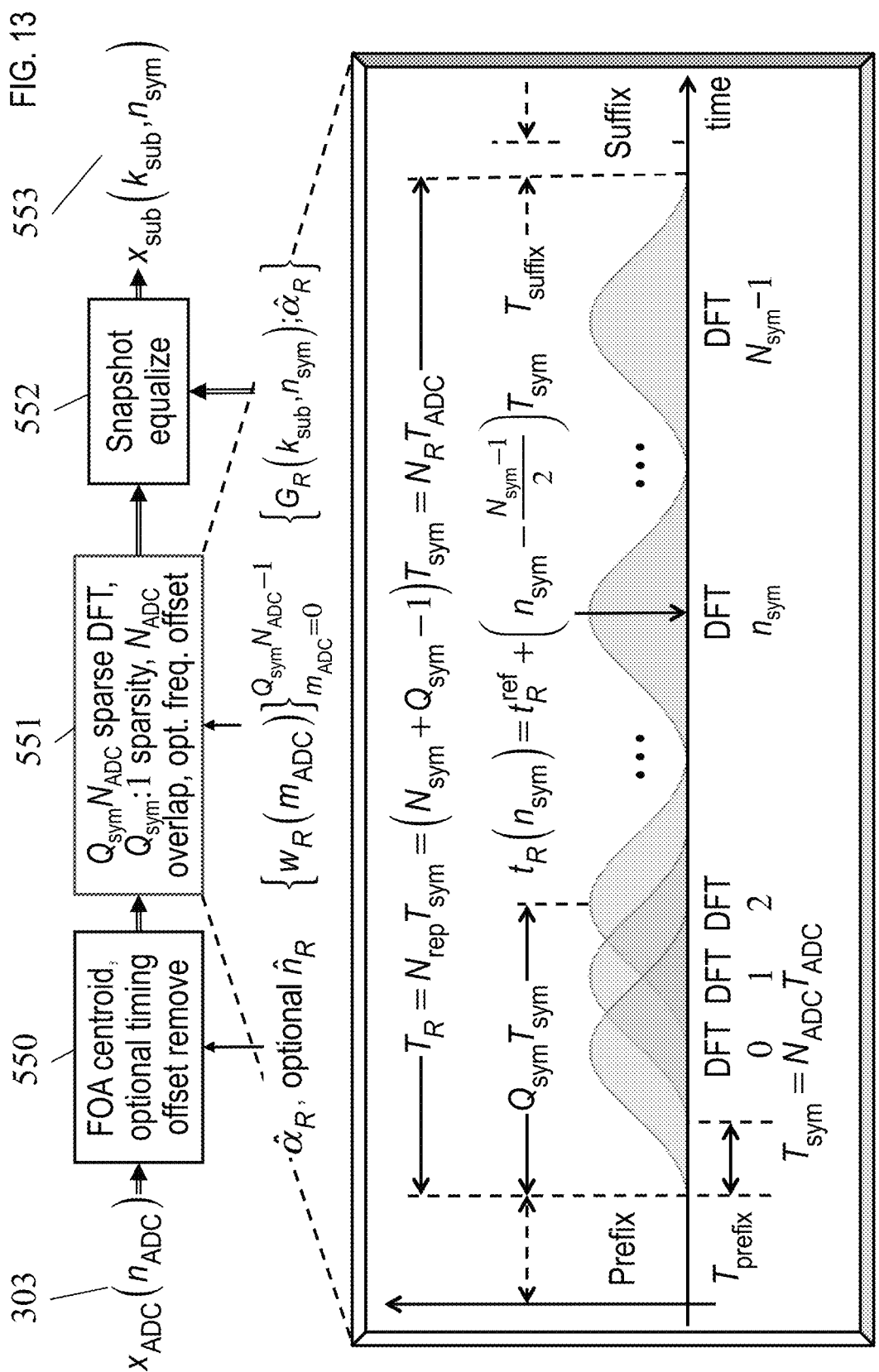
FIG. 13 depicts data channelization operations employed by aspects of the disclosure.

The snapshot 303 is then frequency-shifted to remove the estimated FOA centroid 612, and if needed time-shifted to remove the estimated timing offset, and channelized into subcarriers and time symbols covering the active snapshot bandwidth and duration 502, creating a channelized snapshot 553, described in FIG. 13, defined over subcarriers and time symbols. The channelized snapshot 553 is then stacked into an $N_{data} \times M_{DoF}$ windowed data matrix 601, described in FIG. 15, where $M_{DoF}$ is the degrees-of-freedom (DoF) of the data matrix and $N_{data}$ is the number of data samples in the matrix, and where the beacons are redundant in the DoF dimension; and whitened over the DoF dimension, e.g., using a QR decomposition (QRD) operation 503, thereby creating a whitened snapshot matrix 604, described in FIG. 15. In some aspects, FOA clutter and FOA centroid computation operations 504 are performed to generate a FOA clutter spectrum 610, described in FIG. 15, and used to improve detection of the received beacons, and optionally to improve the estimate of the FOA centroid 612. In this case, the improved FOA centroid 612 estimate can also be used to regenerate 505 the channelized snapshot 553 and the whitened snapshot matrix 604.

Figure 15:
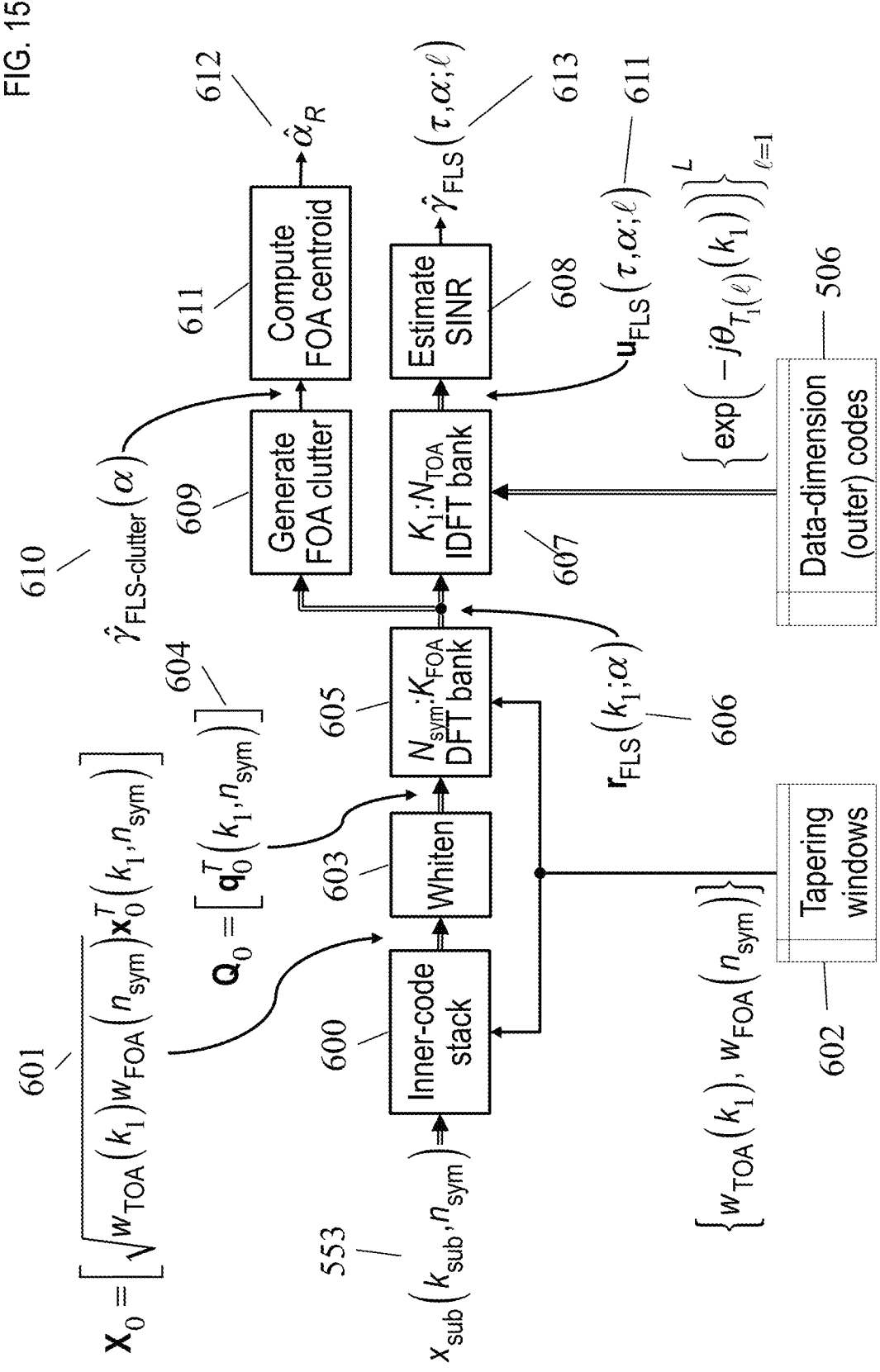
FIG. 15 illustrates an efficient resilient TOA-FOA surface generation process.

The whitened snapshot matrix 604 is then passed through an FFT/IFFT mechanized resilient least-square (LS) search operation 507 to form a least-squares (LS) TOA-FOA surface 613, described in FIG. 15, which provides a detection statistic as a function of candidate TOA and FOA values, and to search the LS TOA-FOA surface 613 to detect each beacon in the whitened snapshot matrix 604, using known data dimension codes 506 applied during beacon time-symbol generation operations shown in FIG. 7, and to determine the observed TOA and FOA, and LS SINR (estimation quality) of the detected beacons. The maximizing TOA and FOA, and the maximal LS SINR are then refined 508, for example, using polynomial fit to the surface peak or parametric search operations in the vicinity of the detected TOA-FOA surface peak. Optionally, a copy-aided parametric estimation method 510 is used to further refine TOA and FOA geo-observables and resolve detector ambiguities 510, using known DoF dimension codes 506 applied during beacon generation operations. In some aspects, results of the copy-aided parametric estimation method 510 is used to further improve estimates of the FOA centroid 612, and optionally the estimate of the timing offset, and the channelized snapshot 553 is regenerated 505 using the improved FOA centroid 612 and optional timing offset estimates, to further improve the geo-observable estimates.

The DoF and data dimensions, and the data dimension codes 506 and DoF dimension codes 509 are set based on the particular form of redundancy exploited in the FFT/IFFT mechanized resilient least-square (LS) search operation 507, as determined by the stacking operation performed in the data stacking and whitening operation 503. For example, in one aspect where the channelized snapshot is stacked over the inner-code dimension, data dimension $N_{data}=K_1 N_{sym}$, and the data dimension codes 506 are the $K_1 \times 1$ outer subcarrier vector 106 phases ; and DoF dimension $M_{DoF}=K_0$ and the DoF dimension codes 509 are the $K_0 \times 1$ inner subcarrier vector 104 phases . In a second aspect where the channelized snapshot is stacked over the outer-code dimension, data dimension $N_{data}=K_0 N_{sym}$, and the data dimension codes 506 are the $K_0 \times 1$ inner subcarrier vector 104 phase ; and DoF dimension $M_{DoF}=K_1$ and the DoF dimension codes 509 are the $K_1 \times 1$ outer subcarrier vector 106 phases .

The key components of this procedure are described in more detail in the next subsections.

Channelization Operations

FIG. 13 depicts exemplary operations used to implement the FOA centroid 612 and optional timing estimate removal and channelization operations 502 in one aspect. The system first performs a FOA centroid and optional timing offset removal operation 550, to remove the estimated FOA centroid 612 $\hat{\alpha}_R$ and optional estimated timing offset $\hat{n}_R$ from the snapshot 303. In some aspects with slotted beacon formats, the prefix and suffix are also discarded prior during the FOA centroid and optional timing offset removal operation 550. The snapshot 303 then has duration $T_R=N_{rep}T_{sym}=N_R T_{ADC}$, where $N_{rep}$ and $N_R$ are integers and $T_{ADC}=1/f_{ADC}$ is the ADC sampling period in the receiver's frame of reference.

The snapshot 303 is then separated into frequency subcarriers and time symbols 551 using a sparse, overlapped, optionally frequency-offset, windowed DFT with overlap time $T_{sym}=N_{ADC}T_{ADC}$, sparsity factor $Q_{sym}$, DFT length $N_{DFT}=Q_{sym}N_{ADC}$, and channelizer window $\{w_R(m_{ADC})\}_{m_{ADC}=0}^{N_{DFT}-1}$, and with frequency offset factor $f_{sym}/2$ if $K_{sub}$ is even. The DFT output bins corresponding to the active beacon subcarrier frequencies are then selected, and a snapshot equalizer operation 552 is applied to those bins. These operations generates a channelized snapshot 553 $x_{sub}(k_{sub}, n_{sym})$ given by $$x_{sub}(k_{sub}, n_{sym}) = G_R(k_{sub}, n_{sym}; \hat{\alpha}_R)\tilde{x}_{sub}(k_{sub}, n_{sym}), \quad \text{(Eq6)}$$

$$\begin{cases} k_{sub} = 0, \ldots, K_{sub}-1 \\ n_{sym} = 0, \ldots, N_{sym}-1, \end{cases}$$

$$\tilde{x}_{sub}(k_{sub}, n_{sym}) = \sum_{m_{ADC}=0}^{N_{DFT}-1} w_R(m_{ADC})x_R(t_R(n_{sym}) + m_{ADC}T_{ADC}) \times \quad \text{(Eq7)}$$

$$\exp\{-j2\pi(f(k_{sub}) + \hat{\alpha}_R)(t_R(n_{sym}) + m_{ADC}T_{ADC})\},$$

where $N_{sym}=N_{rep}-Q_{sym}+1$ is the number of time symbols in the channelized snapshot and $$t_R(n_{sym}) = t_R^{ref} + \left(n - \frac{N_{sym}-1}{2}\right)T_{sym}$$

is the symbol $n_{sym}$ DFT time-center in the receiver's field of reference, and where $G_R(k_{sub}, n_{sym}; \hat{\alpha}_R)$ are snapshot channelizer equalizer 552 weights that remove effects caused by at least the carrier operation 552, and optionally filtering effects of the reception operations 300. Preferentially, the snapshot equalizer 552 weights are given by $$G_R(k_{sub}, n_{sym}; \hat{\alpha}_R) = H_R^{-1}\left(\left(1 - \frac{\hat{\alpha}_R}{f_T}\right)(f(k_{sub}) + \hat{\alpha}_R)\right)\delta_R(k_{sub}, n_{sym}, \hat{\alpha}_R), \quad \text{(Eq8)}$$

where $H_R(f)$ is the aggregate frequency response of the reception operations 300, and where $\delta_R(k_{sub}, n_{sym}; \hat{\alpha}_R)$ removes dispersive effects of the FOA centroid 612 removal operation 502, $$\delta_R(k_{sub}, n_{sym}; \hat{\alpha}_R) = \exp\left\{-j2\pi f(k_{sub})\left(t_R(n_{sym}) - t_R^{ref}\right)\frac{\hat{\alpha}_R}{f_T}\right\}. \quad (Eq9)$$

The aggregate frequency response term is optional, and can be based on modeling of the reception operations 300; or derived from calibration operations performed by the receiver or network, for example, as described in Pattabiraman 2012, and can be based on the magnitude or complex value of those reception operations 300.

Table 2 lists receiver and channelizer parameters compatible with the beacon generation and transmission parameters shown in Table 1. The receiver assumes a dual-ADC sampling rate of 3.84 million samples per second (Msps) for the LMS Scenario, and 30.72 Msps for the 2.4 GHz Ch. 13 Scenario, with sufficient antialiasing filtering to provide a 2 MHz and 20 MHz protected two-way passband, respectively, covering the active bandwidth of the beacons with ±40 kHz and ±400 kHz of guard band for LO uncertainty, respectively. A mixed-radix DFT with factor-of-four sparsity ($Q_{sym}=4$) is assumed in both scenarios, and a separation of 250 µs between successive DFT's. The Table further assumes a 10 millisecond snapshot encompassing 16 symbol repetitions, 13 of which are used in subsequent geo-observable estimation operations, for both scenarios.

TABLE 2

Exemplary Receiver, Channelizer Parameters

| Parameter | LMS Scenario | 2.4 GHz Ch. 13 Scenario |
|---|---|---|
| $SF_{LPF}$ | 2.84 (1 MHz passband) | 2.072 (10 MHz passband) |
| $f_{ADC}$ | 3.84 Msps | 30.72 Msps |
| $W_R$ | 2 MHz | 20 MHz |
| $W_{guard}$ | 40 kHz | 400 kHz |
| $T_{sym}$ | 250 µs ($N_{ADC} \square$ 960) | 250 µs ($N_{ADC} \square$ 9,600) |
| $Q_{sym}$ | 4 (480 subcarriers) | 4 (4,800 subcarriers) |
| $N_{sym}$ | 13 (16 repetitions) | 13 (repetitions) |
| $T_R$ | 10 ms ($N_R$ = 38,400) | 10 ms ($N_R$ = 307,200) |
| Snapshot size | 112.5 KB | 900 KB |

Assuming dual-ADC precision of 12 bits per I and Q rail, consistent with a low-cost receiver front-end, the size of each snapshot is 112.5 KB for the LMS Scenario, and 900 KB for the 2.4 GHz Ch. 13 Scenario. Assuming a snapshot is collected 303 once per second, backhaul 303 of ADC output data to the P/T solution generator requires a snapshot communication bus 304 that can support a 0.922 Mbps one-way data-rate for the LMS Scenario, and a 7.37 Mbps one-way data-rate for the 2.4 GHz Ch. 13 Scenario, well within capabilities of 4G cellular or 802.11 WLAN standards if the P/T solution generator 303 is in the NOC 403. Continuous backhaul of snapshots 302 to the P/T solution generator 303 over the snapshot communication bus 304 would require a factor of 100 higher data-rate, e.g., 92.2 Mbps and 737 Mbps, respectively, for the two scenarios, easily accomplished over Gbps Ethernet if the P/T solution generator 303 is on-board the user 400.

The FOA centroid 612 and optional timing estimate removal and channelization operations 502 can be performed in a number of different manners, for example, using polyphase filtering methods, discrete filter banks centered on each subcarrier frequency, mixtures of radix-2 and non-radix-2 fast Fourier transform (FFT) and inverse-FFT methods, and so on.

Figure 14:
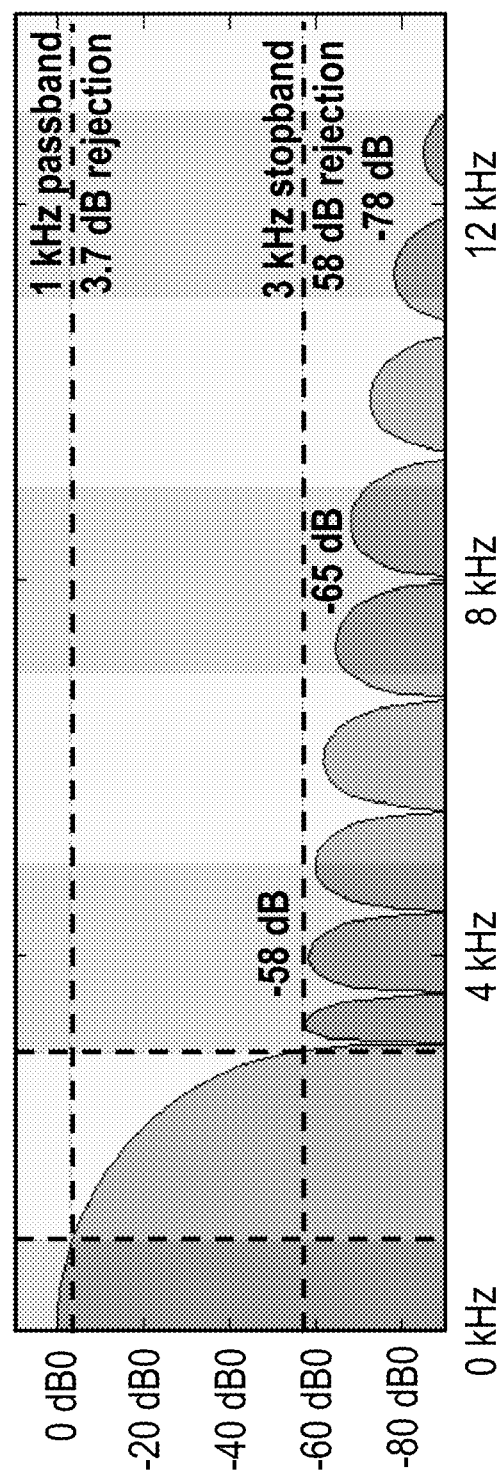
FIG. 14 shows the frequency response of an exemplary channelizer window developed in accordance with some aspects of the disclosure.

FIG. 14 shows the frequency response of an exemplary DFT window developed for the LMS Scenario using an interpolated Parks-McClellan algorithm. The window passband is set to 1 kHz, corresponding ±136 Hz FOA offset expected in this band at the maximum class-1 sUAS airspeed of 44.7 meters/second (100 miles/hour), with ±864 Hz carrier offset margin after FOA centroid 612 removal operations. The window stopband is set to 3 kHz, sufficient to reject any inter-subcarrier interference due to FOA offset from the receiver center frequency. As shown in this FIG., the window provides 3.7 dB rejection within its design passband (much less within ±136 Hz), and over 58 dB of rejection within its design stopband. The DFT window designed for the 2.4 GHz Ch. 13 Scenario has nearly identical performance.

Assuming synchronized beacon transmitters in the network shown in FIG. 1, such that $\tau_{T(t)}(t_{UTC}) \equiv t_{UTC}$ and defining $t_{UTC}^{ref} \triangleq t_{UTC}(t_R^{ref})$ as the actual UTC time (to be estimated in positioning/timing algorithms) at receiver reference time $t_R^{ref}$, and further assuming short snapshots 302 are collected 301, then the channel link gain between the beacon transmitter deployed at network node 401 $\ell$ and a receiver deployed at a user 400 is approximated by $g_{T(t)R}$ $(t_{UTC}) \approx g_{T(t)R} (r_{UTC}^{ref})$, and the TOA and FOA of the beacon received at that user 400 is approximated by $$\tau_{T(t)R}(t_{UTC}) \approx \tau_{T(t)R}(t_{UTC}^{ref}) + (t_{UTC} - t_{UTC}^{ref})\varepsilon_{T(t)R}(t_{UTC}^{ref}), \quad (Eq10)$$

$$\alpha_{T(t)R}(t_{UTC}) \approx -f_T\varepsilon_{T(t)R}(t_{UTC}^{ref}), \text{ where } \tau_{T(t)R}(t_{UTC}^{ref}) = \quad (Eq11)$$

$$\frac{1}{c}\|p_{T(t)R}(t_{UTC}^{ref})\|_2^2 \text{ and } \varepsilon_{T(t)R}(t_{UTC}^{ref}) = -\frac{1}{c}u_{T(t)R}^T(t_{UTC}^{ref})v_R(t_{UTC}^{ref})$$

are the TOA and differential TOA (DTOA) of beacon $\ell$ at time $t_{UTC}^{ref}$, and where $p_{T(t)R}(t_{UTC}) = p_{T(t)}-p_R(t_{UTC})$ is the observed position of network node 401 $\ell$ at the user 400, and $u_{T(t)R}(t_{UTC})=p_{T(t)R}(t_{UTC})/\|p_{T(t)R}(t_{UTC})\|_2$ is the observed line-of-bearing (LOB) from the user 400 to network node 401 $\ell$. The TOA, DTOA, and FOA observed at the ADC sampler in the user 400 reception operations 300 are then given by $$\tilde{\tau}_{T(\ell)R}(t_R) = \tilde{\tau}_{T(\ell)R}(t_R^{ref}) + (t_R - t_R^{ref})\tilde{\varepsilon}_{T(\ell)R}(t_R^{ref}), \quad \text{(Eq12)}$$

$$\tilde{\tau}_{T(\ell)R}(t_R^{ref}) \approx \tau_{T(\ell)R}(t_{UTC}^{ref}) + (t_R^{ref} - t_{UTC}^{ref}), \quad \text{(Eq13)}$$

$$\tilde{\varepsilon}_{T(\ell)R}(t_R^{ref}) = \frac{\varepsilon_R}{1+\varepsilon_R} + \frac{1}{1+\varepsilon_R}\varepsilon_{T(\ell)R}(t_{UTC}^{ref}), \quad \text{(Eq14)}$$

$$\tilde{\alpha}_{T(\ell)R}(t_R^{ref}) = -f_T \tilde{\varepsilon}_{T(\ell)R}(t_R^{ref}). \quad \text{(Eq15)}$$

Further assuming accurate equalization of user 400 reception operations 300, and ideal suppression of inter-subcarrier interference by the channelizer window used in the FOA centroid 612 and optional timing estimate removal and channelization operations 502, channelized snapshot 553 $x_{sub}(k_{sub}, n_{sym})$ is approximated by $$x_{sub}(k_{sub}, n_{sym}) \approx i_{sub}(k_{sub}, n_{sym}) + \sum_{\ell=1}^{L} s_{sub}(k_{sub}, n_{sym}; \ell), \quad \text{(Eq16)}$$

$$s_{sub}(k_{sub}, n_{sym}; \ell) \approx \quad \text{(Eq17)}$$
$$a_{sub}(\ell)d_{sub}(k_{sub}, n_{sym}; \tilde{\tau}_{T(\ell)R}(t_R^{ref}), \tilde{\alpha}_{T(\ell)R}(t_R^{ref}) - \hat{\alpha}_R; \ell),$$

where $\alpha_{sub}(\ell)$ is the end-to-end beacon $\ell$ channelizer output gain, $$a_{sub}(\ell) \approx W_R\left(e^{-j2\pi(\tilde{\alpha}_{T(\ell)R}(t_R^{ref})-\hat{\alpha}_R)T_{ADC}}\right)a_{T(\ell)R}a_{T(\ell)R}(t_R^{ref}), \quad \text{(Eq18)}$$

$$a_{T(\ell)R}(t_R^{ref}) = \quad \text{(Eq19)}$$
$$g_{T(\ell)R}(t_{UTC}^{ref})\sqrt{\frac{P_{T(\ell)}}{K_{sub}}} \exp\{j(\varphi_{T(\ell)} - \varphi_R - 2\pi f_T \tilde{\tau}_{T(\ell)R}(t_R^{ref}))\},$$

and where $d_{sub}(k_{sub}, n_{sym}; \tau, \alpha; \ell)$ is the network node 401 $\ell$ beacon ("beacon $\ell$") at candidate observed TOA $\tau$ and observed FOA $\alpha$, $$d_{sub}(k_{sub}, n_{sym}; \tau, a; \ell) = \quad \text{(Eq20)}$$
$$\exp\{j(\theta_{T(\ell)}(k_{sub}) - 2\pi(f(k_{sub})\tau - (t_R(n_{sym}) - t_R^{ref})a))\} \times$$
$$\exp\left\{j2\pi f(k_{sub})(t_R(n_{sym}) - t_R^{ref})\frac{a}{f_T}\right\},$$
$$\text{and } W_R(e^{j2\pi f}) = \sum_m w_R(m)\exp\{-j2\pi mf\}$$

is the analytic discrete Fourier transform of the channelizer window. Assuming additive white Gaussian noise (AWGN) with noise density $N_0$ at the LPF input and ideal LPF equalization, the background interference $i_{sub}(k_{sub}, n_{sym})$ has identical power $R_{i_{sub}i_{sub}} \approx f_{ADC}N_0\|w_R(m_{ADC})\|_2^2$ on each channelizer output subcarrier, and beacon $\ell$ has identical SNR $\gamma_{T(\ell)R} \approx |a_{sub}(\ell)|^2/R_{i_{sub}i_{sub}}$ on each channelizer output subcarrier.

Using the channelized snapshot 553 model given in (Eq16)-(Eq20), the observed geo-observables $\{\tilde{\tau}_{T(\ell)R}(t_R^{ref}), \tilde{a}_{T(\ell)R}(t_R^{ref})\}_{\ell=1}^{L}$ can in principle be estimated by correlating channelized snapshot 553 $x_{sub}(k_{sub}, n_{sym})$ against $\{d_{sub}(k_{sub}, n_{sym}; \ell)\}_{\ell=1}^{L}$. Moreover, if $$f_T \frac{\pi}{2} N_{sym} K_{sub}|\alpha|,$$

then the second dispersive term in (Eq20) can be ignored, and this correlation can be efficiently mechanized using DFT and inverse-DFT (IDFT) methods. However, at high receive SNR this correlation will yield a poor result, or will require a high time-bandwidth product $N_{sym}K_{sub}$, to remove cross-correlation between co-channel beacons. This problem can be overcome by exploiting the spectral or temporal redundancy imposed in this signal at the transmitter, to implement resilient TOA-FOA estimators. This procedure is described below.

Exemplary Resilient Fine Least-Squares TOA-FOA Estimator

FIG. 15 depicts one aspect employing resilient TOA-FOA estimation, referred to here as the fine least-squares procedure. The channelizer snapshot 553 is first stacked along it's inner code dimension 600, generating $K_0 \times 1$ vector signal $x_0(k_1, n_{sym}) = [x_{sub}(K_0k_1 + k_0, n_{sym})]_{k_0=0}^{K_0-1}$, enumerated over $K_1$ outer subcarrier channel indices $k_1 = 0, \leftrightarrow, K_1 - 1$ and $N_{sym}$ time symbol indices $n_{sym} = 0, \leftrightarrow, N_{sym} - 1$. Using (Eq16)-(Eq20), this signal can be modeled as $$x_0(k_1, n_{sym}) \approx i_0(k_1, n_{sym}) + \sum_{\ell=1}^{L} s_0(k_1, n_{sym}; \ell), \quad \text{(Eq21)}$$

where $\{s_0(k_1, n_{sym}; \ell)\}_{\ell=1}^{L}$ are the $K_0 \times 1$ inner-code stacked beacon signal vectors, respectively, $$s_0(k_1, n_{sym}; \ell) = (\delta_0(n_{sym}; \tilde{\alpha}_{T(\ell)R} - \hat{\alpha}_R) \circ a_0(\tilde{\tau}_{T(\ell)R}; \ell))$$
$$\times (\delta_1(k_1, n_{sym}; \tilde{\alpha}_{T(\ell)R} - \hat{\alpha}_R)d_1(k_1, n_{sym}; \tilde{\tau}_{T(\ell)R}, \tilde{\alpha}_{T(\ell)R} - \hat{\alpha}_R; \ell)), \quad \text{(Eq22)}$$
$$\approx a_0(\tilde{\tau}_{T(\ell)R}; \ell)d_1(k_1, n_{sym}; \tilde{\tau}_{T(\ell)R}, \tilde{\alpha}_{T(\ell)R} - \hat{\alpha}_R; \ell), \quad \text{(Eq23)}$$

and where $a_0(\tau; \ell)$ and $d_1(k_1, n_{sym}; \tau, \alpha; \ell)$ is the $K_0 \times 1$ beacon $\ell$ outer-code spectral signature at trial TOA $\tau$ and scalar inner-code signal at trial TOA $\tau$ and FOA $\alpha$, respectively, $$a_0(\tau; \ell) = a_{sub}(\ell)[\exp\{j(\theta_{T_0(\ell)}(k_0) - 2\pi f_0(k_0)\tau)\}]_{k_1=0}^{K_1-1}, \quad \text{(Eq24)}$$

$$d_1(k_1, n_{sym}; \tau, \alpha; \ell) = \exp\{j(\theta_{T_1(\ell)}(k_0) - 2\pi (f_1(k_1)\tau - (t_R(n_{sym}) - t_R^{ref})\alpha))\}, \quad \text{(Eq25)}$$

and the dispersive terms $\delta_0(n_{sym};\alpha)$ and $\delta_1(k_1,n_{sym};\alpha)$ are given by $$\delta_0(n_{sym};\alpha) = \left[\exp\left\{j2\pi f_0(k_0)(t_R(n_{sym}) - t_R^{ref})\frac{\alpha}{f_T}\right\}\right]_{k_0=0}^{K_0-1}, \quad \text{(Eq26)}$$

$$\delta_1(k_1, n_{sym};\alpha) = \exp\left\{j2\pi f_1(k_1)(t_R(n_{sym}) - t_R^{ref})\frac{a}{f_T}\right\}, \quad \text{(Eq27)}$$

respectively. If $$f_T \frac{\pi}{2} K_0 N_{sym} |\hat{\alpha}_{T(\ell)R} - \hat{\alpha}_R|,$$

then $\delta_0(n_{sym};\hat{a}_{T(\ell)R} - \hat{\alpha}_R) \approx 1_{K_0}$ and $s_0(k_1, n_{sym}; \ell)$ is nondispersive over the inner-code dimension. Similarly, if $$f_T \frac{\pi}{2} K_{sub} N_{sym} |\hat{\alpha}_{T(\ell)R} - \hat{\alpha}_R|,$$

then $\delta_1(k_1, n_{sym};\alpha) \approx 1$ and (Eq23) holds closely. Assuming AWGN background noise and ideal LPF equalization, the $K_0 \times 1$ background interference vector $i_0(k_1, n_{sym}) = [i_{sub}(K_0k_1 + k_0, n_{sym})]_{k_0=0}^{K_0-1}$ has asymptotic autocorrelation matrix (ACM) $R_{i_0 i_0} \to R_{i_{sub} i_{sub}} I_{K_0}$ on each inner subcarrier channel.

This model is closely analogous to a multi-element antenna array with $M_{DoF}$ degrees-of-freedom (DoF's), where $M_{DoF} = K_0$ is the stacking or "DoF" dimension. Similar to an array, it allows the outer-code signals to be detected and separated with an output (despread) SINR approximated by $\gamma_{T(\ell)R} \sim (M_{DoF} - L + 1)\gamma_{T(\ell)R}$ for in presence of strong interference from co-channel beacons ($\gamma_{T(\ell')R} \gg 1$, where $\ell' \neq \ell$), using well-known, mature linear signal separation methods, e.g., least-squares (LS) algorithms, referred to as code nulling in Agee 2000. The method sacrifices one despreader DoF to null each strong signal in the environment, and uses the despreader's remaining DoF's to improve the output SNR of the intended signal. It also admits superresolution geo-observable estimators with accuracy that scales with this output SINR.

The inner-code stacked signal is then formed into $K_1 N_{sym} \times K_0$ windowed data matrix 601 $X_0 = [\sqrt{w_{TOA}(k_1)w_{FOA}(n_{sym})} x_0^T(k_1, n_{sym})]$, where tapering windows 602 $\{w_{TOA}(k_1)\}_{k_1=0}^{K_1-1}$ and $\{w_{FOA}(n_{sym})\}_{n_{sym}=0}^{N_{sym}-1}$ satisfy $\Sigma w_{TOA}(k_1) = \Sigma w_{FOA}(n_{sym}) = 1$, and passed through a whitening operation 603, to generate whitened data matrix 604 $Q_0 = [q_0^T(k_1, n_{sym})]$. The whitening operation 603 can be performed, for example, using QR decomposition (QRD) $\{Q_0, R_0\} = QRD(X_0)$, given by $Q_0 = X_0 R_0^{-1}$, where $R_0$ is an upper-triangular matrix given by $R_0 = \text{chol}\{X_0^H X_0\}$, and where $\text{chol}\{\circ\}$ is the Cholesky factor operation. The QRD can be implemented using a number of efficient methods known to those of ordinary skill in the arts, e.g., modified Gram-Schmidt orthogonalization (MGSO). Other whitening operations, e.g., singular value decomposition, can also be used to whiten $X_0$. The whitened data matrix 604 is then used to form SINR-revealing FLS TOA-FOA surface 613 $\hat{\gamma}_{FLS}(\tau, \alpha; \ell)$, by computing intermediate $K_0 \times 1$ FLS FOA vector 606

$$r_{FLS}(k_1; a) = \sqrt{w_{TOA}(k_1)} \sum_{n_{sym}=0}^{N_{sym}-1} \sqrt{w_{FOA}(n_{sym})}\, q_1^*(k_1, n_{sym}) \exp\{j2\pi n_{sym} T_{sym} a\}, \quad \text{(Eq28)}$$

on each inner subcarrier channel using an DFT bank 605; computing $K_0 \times 1$ whitened FLS linear combiner vector $$\hat{u}_{FLS}(\tau, \alpha; \ell) = \sum_{k_1=0}^{K_1-1} r_{FLS}(k_1; \alpha) \exp\{j(\theta_{T_1(\ell)}(k_1) - 2\pi k_1 f_{sym} K_0 \tau)\}, \quad \text{(Eq29)}$$

for each candidate FOA and data-dimension code 506, for this surface the outer-code, using an IDFT bank; and computing SINR-revealing FLS TOA-FOA surface 613

$$\hat{\gamma}_{FLS}(\tau, \alpha; \ell) = \frac{\|\hat{u}_{FLS}(\tau, \alpha; \ell)\|_2^2}{1 - \|\hat{u}_{FLS}(\tau, \alpha; \ell)\|_2^2}. \quad \text{(Eq30)}$$

Optionally, the FLS FOA vector 606 also yields FLS FOA clutter spectrum 610 $\hat{\gamma}_{FLS-clutter}(\alpha) = \hat{\eta}_{FLS-clutter}(\alpha)/(1 - \hat{\eta}_{FLS-clutter}(\alpha))$, where $$\hat{\eta}_{FLS-clutter}(\alpha) = \sum_{k_1=0}^{K_1-1} \|\hat{r}_{FLS}(k_{sub}, \alpha)\|_2^2, \quad \text{(Eq31)}$$

which can be used to compute FLS deflection statistic $\hat{d}_{FLS}(\tau, \alpha; \ell) = \hat{\gamma}_{FLS}(\tau, \alpha; \ell)/\hat{\gamma}_{FLS-clutter}(\alpha)$, a particularly useful statistic in TOA-FOA spectra containing multiple significant peaks, e.g., due to specular multipath. In some aspects, the clutter statistic is also used to improve the FOA centroid 612, e.g., using formula $$\hat{\alpha}_R \leftarrow \hat{\alpha}_R + \frac{\sum_\alpha (\alpha \hat{\gamma}_{FLS-clutter}(\alpha))}{\sum_\alpha \hat{\gamma}_{FLS-clutter}(\alpha)}, \quad \text{(Eq32)}$$

which can be used to regenerate the channelized snapshot 553.

In absence of substantive multipath, the TOA-FOA estimate is then given by $$(\hat{\tau}_{T(\ell)R}, \hat{\alpha}_{T(\ell)R} - \hat{\alpha}_R) = \arg \max_{\substack{0 \leq \tau < T_{sym}/K_0 \\ |\alpha| \leq f_{sym}}} \hat{\gamma}_{FLS}(\tau, \alpha; \ell), \quad \text{(Eq33)}$$

and the maximal TOA-FOA surface 613 value is a metric of the SINR of the FLS combiner output signal at the estimated TOA and FOA, $\hat{\gamma}_{FLS}(\ell) = \hat{\gamma}_{FLS}(\hat{\tau}_{T(\ell)R}, \hat{\alpha}_{T(\ell)} - \hat{\alpha}_R; \ell)$. The inner-stacked spectral signature is optionally estimated by $\hat{a}_0(\ell) = (C_0^H \hat{u}_{FLS}(\hat{\tau}_{T(\ell)R}, \hat{\alpha}_T(\ell)R - \hat{\alpha}_R; \ell))$ where $C_0 = R_0^{-1}$. The TOA and FOA error variances are further optionally estimated by $\hat{\sigma}_{(\circ)}^2(\ell)/\hat{\gamma}_{FLS}(\ell)$, where $$\sigma_{TOA}^2 = \frac{\|w_{TOA}(k_1)\|_2^2 \|w_{FOA}(n_{sym})\|_2^2}{8\pi^2(\langle f_1^2(k_1)\rangle - \langle f_1(k_1)\rangle^2)} \geq \frac{3}{4\pi^2} \frac{T_{sym}^2}{K_1 N_{sym} K_0^2 (K_1^2-1)}, \quad \text{(Eq34)}$$

$$\sigma_{FOA}^2 = \frac{\|w_{TOA}(k_1)\|_2^2 \|w_{FOA}(n_{sym})\|_2^2}{8\pi^2(\langle t_R^2(n_{sym})\rangle - \langle t_R(n_{sym})\rangle^2)} \geq \frac{3}{4\pi^2} \frac{f_{sym}^2}{K_1 N_{sym}(N_{sym}^2-1)}, \quad \text{(Eq35)}$$

and where the lower bounds in (Eq34)-(Eq35) are achieved for flat tapering windows 602. Moreover, the background TOA-FOA surface 613 values are a factor of $2\|w_{TOA}(k_1)\|_2^2 \|w_{FOA}((n_{sym})\|_2^2 \geq 2/K_1 N_{sym}$ below $\hat{\gamma}_{FLS}(\ell)$, where the lower bound is also achieved for flat tapering windows 602. For this reason, flat tapering windows 602 are recommended in absence of channel multipath, and shaped tapering windows 602 recommended if multiple TOA-FOA surface 613 peaks are expected, e.g., due to strong specular multipath.

The whitening operation 603 requires the DoF's of $x_0(k_1, n_{sym})$, $M_{DoF} = K_0$, be substantively larger than the number of inner-code stacked signal vectors, $N_{data} = K_1 N_{sym}$. If the tapering windows 602 are rectangular, the SINR-revealing metric $\hat{\gamma}_{FLS}(\ell)$ can be optionally converted to unbiased SINR estimate $$\tilde{\gamma}_{FLS}(\ell) = \left(1 - \frac{K_0-1}{K_1 N_{sym}}\right) \hat{\gamma}_{FLS}(\ell) - \frac{K_0}{K_1 N_{sym}}, \quad \text{(Eq36)}$$

which holds closely if the interference is i.i.d. complex-Gaussian over the outer-code dimension.

Assuming uniform FOA spacing $\alpha(k_{FOA}) = (k_{FOA}/K_{FOA}) f_{sym}$, (Eq28) can be computed using $K_0 K_1 = K_{sub} N_{sym} : K_{FOA}$ efficient DFT operations. Similarly, assuming uniform TOA spacing $\tau(n_{TOA}) = (n_{FOA}/N_{TOA}) T_{sym}/K_0$, (Eq29) can be computed using $K_0 K_{FOA} L K_1 : M_{TOA}$ efficient inverse-DFT (IDFT) operations. These operations are both highly regular and parallelizable, allowing their implementation using efficient FPGA or general-purpose GPU (GPGPU) computation modules.

The FLS TOA-FOA estimates given in (Eq33), and the FLS SINR, are further refined using local search methods in the vicinity of the maximizing FLS TOA-FOA surface value 508. Simple methods for accomplishing include polynomial fit to the surface peak, e.g., using two-dimensional quadratic fit over the nearest neighbors to the maximizing surface grid location. Optionally, parametric search operations that exploit the fully-dispersive form of $d_1(k_1, n_{sym}; \tau, \alpha; \ell)$ given in (Eq25) multiplied by $\delta_1(k_1, n_{sym}; \alpha)$ in (Eq27), can be used. In one aspect, Newton and Gauss-Newton recursions are defined over the symbol-normalized TOA-FOA vector $$\hat{v}_1(\ell) = \begin{pmatrix} \hat{\tau}_{T(\ell)R} K_0 f_{sym} - \text{floor } (\hat{\tau}_{T(\ell)R} K_0 f_{sym}) \\ \hat{\alpha}_{T(\ell)R} T_{sym} - \text{round } (\hat{\alpha}_{T(\ell)R} T_{sym}) \end{pmatrix}. \quad \text{(Eq37)}$$

Defining 2×1 symbol-normalized frequency-time vector $$g_1(k_1, n_{sym}) \triangleq \begin{pmatrix} -\left(k_1 - \frac{K_1-1}{2}\right) \\ \left(1 + \frac{f_1(k_1)}{f_T}\right)\left(n_{sym} - \frac{N_{sym}-1}{2}\right) \end{pmatrix}, \quad \text{(Eq38)}$$

$$\begin{cases} 0 \leq k_1 < K_1 \\ 0 \leq n_{sym} < N_{sym} \end{cases},$$

and $K_1 N_{sym} \times 2$ symbol-normalized matrix $G_1 = [g_1^T(k_1, n_{sym})]$, the recursion is given by $$d_1(\ell) = \quad \text{(Eq39)}$$
$$\left[\sqrt{w_{TOA}(k_1) w_{FOA}(n_{sym})} \exp\{j(\theta_{T_1(\ell)}(k_1) + 2\pi g_1^T(k_1, n_{sym}) \hat{v}_1(\ell))\}\right],$$

$$u_{FLS}(\ell) = Q_0^H d(\ell), \quad \text{(Eq40)}$$

$$y_1(\ell) = Q_0 u_{FLS}(\ell), \quad \text{(Eq41)}$$

$$g_{FLS}(\ell) = G_1^T \text{Im}\{y_1(\ell) \circ d_1^*(\ell)\}, \quad \text{(Eq42)}$$

$$H_{FLS}(\ell)_+ = G_1^T \text{Re}\{(Q_0 Q_0^H) \circ (d_1^*(\ell) d_1^T(\ell))\} G_1, \quad \text{(Eq43)}$$

$$H_{FLS}(\ell) = H_{FLS}(\ell)_+ + G_1^T \text{diag}\{Re(y_1(\ell) \circ d_1^*(\ell))\} G_1, \quad \text{(Eq44)}$$

$$\hat{v}_1(\ell) \leftarrow \begin{cases} \hat{v}_1(\ell) + \frac{1}{2\pi} H_{FLS}^{-1}(\ell)_+ g_{FLS}(\ell), & \text{Gauss-Newton recursion} \\ \hat{v}_1(\ell) + \frac{1}{2\pi} H_{FLS}^{-1}(\ell) g_{FLS}(\ell), & \text{Newton recursion} \end{cases} \quad \text{(Eq45)}$$

$$\hat{v}_1(\ell) \leftarrow \begin{pmatrix} (\hat{v}_1(\ell))_1 - \text{floor } \{(\hat{v}_1(\ell))_1\} \\ (\hat{v}_1(\ell))_2 - \text{round } \{(\hat{v}_1(\ell))_2\} \end{pmatrix}. \quad \text{(Eq46)}$$

The final TOA and FOA are then given $\hat{\tau}_{T(\ell)R} = (\hat{v}_1(\ell))_1 T_{sym}/K_0$ and $\hat{\alpha}_{T(\ell)R} = (\hat{v}_1(\ell))_2 f_{sym}$, and the FLS SINR estimate is given by $\hat{\gamma}_{FLS}(\ell) = \|u_{FLS}(\ell)\|_2^2 / 1 - \|u_{FLS}(\ell)\|_2^2$.

Equation (Eq33) shows that the FLS TOA-FOA spectrum 613 possesses TOA and FOA ambiguity $T_{sym}/K_0$ and $f_{sym}$, respectively. In some aspects, this ambiguity is resolved using copy-aided parameter estimation methods 510 that exploit the model of $a_0(\tau; \ell)$ given in (Eq24). In one aspect, the copy-aided ambiguity resolution algorithm is given by $$u_0(n_{zone}, k_{tile}; \ell) = \left[\exp\{-j\theta_{T_0(\ell)}((k_0 - k_{tile}) \text{mod} K_0)\}\right]_{k_0=0}^{K_0-1} \circ \quad \text{(Eq47)}$$
$$\left[\exp\left\{j2\pi f_0(k_0)\left(\hat{\tau}_{T(\ell)R} + n_{zone} \frac{T_{sym}}{K_0}\right)\right\}\right]_{k_0=0}^{K_0-1},$$

$$v_0(n_{zone}, k_{tile}; \ell) = C_0^H u_0(n_{zone}, k_{tile}; \ell), \quad \text{(Eq48)}$$

$$g_0(n_{zone}, k_{tile}; \ell) = u_{FLS}^H(\ell) v_0(n_{zone}, k_{tile}; \ell), \quad \text{(Eq49)}$$

$$S_{FLS}(n_{zone}, k_{tile}; \ell) = |g_0(n_{zone}, k_{tile}; \ell)|^2 / \|v_0(n_{zone}, k_{tile}; \ell)\|_2^2, \quad \text{(Eq50)}$$

$$\{\hat{n}_{zone}(\ell), \hat{k}_{tile}(\ell)\} = \arg \max_{\substack{n_{zone}=0,\pm,K_0-1 \\ k_{tile}=-K_{tile},\pm,+K_{tile}}} S_{FLS}(n_{zone}, k_{tile}; \ell), \quad \text{(Eq51)}$$

where $u_{FLS}(\ell)$ is given by (Eq40), and where $\hat{n}_{zone}(\ell)$ and $\hat{k}_{tile}(\ell)$ are the TOA zone and FOA tile containing the beacon $\ell$ detection, respectively. The full TOA and FOA geo-observables are then given by $$\hat{\tau}_{T(\ell)R} \leftarrow \hat{\tau}_{T(\ell)R} + \hat{n}_{zone}(\ell) \frac{T_{sym}}{K_0} \text{ and } \hat{\alpha}_{T(\ell)R} \leftarrow \hat{\alpha}_R + \hat{\alpha}_{T(\ell)R} + \hat{k}_{tile}(\ell) f_{sym},$$

respectively. If $\hat{k}_{tile}(\ell) \neq 0$ for any detected beacon, then the FOA centroid 612 $\alpha_R$ is optionally recomputed, e.g., using weighted estimate $$\hat{\alpha}_R \leftarrow \sum_{\ell \in \ell_{detect}} \hat{\gamma}_{FLS}(\ell) \hat{\alpha}_{T(\ell)R} / \sum_{\ell \in \ell_{detect}} \hat{\gamma}_{FLS}(\ell),$$

and the channelized snapshot 553 is regenerated 505 and the subsequent FLS geo-observable estimation operations shown in FIG. 12 are repeated with the new FOA centroid 612 estimate.

The copy-aided ambiguity estimator also provides complex gain estimate $$\hat{a}_{sub}(\ell) = \frac{g_0(\hat{n}_{zone}(\ell), \hat{k}_{tile}(\ell); \ell)}{|g_0(\hat{n}_{zone}(\ell), \hat{k}_{tile}(\ell); \ell)|^2 +} \quad \text{(Eq52)}$$
$$(1 - \|u_{FLS}(\ell)\|_2^2) \|v_0(\hat{n}_{zone}(\ell), \hat{k}_{tile}; \ell)\|_2^2$$

which can be used to compute the beacon ℓ channelizer output power and phase offset. These parameters provide key inputs for channel calibration operations, e.g., to determine transmit and receive carrier phase, and true channel pathloss, for subsequent network calibration operations.

Table 3 lists FLS surface generation parameters usable in the exemplary UTM and IIoT scenarios described here. The degrees of freedom are large enough to separate all of the beacons in the users' FoV's for each scenario, which a roughly factor-of-two excess to account for multipath reflections. In each case, the number of data entries is a large enough multiple of the despreader DoF's to yield a stable QRD and FLS estimate.

TABLE 3

Exemplary FLS Surface Generation Parameters

| Parameter | LMS Scenario | 2.4 GHz Ch. 13 Scenario |
|---|---|---|
| $K_0$ ($M_{DoF}$) | 32 | 80 |
| $K_1 N_{sym}$ ($N_{data}$) | 555 | 2,200 |
| $K_{FOA}$ | 128 bins | 128 bins |
| $M_{TOA}$ | 32 lags | 128 lags |

Table 4 summarizes complexity of the channelization and FLS surface generation operations for the two scenarios, assuming one real multiply-and-add per operation, and assuming the whitening operation 603 is performed using a QRD instantiated using Modified Gram-Schmidt Orthogonalization (MGSO). Of these operations, the QRD uses than 23% of the total operations in each scenario. The complexity is well within the capabilities of modern DSP gear, even for the 2.4 GHz Ch. 13 Scenario. Moreover, the channelization and DFT/IDFT operations are easily implemented in FPGA (e.g., Xilinx 7K325T or higher devices) or using general-purpose GPU's (GPGPU's).

TABLE 4

Channelization, FLS TOA-FOA Surface Generation Complexity

| Operation | LMS Scenario | 2.4 GHz Ch. 13 Scenario |
|---|---|---|
| Channelization | 7.06 Mops | 61.9 Mops |
| FLS whitening | 2.27 Mops | 56.8 Mops |
| FLS surface | 6.57 Mops | 130.2 Mops |
| Total FLS | 15.9 Mops | 248.9 Mops |

Table 5 summarizes memory requirements of the FLS surface generation procedure for the two scenarios. The memory requirements assuming 64-bit data precision at each stage of processing, and in-place QRD operations. The channelization operation imposes the bulk of memory requirements for each scenario, and is not particularly onerous in any case. The channelization memory is also well within capability of modern DSP, FPGA (e.g., Xilinx 7K325T or higher devices), or GPGPU's.

TABLE 5

Channelization, FLS TOA-FOA Surface Generation Memory

| Operation | LMS Scenario | 2.4 GHz Ch. 13 Scenario |
|---|---|---|
| Channelization | 2 MB | 15.54 MB |
| FLS whitening | 21 KB | 119 KB |
| FLS surface | 11 KB | 64 KB |
| Total FLS | 2.03 MB | 15.72 MB |

FIG. 16A FIG. 16B, FIG. 17A and FIG. 17B show the FLS TOA-FOA surface 613 obtaining for the LMS Scenario and 2.4 GHz Ch. 13 Scenario, respectively, and for the surface instantiation parameters given in Table 3. Beacon 10 (out of 32 beacons searched, and 18 beacons detected, i.e., every network node 401 in the FoV of User 1 400) is chosen for the LMS Scenario, and Beacon 37 (out of 50 beacons searched, and 29 beacons detected, i.e., every network node 401 in the FoV of User 1 400) is chosen for the 2.4 GHz Ch. 13 Scenario, because they each provide a median peak value over all the beacons detected during their respective TOA-FOA searches.

Figure 16:
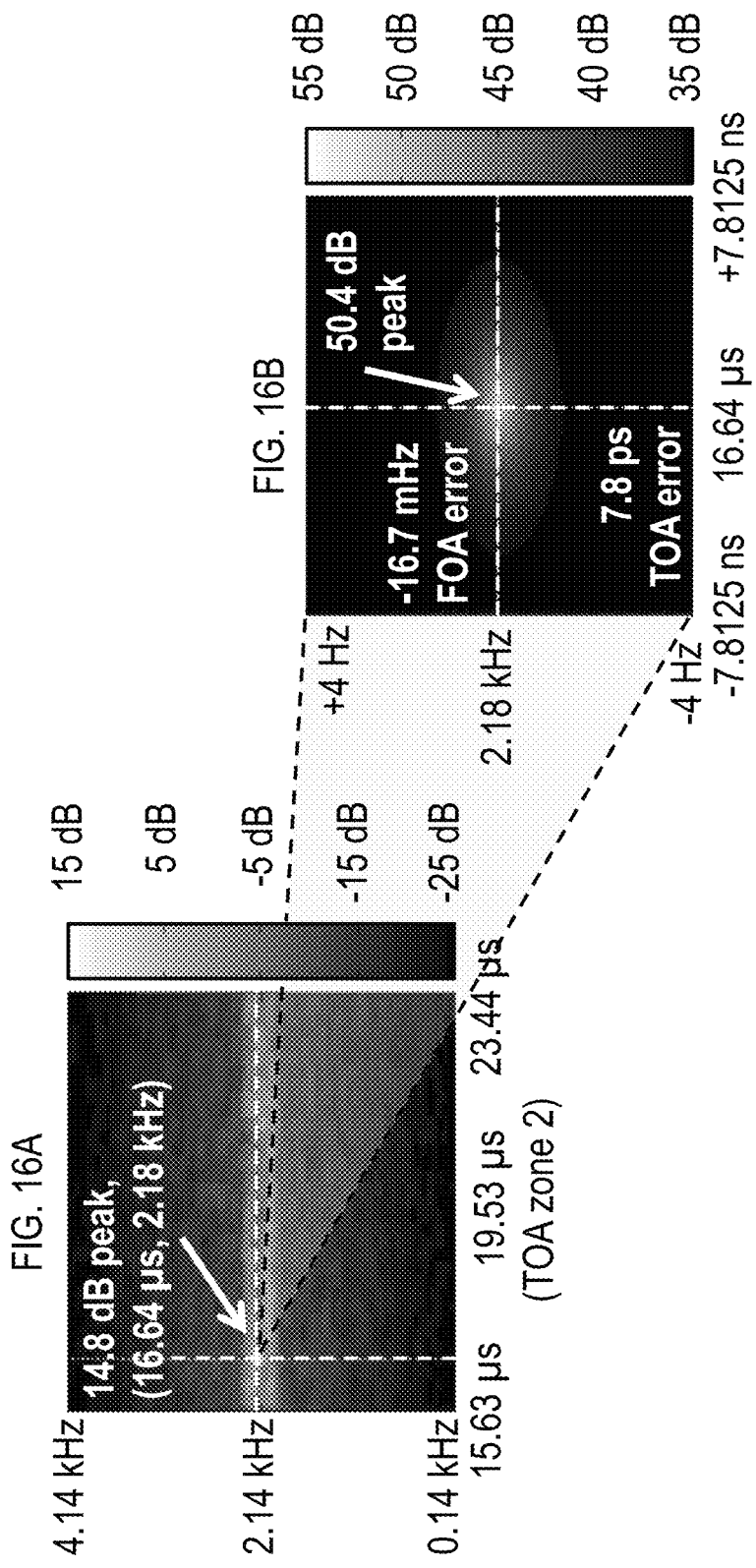
FIG. 16A and FIG. 16B and FIG. 17A and FIG. 17B show the TOA-FOA surface obtained for two aspects of the disclosure.

FIG. 16A shows the exemplary LMS Scenario FLS TOA-FOA surface 613 over its full range, generated using the simplified outer-code signal model given in (Eq25). The FLS TOA-FOA surface 613 also shows detection of TOA zone 2, using the copy-aided TOA-FOA ambiguity resolution method 510 described in (Eq47)-(Eq51). The FOA clutter spectrum 610 is clearly visible in the full TOA-FOA surface 613, as well as a single TOA-FOA peak obtained at a 14.8 dB estimated SINR, or 17.1 dB above the background clutter. No other peaks associated with any other network node 401 are visible, despite the fact that 18 network nodes 401 are in the user's 400 FoV.

FIG. 16B shows results of a 500×500 parametric local search 508 centered on the peak of the full FLS TOA-FOA surface 613 shown in FIG. 16A, and generated using the extended outer-code signal model given by (Eq25), multiplied by dispersive term (Eq27). The benefit of the extended outer-code signal model is evident in the maximal peak value of 50.4 dB—a 35.6 dB increase over the full TOA-FOA surface 613, and 52.8 dB above the FOA clutter spectrum 610. The TOA-FOA error for this case is (7.8 μs, −16.7 mHz), comparable to the (51.6 μs, 10.6 mHz) $95^{th}$ percentile CRB for this case, showing that the method is adhering well to expected performance.

Figure 17:
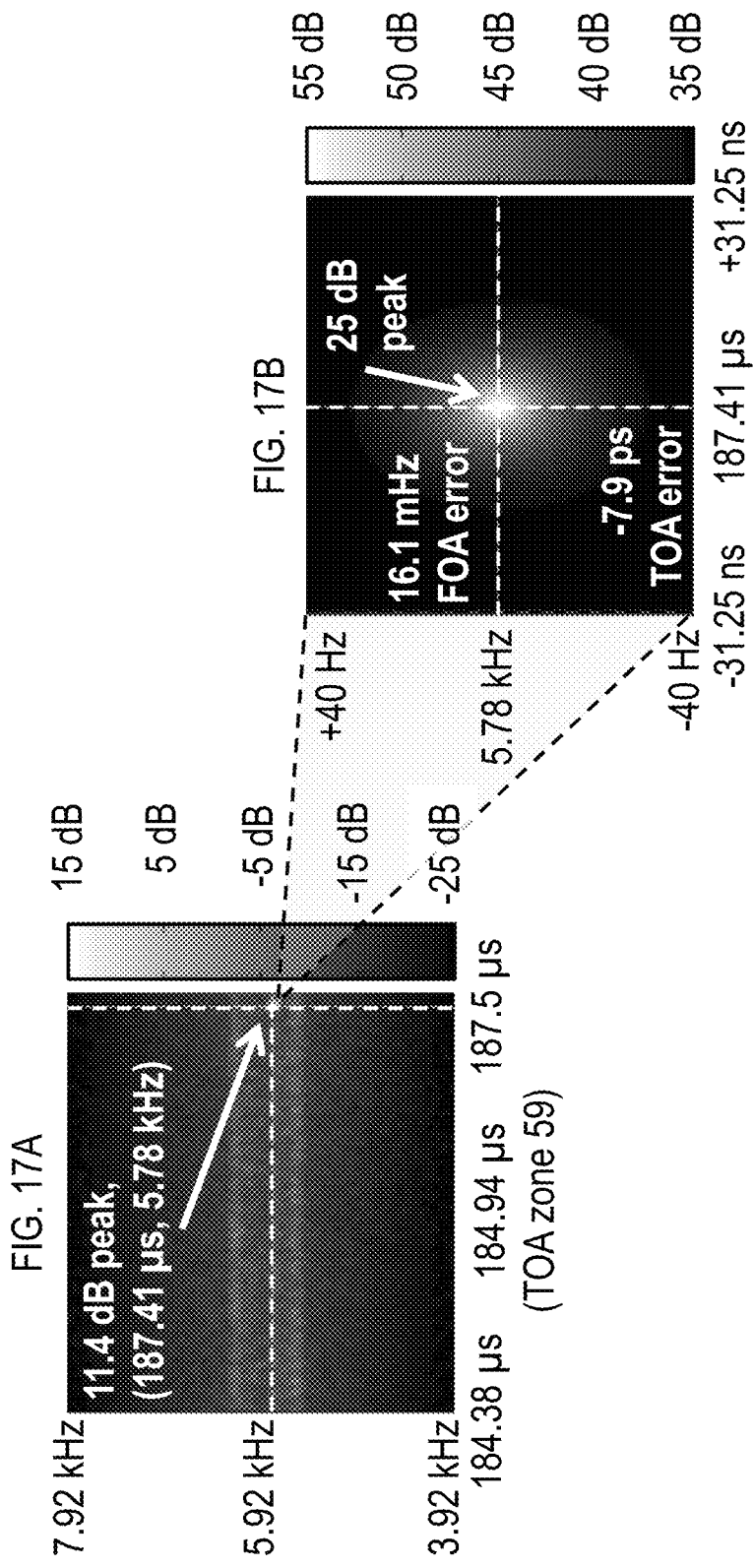

FIG. 17A shows the exemplary 2.4 GHz Ch. 13 FLS TOA-FOA surface 613 over its full range, generated using the simplified outer-code signal model given in (Eq25). The FLS TOA-FOA surface 613 also shows detection of TOA zone 59, using the copy-aided TOA-FOA ambiguity resolution method 510 described in (Eq47)-(Eq51). The FOA clutter spectrum 610 is clearly visible in this surface, as well as a single TOA-FOA peak obtained at an 11.4 dB estimated SINR, 19.4 dB above the background clutter. No other peaks are visible, despite the fact that 29 network nodes 401 are in the user's 400 FoV.

FIG. 17B shows a 50×50 parametric local search 508, centered on the peak of the full FLS TOA-FOA surface 613 shown in FIG. 17A, and generated using the extended outer-code signal model given by (Eq25), multiplied by dispersive term (Eq27). The benefit of the extended outer-code signal model is also evident in the maximal peak value of 25 dB—a 13.6 dB increase over the full FLS TOA-FOA surface 613, and 33 dB above the FOA clutter spectrum 610. The TOA-FOA error for this case is (−7.9 μs, 16.1 mHz), comparable to the (39.6 μs, 82.2 mHz) 95$^{th}$ percentile CRB for this case, showing that the method is also adhering well to expected performance in this Scenario.

Other aspects of the disclosure employ similar operations using alternate stacking methods. These include outer-code stacking, which transforms $x_{sub}(k_{sub},n_{sym})$ into $K_1 \times 1$ outer-code stacked vector $x_1(k_0,n_{sym})=[x_{sub}(K_0k_1+k_0, n_{sym})]_{k_1=0}^{K_1-1}$, and symbol stacking, which transforms $x_{sub}(k_{sub},n_{sym})$ into $N_{sym} \times 1$ symbol-stacked vector $x_{sym}(k_{sub}, n_{sym})=[x_{sub}(k_{sub},n_{sym})]_{n_{sym}=0}^{N_{sym}-1}$. Each stacking operation has advantages and disadvantages. Inner-code stacking results in a TOA estimate $\hat{\tau}_{r(t)R} \approx \tau_{r(t)R} \mod(T_{sym}/K_0)$, i.e., with range aliased between 0 and $T_{sym}/K_0$, but with high precision within that range. For this reason it is referred to here as the fine least-squares (FLS) estimator. Conversely, outer-code stacking yields TOA estimate $\hat{\tau}_{r(t)R} \approx \tau_{r(t)R} \mod T_{sym}$, i.e., with range aliased to full range between 0 and $T_{sym}$, but with precision that is a factor of $K_0$ coarser. It is referred to here as the coarse least-squares (CLS) estimator. Both estimators provide full range and precision in FOA. The symbol-stacked estimator provides full range and precision in TOA, but no estimate of FOA estimate. In all cases, these issues are resolvable using copy-aided post-processing methods 508.

Geo-Observable Based Positioning/Timing Procedure

Figure 18:
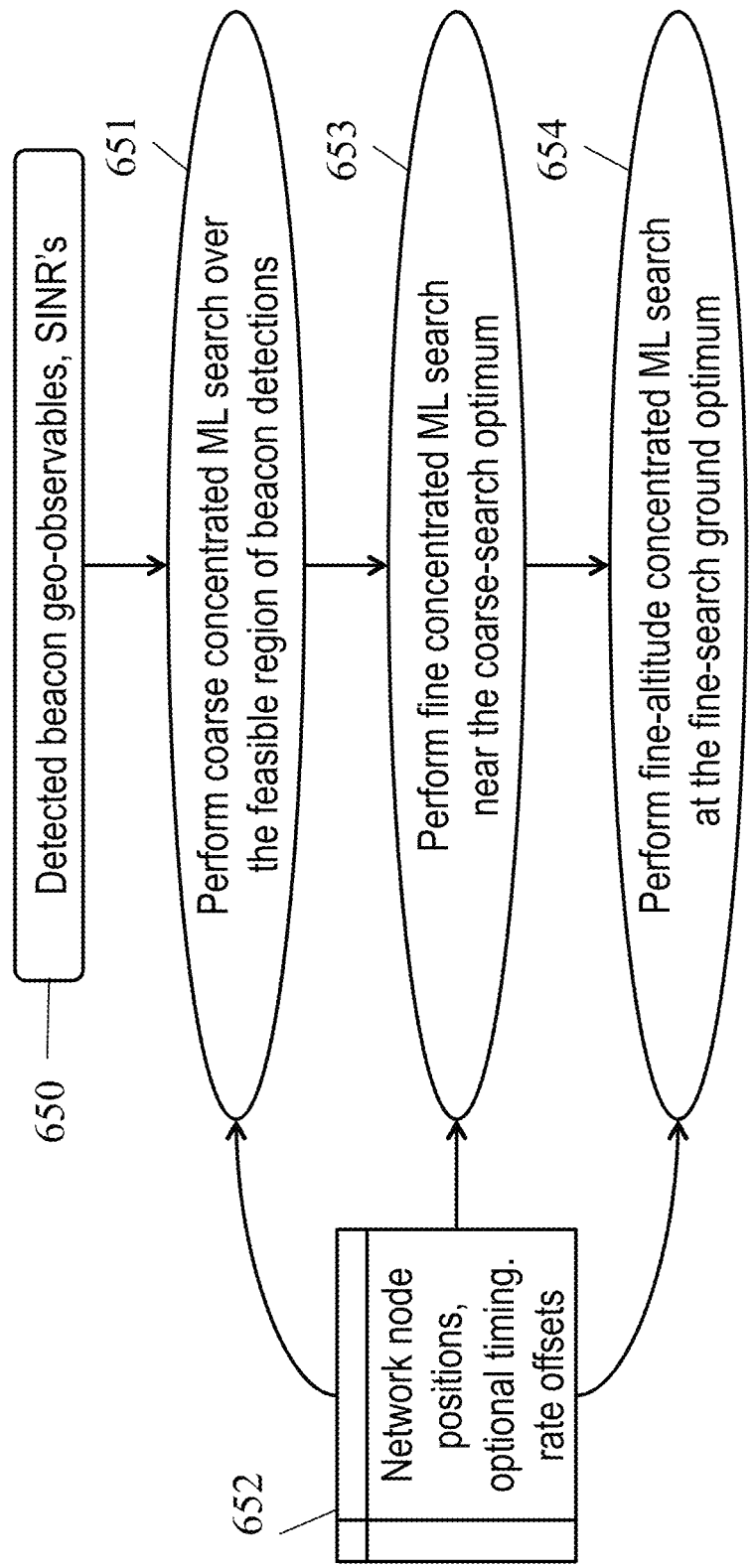
FIG. 18, FIG. 19, and FIG. 20 depict geo-observable based positioning/timing operations used in an aspect of the disclosure.

FIG. 18 shows the geo-observable based positioning and timing procedure disclosed here, applicable to at least the network shown in FIG. 1, and describes the common operations used in each stage. The procedure optimizes maximum-likelihood (ML) objective function $$F_{MLE}(p_R, v_R, \tau_R, \alpha_R) = \frac{1}{2}\left(\frac{1}{\sigma_{TOA}^2}F_{TOA}(p_R, \tau_R) + \frac{1}{\sigma_{FOA}^2}F_{FOA}(p_R, v_R, \alpha_R)\right), \quad (Eq53)$$

where $F_{TOA}(p_R, \tau_R)$ and $F_{FOA}(p_R, v_R, \alpha_R)$ are the TOA-only and FOA-only ML estimators, respectively, $$F_{TOA}(p_R, \tau_R) = \sum_{\ell \in \mathcal{L}_{detect}} \hat{\gamma}_{(\bullet)}(\ell)\left(\hat{\tau}_{T(\ell)R} - \left(\tau_R + \frac{1}{c}\|p_{T(\ell)R}\|_2\right)\right)^2, \quad (Eq54)$$

$$F_{FOA}(p_R, v_R, \alpha_R) \approx \sum_{\ell \in \mathcal{L}_{detect}} \hat{\gamma}_{(\bullet)}(\ell)\left(\hat{\alpha}_{T(\ell)R} - \left(\alpha_R + \frac{1}{\lambda_T}u_{T(\ell)R}^T v_R\right)\right)^2, \quad (Eq55)$$

and where $\lambda_T = f_T/c$ is the nominal signal-in-space wavelength, $\sigma_{TOA}^2$ and $\sigma_{FOA}^2$ are given in (Eq34) and (Eq35), respectively. In the aspect described here, the networks nodes 401 are assumed to be fixed and have known positions, such that network node 401 position $p_{r(t)}(t_{UTC}) \equiv p_{r(t)}$ and velocity $v_{r(t)}(t_{UTC}) \equiv 0$. If the network nodes' 401 system clocks 214 are synchronized to UTC, then the user 400 system clock 214 and LO offsets in the reception operations 300 are given by $\tau_R = t_R^{ref} - t_{UTC}(t_R^{ref}) = t_R^{ref} - t_{UTC}^{ref}$ and $\alpha_R = -f_T \varepsilon_R/(1+\varepsilon_R)$, respectively, allowing the UTC time at known receive reference time $t_R^{ref}$ and the clock rate offset $\varepsilon_R$ to be derived from the observed estimates, and the user 400 position and velocity being estimated by the method are given by $p_R = p_R(t_{UTC}^{ref})$ and $v_R = v_R(t_{UTC}^{ref})$, respectively.

In some aspects, the network nodes' 401 system clocks 214 are not fully synchronized to UTC, but network node 401 timing offsets $\{\tau_{T(\ell)}^{ref} = -t_{UTC}(t_{T(\ell)}^{ref})\}_{\ell=1}^{L}$ and rate offsets $\{\varepsilon_{T(\ell)}\}_{\ell=1}^{L}$ from UTC have been estimated, e.g., using network calibration procedures. In this case, the detected TOA's and FOA's are adjusted to compensate for these offsets. In one aspect this is performed by setting $$\hat{\tau}_{T(\ell)R} \leftarrow \hat{\tau}_{T(\ell)R} - (t_{T(\ell)}^{ref} - (1+\hat{\varepsilon}_{T(\ell)})\hat{t}_{UTC}(t_{T(\ell)}^{ref})), \quad (Eq56)$$

$$\hat{\alpha}_{T(\ell)R} \leftarrow \hat{\alpha}_{T(\ell)R} + f_T \hat{\varepsilon}_{T(\ell)}, \quad (Eq57)$$

prior to computation of the ML estimator. It should be noted that (Eq57) is not exact, as it fails to include division of the second term by $1+\varepsilon_R$ as shown in (Eq14). However, this effect is minor for user 400 system clocks 214 with <20 ppm rate offset, and can be removed in subsequent refinements.

Estimating and concentrating $\tau_R$ and $\alpha_R$ estimates out of (Eq54)-(Eq55) yields $$\hat{\tau}_R|_{ML} = \sum_{\ell \in \mathcal{L}_{detect}} \left(\frac{\hat{\gamma}_{(\bullet)}(\ell)}{\sum_{\ell' \in \mathcal{L}_{detect}} \hat{\gamma}_{(\bullet)}(\ell')}\right)\left(\hat{\tau}_{T(\ell)R} - \frac{1}{c}\|p_{T(\ell)R}\|_2\right) = \quad (Eq58)$$

$$\left\langle \hat{\tau}_{T(\ell)R} - \frac{1}{c}\|p_{T(\ell)R}\|_2\right\rangle_{\mathcal{L}_{detect}},$$

$$\Rightarrow F_{TOA}(p_R) \leftarrow \left\langle\left(\hat{\tau}_{T(\ell)R} - \frac{1}{c}\|p_{T(\ell)R}\|_2\right)^2\right\rangle_{\mathcal{L}_{detect}} - \quad (Eq59)$$

$$\left\langle\hat{\tau}_{T(\ell)R} - \frac{1}{c}\|p_{T(\ell)R}\|_2\right\rangle_{\mathcal{L}_{detect}}^2 = \left\langle\left((\hat{\tau}_{T(\ell)R} - \langle\hat{\tau}_{T(\ell)R}\rangle_{\mathcal{L}_{detect}}) - \frac{1}{c}(\|p_{T(\ell)R}\|_2 - \langle\|p_{T(\ell)R}\|_2\rangle_{\mathcal{L}_{detect}})\right)^2\right\rangle_{\mathcal{L}_{detect}}.$$

$$\hat{\alpha}_R|_{ML} = \left\langle\hat{\alpha}_{T(\ell)R} - \frac{1}{\lambda_T}u_{T(\ell)R}^T v_{T(\ell)R}\right\rangle_{\mathcal{L}_{detect}}, \quad \lambda_T = \frac{c}{f_T}, \quad (Eq60)$$

$$\Rightarrow F_{FOA}(p_R, v_R) \leftarrow \left\langle\left(\hat{\alpha}_{T(\ell)R} - \frac{1}{\lambda_T}u_{T(\ell)R}^T v_R\right)^2\right\rangle - \quad (Eq61)$$

$$\left\langle\hat{\alpha}_{T(\ell)R} - \frac{1}{\lambda_T}u_{T(\ell)R}^T v_R\right\rangle_{\mathcal{L}_{detect}}^2 = \left\langle\left((\hat{\alpha}_{T(\ell)R} - \langle\hat{\alpha}_{T(\ell)R}\rangle_{\mathcal{L}_{detect}}) - \frac{1}{\lambda_T}(u_{T(\ell)R} - \langle u_{T(\ell)R}\rangle_{\mathcal{L}_{detect}})^T v_R\right)^2\right\rangle.$$

Introducing intermediate parameters $$\tilde{v}_{T(\ell)R} = \frac{1}{\lambda_T}(\hat{\alpha}_{T(\ell)R} - \langle\hat{\alpha}_{T(\ell)R}\rangle_{\mathcal{L}_{detect}}) \text{ and}$$

$$\tilde{u}_{T(\ell)R} = u_{T(\ell)R} - \langle u_{T(\ell)R}\rangle_{\mathcal{L}_{detect}},$$

the velocity is further concentrated out of (Eq61), yielding $$\hat{v}_R|_{ML} = \langle\tilde{u}_{T(\ell)R}\tilde{u}_{T(\ell)R}^T\rangle_{\mathcal{L}_{detect}}^{-1}\langle\tilde{u}_{T(\ell)R}\tilde{v}_{T(\ell)R}\rangle_{\mathcal{L}_{detect}}, \quad (Eq62)$$

$$\Rightarrow F_{FOA}(p_R) \leftarrow \langle\tilde{v}_{T(\ell)R}^2\rangle - (\langle\tilde{u}_{T(\ell)R}\tilde{v}_{T(\ell)R}\rangle_{\mathcal{L}_{detect}}^T \hat{v}_R|_{ML}). \quad (Eq63)$$

The concentrated TOA and FOA objective functions can then be used to find all of the user 400 positioning and timing parameters, by conducting a search over position $p_R$ alone.

Once the beacon geo-observables, and SINR's have been estimated, and the beacons have been detected or detection failure has been logged 605, a three-stage procedure is used to jointly geolocate the sUAS, and to determine its timing and carrier offset from the beacon network. In the first stage, a coarse areal search is carried out over the entire network geography 651, using the known position of the beacons and optional timing and rate offset estimates 652. Next, a fine areal search is carried out at the optimal search point determined during the coarse search 653. Lastly, a fine altitude search is carried out at the final fine-search location 654.

Figure 19:
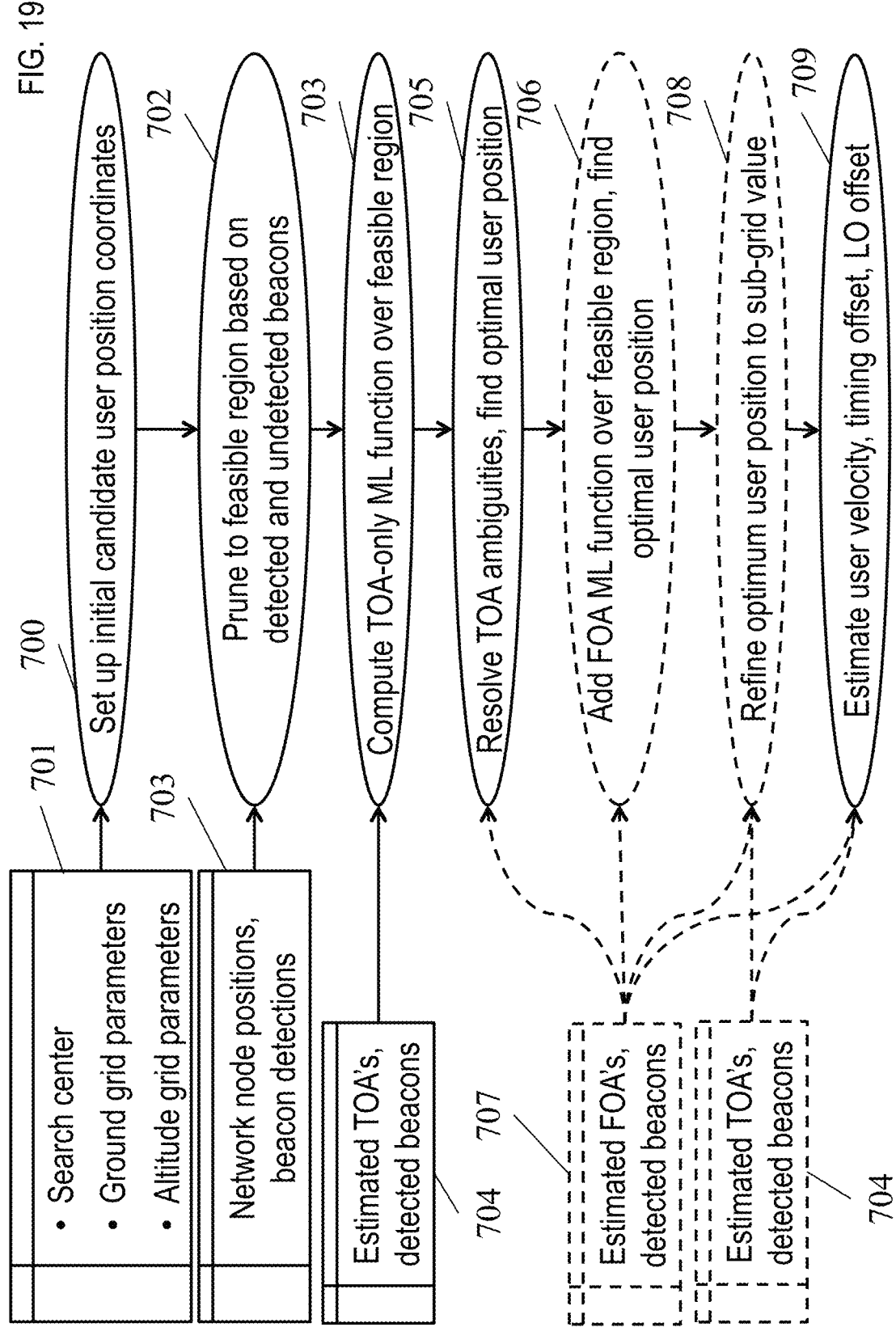

FIG. 19 provides more detail on the geo-observable based positioning/timing procedure method performed in one aspect of the disclosure, applicable to each search stage shown in FIG. 18. Candidate user 400 position coordinates comprising ground and altitude grid coordinates are first set up 700, e.g., using prior information about the search center and ground/altitude grid parameters 701. The search center used in the coarse search stage 651 is based on coarse knowledge of the user 400 position, e.g., due to wireless communication transceivers 402 that the user 400 is connected to, or prior user 400 position estimates; the search center in the later fine search 653 and fine altitude search 654 stages are based on results of the prior search stages. Candidate user 400 position coordinates are then pruned to a feasible region 702 (described in more detail below), based on beacons that have been detected during the geo-observable estimation stage, and beacons that have not been detected during this stage, using network node 401 positions, and using beacon detections provided by previous geo-observable estimation operations 703. An initial search is then performed over the pruned candidate user 400 position coordinates, using the TOA-only concentrated ML objective function given in (Eq59) 703. At each candidate user 400 position coordinate, an additional alternating projections algorithm is used to resolve any additional factor-of-$T_{amb}$ ambiguity in the TOA estimates, where $T_{amb}=T_{sym}/K_0$ if the FLS estimator is used, and the copy-aided ambiguity resolution operation 510 is not performed, and $T_{amb}=T_{sym}$ otherwise 705. Starting with an initial timing offset estimate $\hat{\tau}_R$, an exemplary method performs recursion $$\hat{n}_{zone}(\ell) \leftarrow \text{round} \left\{ \left( \left( \hat{\tau}_R + \frac{1}{c} \|p_{T(\ell)R}\|_2 \right) - \hat{\tau}_{T(\ell)R} \right) / T_{amb} \right\}, \quad \text{(Eq64)}$$

$$\hat{\tau}_R \leftarrow \left\langle \hat{\tau}_{T(\ell)R} + T_{amb}\hat{n}_{zone}(\ell) - \frac{1}{c} \|p_{T(\ell)R}\|_2 \right\rangle_{\ell \in \mathcal{L}_{detect}}, \quad \text{(Eq65)}$$

until $\{\hat{n}_{zone}(\ell)\}_{\ell \in \mathcal{L}_{detect}}$ is stable at each candidate user 400 position coordinate. The TOA estimates are then updated using $\hat{\tau}_{T(\ell)R} \leftarrow \hat{\tau}_{T(\ell)R} + T_{amb}\hat{n}_{zone}(\ell)$.

In some aspects, the optimal user position then found from the minimum of (Eq59). In other aspects, the FOA-only ML function given in (Eq63) is added to the TOA-only ML function, and the optimal position is found or refined using the combined TOA-FOA ML function. Optionally, the optimal position is further optimized using local search operations 708, e.g., polynomial fit to optimum ML function values or parametric Gauss-Newton method. The velocity and timing offset, and LO offset is then estimated from (Eq62), (Eq58), and (Eq60), respectively 709.

Figure 20:
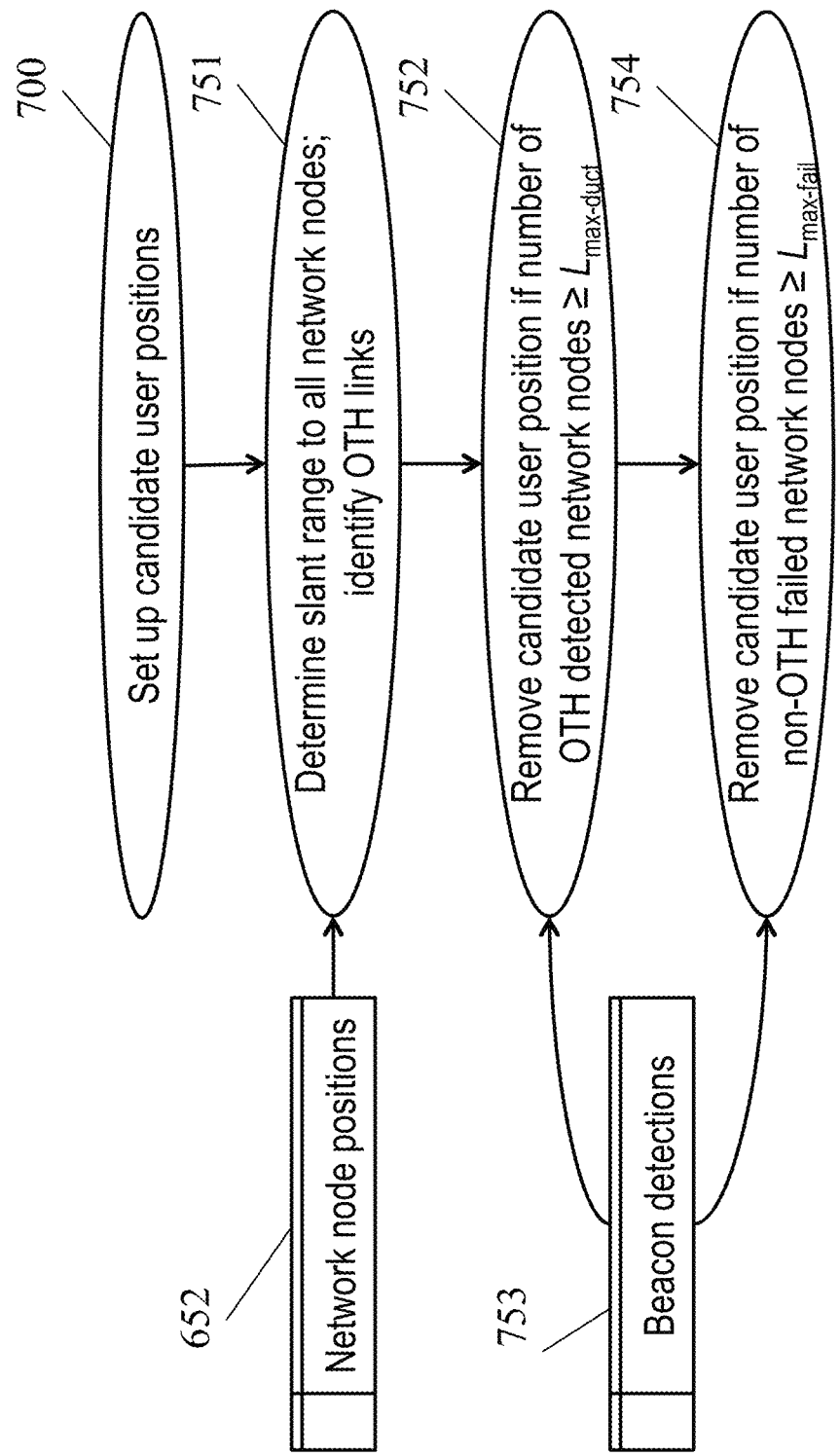

In some aspects, a "pruning" strategy is used to restrict the actual positions searched by the system. FIG. 20 depicts a strategy for performing this pruning, applicable to each stage in the search strategy shown in FIG. 18. Once a set of candidate user positions is set up 700, the slant ranges between the all the beacons and candidate user 400 positions are computed, using the known network node 401 positions 652. Over-the-horizon (OTH) links are then detected, and candidate user 400 positions that connect to more than $L_{max\text{-}duct}$ OTH network nodes 401 associated with detected beacons, or that fail to connect to more than $L_{max\text{-}fail}$ non-OTH network nodes associated with detected beacons, are then removed from the user location set. These conditions recognize that any candidate location must be inside the FoV of all of the network nodes 401 associated with beacons that are detected by the TOA-FOA search procedure, except for ducting events; and must be outside the FoV of all of the network nodes 401 associated with beacons that are not detected by the TOA-FOA search, except for blockages, shadowing, etc.

FIG. 21A-FIG. 21C illustrates the full positioning search procedure for user 1 400 in the LMS Scenario. The system determines the horizontal (XY plane) and vertical (Z-axis) position of the user 400 both to very high accuracy, and at values comparable to the positioning CRB95. In particular the Z-axis performance exceeds the 3 meter FCC E911 mandate, the 4.6 meter (15 foot) WAAS Z-Axis accuracy target, and the 1 meter 5GNR XYZ accuracy target. The effect of the "pruning" strategy are also clearly visible in this FIG., showing the substantive reduction in search region at each stage in the search process.

FIG. 22A-FIG. 22C and FIG. 23A-FIG. 23C show positioning, velocity, and timing/LO offset estimation performance for all of the users in both scenarios, and Table 6 summarizes $80^{th}$ percentile performance for the exemplary scenarios. Both scenarios demonstrate centimeter-level 80% horizontal (XY plane) positioning accuracy and <3 meter 80% vertical (Z-axis) positioning accuracy—meeting the FCC E911 Z-axis positioning requirement. Both scenarios also demonstrates <10 picosecond 80% clock timing accuracy and <20 ppt 80% clock rate accuracy for all of the scenarios, i.e., near Stratum 1 (10 ppt) clock rate accuracy.

TABLE 6

| $80^{th}$ Percentile Positioning/Timing Performance, Both Scenarios | | |
|---|---|---|
| $80^{th}$ Percentile Error | LMS Scenario | 2.4 GHz Ch. 13 |
| XY Position | 1.2 cm | 5 mm |
| Z Position | 3.5 m | 1.8 m |
| XY Velocity | 0.82 cm/s | 8.9 mm/s |
| Z Velocity | 1.7 m/s | 1.8 m/s |
| Clock Timing | 95 ps | 44 ps |
| Clock Rate | 16 ppt | 15 ppt |
| LO Offset | 15 mHz | 36 mHz |

Additional Aspects of the Disclosure

The methods described above extend to specular multipath environments in a straightforward fashion. This aspect is also expected to be particularly important in IIoT applications, due to high degrees of multipath expected in warehouse and enterprise environments. However, it will also be important in urban outdoor environments due to reflections from large buildings and structures in the vicinity of users.

Multipath extensions include both multipath mitigation aspects, in which direct and reflection paths are individually identified and used to exclude reflection paths from subsequent positioning and timing solutions, or as part of those solutions; and multipath exploitation aspects, in which direct paths (if available) and reflection paths are identified and used in subsequent positioning and timing solutions. Multipath mitigation aspects usable by those of ordinary skill in the art include:

Multipeak surface detection methods, which detect and estimate TOA and FOA of all of the substantive propagation paths between each network node 401 and each user 400.

Nonrectangular TOA-FOA surface windows, which improve separation between direct and specular reflection paths. All of the aspects described here incorporate such windows.

Robust positioning timing solutions that can sort between direct and specular reflection detections during subsequent positioning/timing operations, to identify the direct path detection.

Multipath exploitation aspects include multipath fingerprinting methods described in Hilsenrath 2000 and Wax 2000, which exploit the large-scale structure of direct and specular reflections in rich multipath environments.

Additional aspects of the invention are shown Provisional Patent Application 62/969,264, entitled "Secure, low-latency, and high-precision interference-resilient navigation and timing using networks of spectrally/temporally redundant beacons," specifically incorporated herein by reference; and in the text and drawings disclosed in the paper entitled "Resilient Distributed Positioning Networks: A New Approach to Extreme Low-Latency, High-Precision Positioning and Timing," and the presentation with the same name, copies of which are attached to and specifically incorporated herein by reference, and in Provisional Patent Application 63/138,300, entitled "Distributed Resilient Positioning Networks" a copy of which is attached to and specifically incorporated herein by reference.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, a field-programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

All publications, patents, and patent applications disclosed herein are incorporated by reference in their entireties.

The invention claimed is:

1. A method performed at a receiver, wherein the receiver is configured to receive a superposition of co-channel beacon transmissions transmitted from a plurality of beacon transmitters, each of the co-channel beacon transmissions having at least one of spectral redundancy and temporal redundancy; the method comprising:
generating a snapshot of the superposition; and
using subcarrier demodulation, code nulling, or a Class-C linear minimum-mean-square error (MMSE) operation to separate multiples ones of the co-channel beacon transmissions in the snapshot or eliminate inter-symbol interference and inter-subcarrier interference in the snapshot.

2. The method of claim 1, wherein at least one of generating or using is configured to be performed at a network user, a network node, or a network operations center.

3. The method of claim 2, wherein the network operations center employs a wireless communication link configured to provision each of a plurality of network nodes with configuration data or time symbols.

4. The method of claim 3, wherein generating and using are performed at the network user, the method further comprising:
configuring the network user to receive network node locations and configuration data from the network operations center via the wireless communication link; and
configuring the network user to process the snapshot with the network node locations and configuration data for determining position and timing.

5. The method of claim 3, wherein the wireless communication link comprises Long Term Evolution (LTE), fourth-generation wireless (4G), fifth generation (5G) new radio (NR), IEEE 802.11 wireless local area network (WLAN), Zigbee, or Bluetooth technology.

6. The method of claim 2, wherein generating is performed at the network user or the network node, the method further comprising communicating the snapshot to the network operations center, the network operations center being configured to perform the subcarrier demodulation, code nulling, or Class-C linear MMSE operation.

7. The method of claim 2, wherein generating is performed at the network user, and wherein the snapshot contains co-channel beacon transmissions transmitted from a plurality of network nodes within the network user's field of view.

8. The method of claim 1, wherein the snapshot comprises a prefix and a suffix to encompass inter-slot interference introduced by timing offset between the plurality of beacon transmitters and the receiver.

9. The method of claim 1, further comprising channelizing the superposition to separate the co-channel beacon transmissions in the snapshot into frequency subcarriers and time symbols to produce a channelized snapshot; wherein using is configured to perform the subcarrier demodulation, code nulling, or Class-C linear MMSE operation on the channelized snapshot.

10. The method of claim 9, further comprising stacking the channelized snapshot into an $N_{data} \times M_{DoF}$ windowed data matrix, wherein $M_{DoF}$ denotes degrees-of-freedom (DoF) of the windowed data matrix, each of the plurality of co-channel beacon transmissions being redundant across the DoF, and wherein $N_{data}$ denotes a number of data samples in the windowed data matrix.

11. The method of claim 1, wherein using is configured to separate the co-channel beacon transmissions with precision dictated by received power of each of the co-channel beacon transmissions above a receiver noise floor, and irrespective of other ones of the co-channel beacon transmissions received at the same time and frequency.

12. The method of claim 1, further comprising determining geo-observables from separated co-channel beacon transmissions.

13. The method of claim 12, further comprising: determining at least one of positioning and timing from the geo-observables.

14. An apparatus, comprising:
a receiver configured to receive a superposition of co-channel beacon transmissions transmitted from a plurality of beacon transmitters, each of the co-channel beacon transmissions having at least one of spectral redundancy and temporal redundancy; the receiver configured for generating a snapshot of the superposition; and
a position/timing (P/T) solution generator communicatively coupled to the receiver, the P/T solution generator configured to employ subcarrier demodulation, code nulling, or a Class-C linear minimum-mean-square error (MMSE) operation to separate multiples ones of the co-channel beacon transmissions in the snapshot or eliminate inter-symbol interference and inter-subcarrier interference in the snapshot.

15. The apparatus of claim 14, wherein the P/T solution generator is located in a network user, a network node, or a network operations center.

16. The apparatus of claim 15, wherein the network operations center employs a wireless communication link configured to provision each of a plurality of network nodes with configuration data or time symbols.

17. The apparatus of claim 16, wherein the receiver and the P/T solution generator are located at the network user, the receiver being configured to receive network node locations and configuration data from the network operations center via the wireless communication link; and the P/T solution generator being configured to process the snapshot with the network node locations and configuration data for determining position and timing.

18. The apparatus of claim 16, wherein the wireless communication link comprises Long Term Evolution (LTE), fourth-generation wireless (4G), fifth generation (5G) new radio (NR), IEEE 802.11 wireless local area network (WLAN), Zigbee, or Bluetooth technology.

19. The apparatus of claim 15, wherein the receiver is located at the network user or the network node, and the P/T solution generator is located at the network operations center, the apparatus further comprising a communication network configured for communicating the snapshot to the network operations center.

20. The apparatus of claim 15, wherein the receiver is located at the network user, and wherein the snapshot contains co-channel beacon transmissions transmitted from a plurality of network nodes within the network user's field of view.

21. The apparatus of claim 14, wherein the snapshot comprises a prefix and a suffix to encompass inter-slot interference introduced by timing offset between the plurality of beacon transmitters and the receiver.

22. The apparatus of claim 14, wherein the receiver comprises a channelizer configured for channelizing the superposition to separate the co-channel beacon transmissions in the snapshot into frequency subcarriers and time symbols to produce a channelized snapshot;
wherein the P/T solution generator is configured to perform the subcarrier demodulation, code nulling, or Class-C linear MMSE operation on the channelized snapshot.

23. The apparatus of claim 22, wherein the P/T solution generator is configured for stacking the channelized snapshot into an $N_{data} \times M_{DoF}$ windowed data matrix, wherein $M_{DoF}$ denotes degrees-of-freedom (DoF) of the windowed data matrix, each of the plurality of co-channel beacon transmissions being redundant across the DoF, and wherein $N_{data}$ denotes a number of data samples in the windowed data matrix.

24. The apparatus of claim 14, wherein the P/T solution generator is configured to separate the co-channel beacon transmissions with precision dictated by received power of each of the co-channel beacon transmissions above a receiver noise floor, and irrespective of other ones of the co-channel beacon transmissions received at the same time and frequency.

25. The apparatus of claim 14, wherein the P/T solution generator is configured for determining geo-observables from separated co-channel beacon transmissions.

26. The apparatus of claim 25, wherein the P/T solution generator is configured for determining at least one of positioning and timing from the geo-observables.

27. An apparatus configured to receive a superposition of co-channel beacon transmissions transmitted from a plurality of beacon transmitters, each of the co-channel beacon transmissions having at least one of spectral redundancy and temporal redundancy; the apparatus comprising:
at least one processor and at least one memory in electronic communication with the at least one processor, the at least one memory having instructions stored therein and executable by the at least one processor for:
generating a snapshot of the superposition; and
using subcarrier demodulation, code nulling, or a Class-C linear minimum-mean-square error (MMSE) operation to separate multiples ones of the co-channel beacon transmissions in the snapshot or eliminate inter-symbol interference and inter-subcarrier interference in the snapshot.

28. The apparatus of claim 27, wherein the at least one processor and the at least one memory are located at a network user, a network node, or a network operations center.

29. The apparatus of claim 28, wherein the network operations center employs a wireless communication link configured to provision each of a plurality of network nodes with configuration data or time symbols.

30. The apparatus of claim 29, wherein generating and using are performed at the network user, and the at least one memory has instructions stored therein and executable by the at least one processor for:
receiving network node locations and configuration data from the network operations center via the wireless communication link; and
processing the snapshot with the network node locations and configuration data for determining position and timing.

31. The apparatus of claim 29, wherein the wireless communication link comprises Long Term Evolution (LTE), fourth-generation wireless (4G), fifth generation (5G) new radio (NR), IEEE 802.11 wireless local area network (WLAN), Zigbee, or Bluetooth technology.

32. The apparatus of claim 28, wherein generating is performed at the network user or the network node, the apparatus further comprising a transmitter configured for communicating the snapshot to the network operations center, the network operations center being configured to perform the subcarrier demodulation, code nulling, or Class-C linear MMSE operation.

33. The apparatus of claim 28, wherein generating is performed at the network user, and wherein the snapshot contains co-channel beacon transmissions transmitted from a plurality of network nodes within the network user's field of view.

34. The apparatus of claim 27, wherein the snapshot comprises a prefix and a suffix to encompass inter-slot interference introduced by timing offset between the plurality of beacon transmitters and the receiver.

35. The apparatus of claim 27, wherein the at least one memory has instructions stored therein and executable by the at least one processor for:
channelizing the superposition to separate the co-channel beacon transmissions in the snapshot into frequency subcarriers and time symbols to produce a channelized snapshot;
wherein using is configured to perform the subcarrier demodulation, code nulling, or Class-C linear MMSE operation on the channelized snapshot.

36. The apparatus of claim 35, wherein the at least one memory has instructions stored therein and executable by the at least one processor for: stacking the channelized snapshot into an $N_{data} \times M_{DoF}$ windowed data matrix, wherein $M_{DoF}$ denotes degrees-of-freedom (DoF) of the windowed data matrix, each of the plurality of co-channel beacon transmissions being redundant across the DoF, and wherein $N_{data}$ denotes a number of data samples in the windowed data matrix.

37. The apparatus of claim 27, wherein using is configured to separate the co-channel beacon transmissions with precision dictated by received power of each of the co-channel beacon transmissions above a receiver noise floor, and irrespective of other ones of the co-channel beacon transmissions received at the same time and frequency.

38. The apparatus of claim 27, wherein the at least one memory has instructions stored therein and executable by the at least one processor for: determining geo-observables from separated co-channel beacon transmissions.

39. The apparatus of claim 38, wherein the at least one memory has instructions stored therein and executable by the at least one processor for: determining at least one of positioning and timing from the geo-observables.

40. A non-transitory computer-readable memory, and instructions stored therein and executable by at least one processor for:
receiving a superposition of co-channel beacon transmissions transmitted from a plurality of beacon transmitters, each of the co-channel beacon transmissions having at least one of spectral redundancy and temporal redundancy;
generating a snapshot of the superposition; and
using subcarrier demodulation, code nulling, or a Class-C linear minimum-mean-square error (MMSE) operation to separate multiples ones of the co-channel beacon transmissions in the snapshot or eliminate inter-symbol interference and inter-subcarrier interference in the snapshot.

41. The non-transitory computer-readable memory of claim 40, wherein at least one of receiving, generating, or using are configured to be performed at a network user, a network node, or a network operations center.

42. The non-transitory computer-readable memory of claim 41, further comprising instructions stored therein and executable by the at least one processor for communicating the snapshot to the network operations center, the network operations center being configured to perform the subcarrier demodulation, code nulling, or Class-C linear MMSE operation.

43. The non-transitory computer-readable memory of claim 41, wherein generating is performed at the network user, and wherein the snapshot contains co-channel beacon transmissions transmitted from a plurality of network nodes within the network user's field of view.

44. The non-transitory computer-readable memory of claim 40, further comprising instructions stored therein and executable by the at least one processor for employing a wireless communication link to provision each of a plurality of network nodes with configuration data or time symbols.

45. The non-transitory computer-readable memory of claim 44, further comprising instructions stored therein and executable by the at least one processor for:
    receiving network node locations and configuration data from the network operations center via the wireless communication link; and
    processing the snapshot with the network node locations and configuration data for determining position and timing.

46. The non-transitory computer-readable memory of claim 44, wherein the wireless communication link comprises Long Term Evolution (LTE), fourth-generation wireless (4G), fifth generation (5G) new radio (NR), IEEE 802.11 wireless local area network (WLAN), Zigbee, or Bluetooth technology.

47. The non-transitory computer-readable memory of claim 40, wherein the snapshot comprises a prefix and a suffix to encompass inter-slot interference introduced by timing offset between the plurality of beacon transmitters and the receiver.

48. The non-transitory computer-readable memory of claim 40, further comprising instructions stored therein and executable by the at least one processor for:
    channelizing the superposition to separate the co-channel beacon transmissions in the snapshot into frequency subcarriers and time symbols to produce a channelized snapshot;
    wherein using is configured to perform the subcarrier demodulation, code nulling, or Class-C linear MMSE operation on the channelized snapshot.

49. The non-transitory computer-readable memory of claim 48, further comprising instructions stored therein and executable by the at least one processor for: stacking the channelized snapshot into an $N_{data} \times M_{DoF}$ windowed data matrix, wherein $M_{DoF}$ denotes degrees-of-freedom (DoF) of the windowed data matrix, each of the plurality of co-channel beacon transmissions being redundant across the DoF, and wherein $N_{data}$ denotes a number of data samples in the windowed data matrix.

50. The non-transitory computer-readable memory of claim 40, wherein using is configured to separate the co-channel beacon transmissions with precision dictated by received power of each of the co-channel beacon transmissions above a receiver noise floor, and irrespective of other ones of the co-channel beacon transmissions received at the same time and frequency.

51. The non-transitory computer-readable memory of claim 40, further comprising instructions stored therein and executable by the at least one processor for: determining geo-observables from separated co-channel beacon transmissions.

52. The non-transitory computer-readable memory of claim 51, further comprising instructions stored therein and executable by the at least one processor for: determining at least one of positioning and timing from the geo-observables.

* * * * *